(12) United States Patent
Kim et al.

(10) Patent No.: US 11,951,967 B2
(45) Date of Patent: Apr. 9, 2024

(54) ELECTRONIC BRAKE SYSTEM AND OPERATION METHOD THEREOF

(71) Applicant: HL MANDO CORPORATION, Pyeongtaek (KR)

(72) Inventors: Jin Seok Kim, Suwon (KR); Seong Ho Choi, Anyang (KR)

(73) Assignee: HL MANDO CORPORATION, Pyeongtaek (KR)

( * ) Notice: Subject to any disclaimer, the term of this patent is extended or adjusted under 35 U.S.C. 154(b) by 274 days.

(21) Appl. No.: 17/614,361

(22) PCT Filed: Apr. 29, 2020

(86) PCT No.: PCT/KR2020/005803
§ 371 (c)(1),
(2) Date: Nov. 25, 2021

(87) PCT Pub. No.: WO2020/242068
PCT Pub. Date: Dec. 3, 2020

(65) Prior Publication Data
US 2022/0227343 A1    Jul. 21, 2022

(30) Foreign Application Priority Data

May 31, 2019    (KR) .................. 10-2019-0064878

(51) Int. Cl.
*B60T 8/40*    (2006.01)
*B60T 13/14*    (2006.01)
*B60T 13/68*    (2006.01)

(52) U.S. Cl.
CPC ............ *B60T 8/4086* (2013.01); *B60T 8/409* (2013.01); *B60T 13/146* (2013.01);
(Continued)

(58) Field of Classification Search
CPC ....... B60T 8/4086; B60T 8/409; B60T 13/686
See application file for complete search history.

(56) References Cited

U.S. PATENT DOCUMENTS 5,729,979 A     3/1998 Shaw
2003/0222497 A1    12/2003 Fey
(Continued)

FOREIGN PATENT DOCUMENTS

JP    2006256408 A  *  9/2006
JP    2006256408 A     9/2006
(Continued)

OTHER PUBLICATIONS

International Search Report dated Aug. 26, 2020.
KR OA dated Oct. 17, 2023.

*Primary Examiner* — Thomas E Lazo
(74) *Attorney, Agent, or Firm* — Harvest IP Law, LLP

(57) ABSTRACT

The present disclosure relates to an electronic brake system. The electronic brake system includes a reservoir in which a pressurized medium is stored, an integrated master cylinder including a master chamber and a simulation chamber, a reservoir flow path communicating the integrated master cylinder with the reservoir, a hydraulic pressure supply device provided to generate a hydraulic pressure by operating the hydraulic piston according to an electrical signal output in response to a displacement of the brake pedal, a hydraulic control unit including a first hydraulic circuit provided to control the hydraulic pressure transferred to two wheel cylinders and a second hydraulic circuit provided to control the hydraulic pressure transferred to the other two wheel cylinders, and an electronic control unit provided to control valves based on hydraulic pressure information and displacement information of the brake pedal.

18 Claims, 14 Drawing Sheets

(52) U.S. Cl.
CPC .......... *B60T 13/148* (2013.01); *B60T 13/686* (2013.01); *B60T 2270/404* (2013.01)

(56) References Cited

U.S. PATENT DOCUMENTS

| | | | |
|---|---|---|---|
| 2016/0159331 A1* | 6/2016 | Yang | B60T 8/4086 |
| | | | 303/15 |
| 2017/0144643 A1* | 5/2017 | Kim | B60T 8/4081 |
| 2017/0210369 A1* | 7/2017 | Lim | B60T 13/04 |
| 2017/0274880 A1* | 9/2017 | Nishiwaki | B60T 13/686 |
| 2018/0273008 A1* | 9/2018 | Kim | B60T 13/58 |
| 2019/0092295 A1* | 3/2019 | Jeong | B60T 8/4081 |

FOREIGN PATENT DOCUMENTS

| | | |
|---|---|---|
| KR | 20150138295 A | 12/2015 |
| KR | 20180109179 A | 10/2018 |
| KR | 20190037818 A | 4/2019 |

* cited by examiner

[Fig. 1]
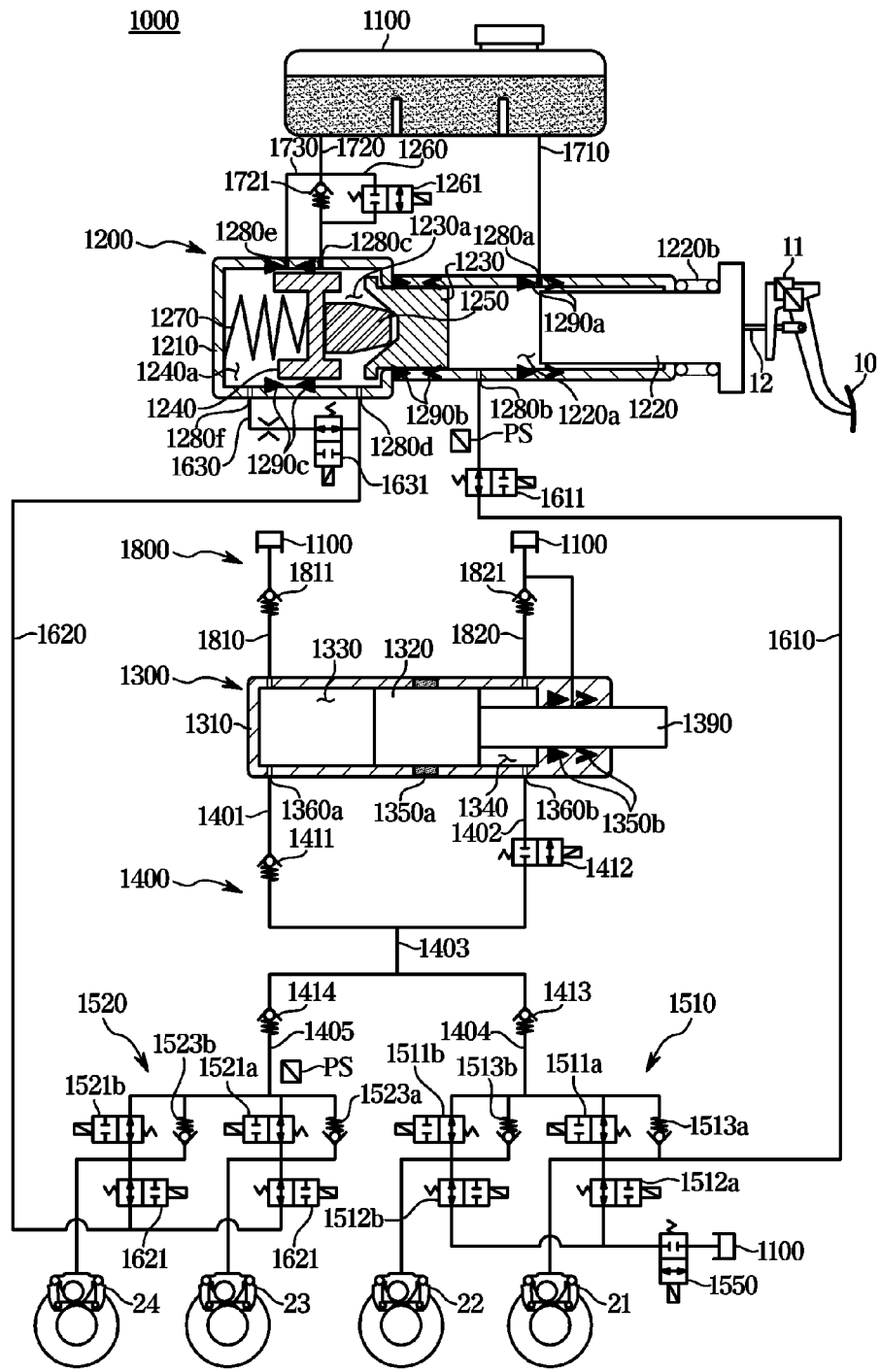

[Fig. 2]
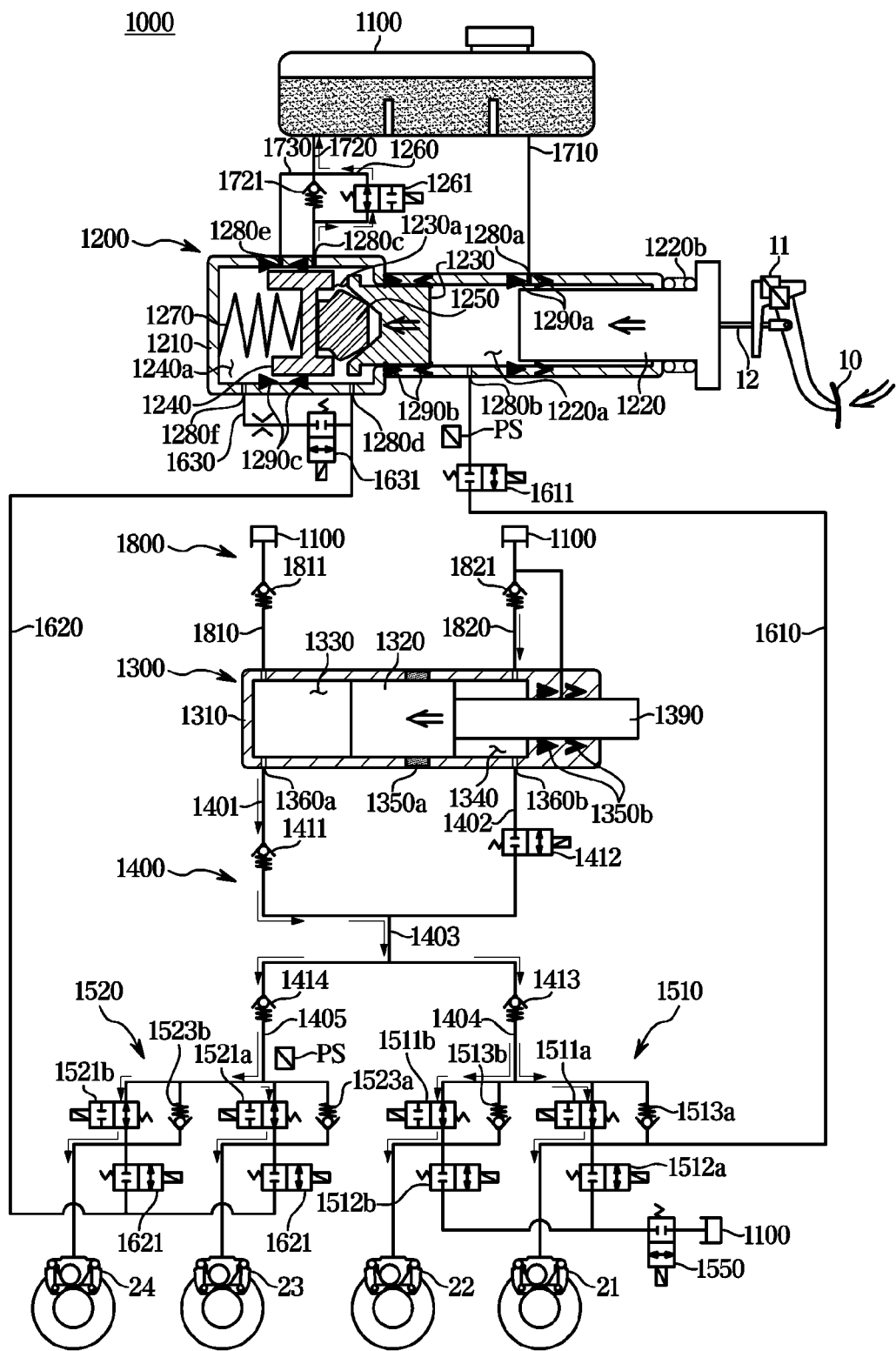

[Fig. 3]
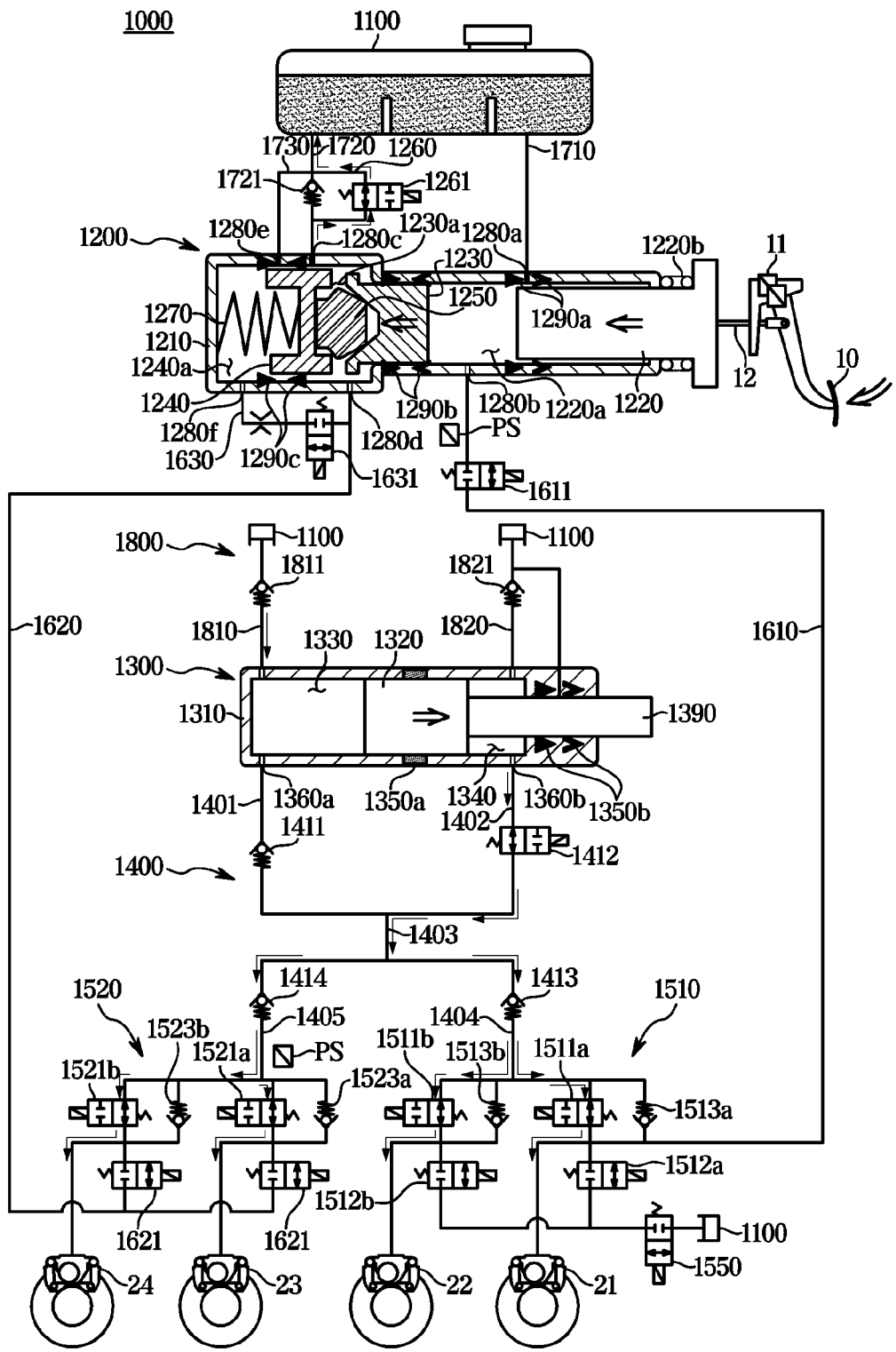

[Fig. 4]
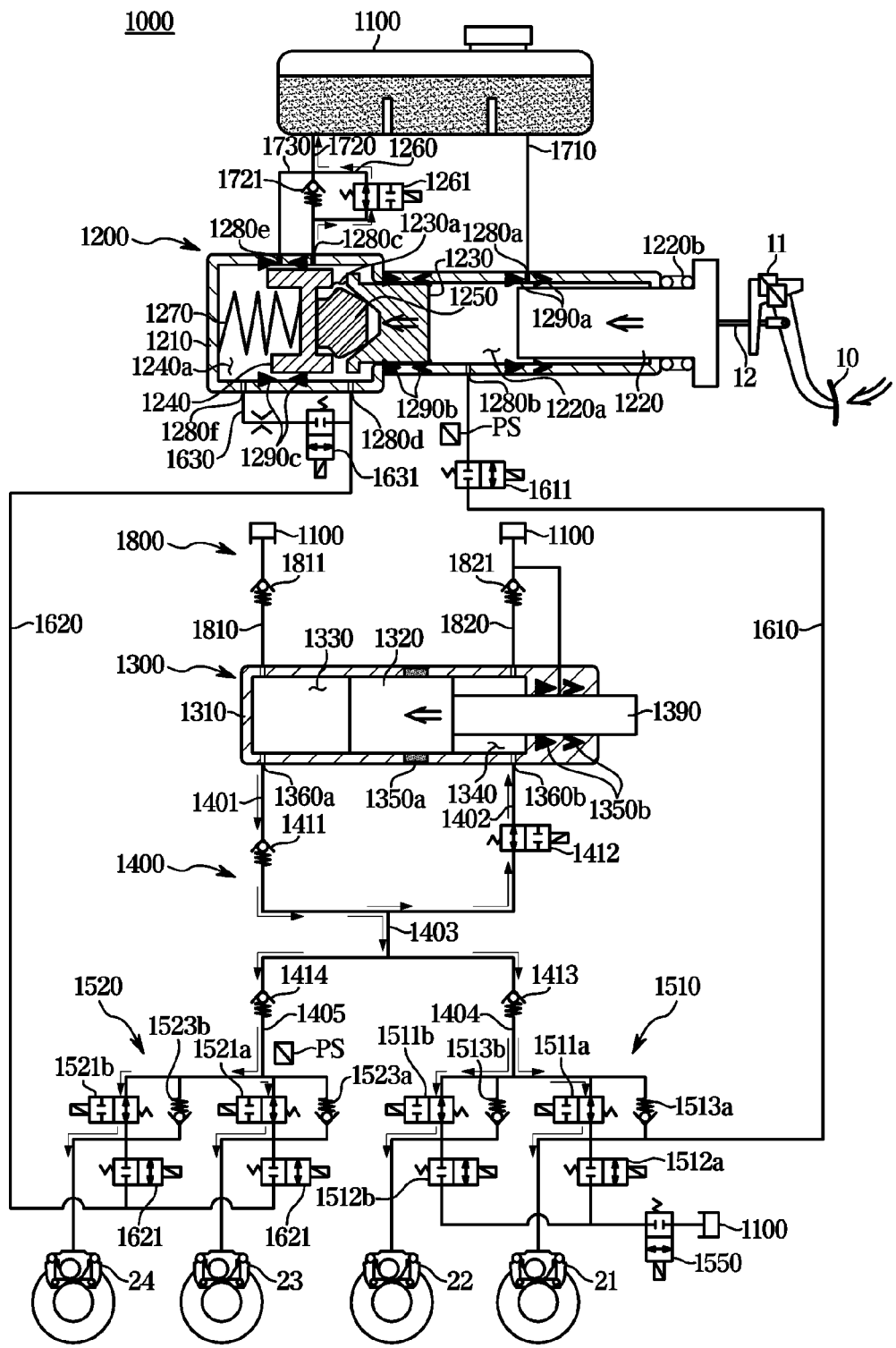

[Fig. 5]
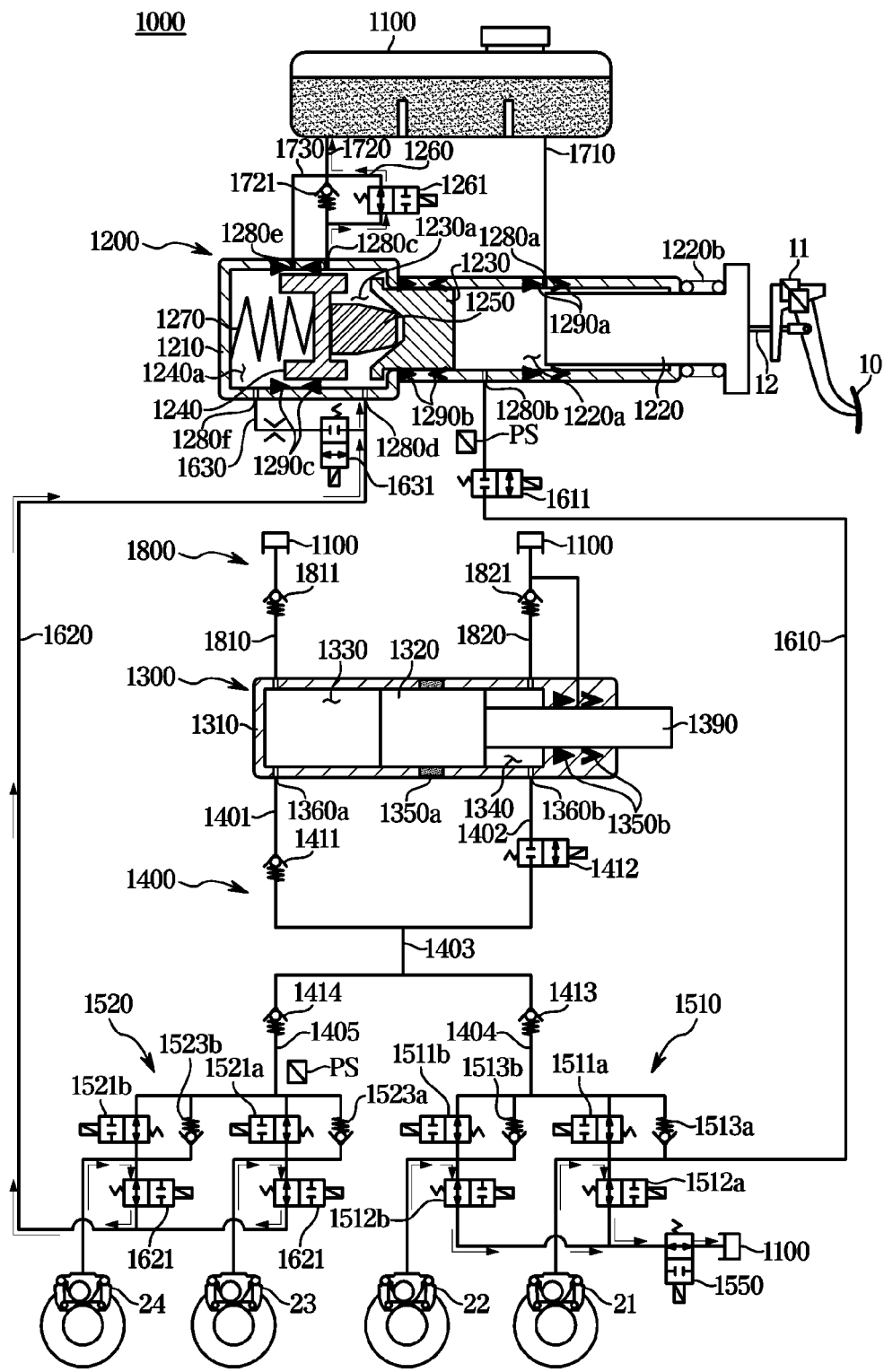

[Fig. 6]
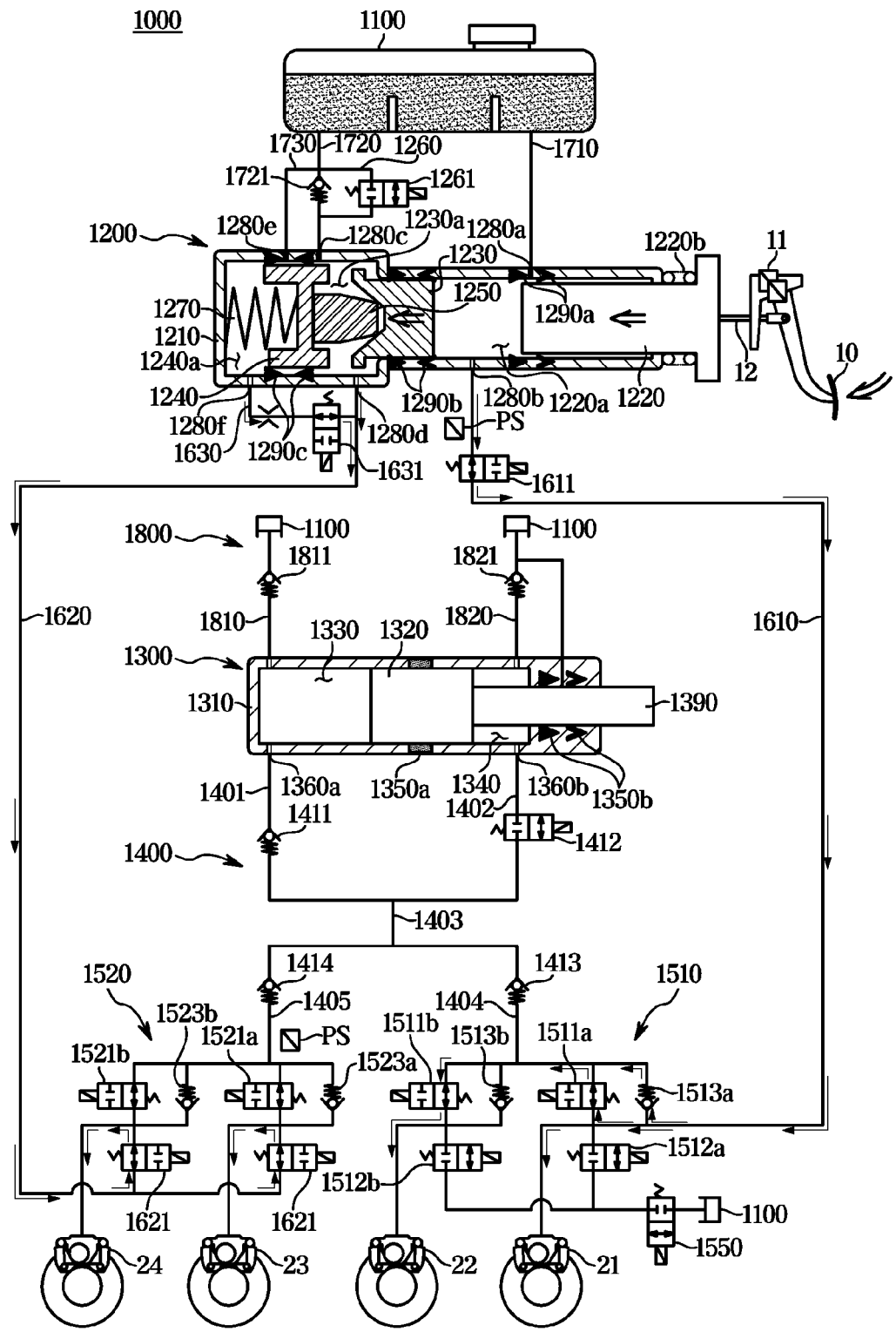

[Fig. 7]
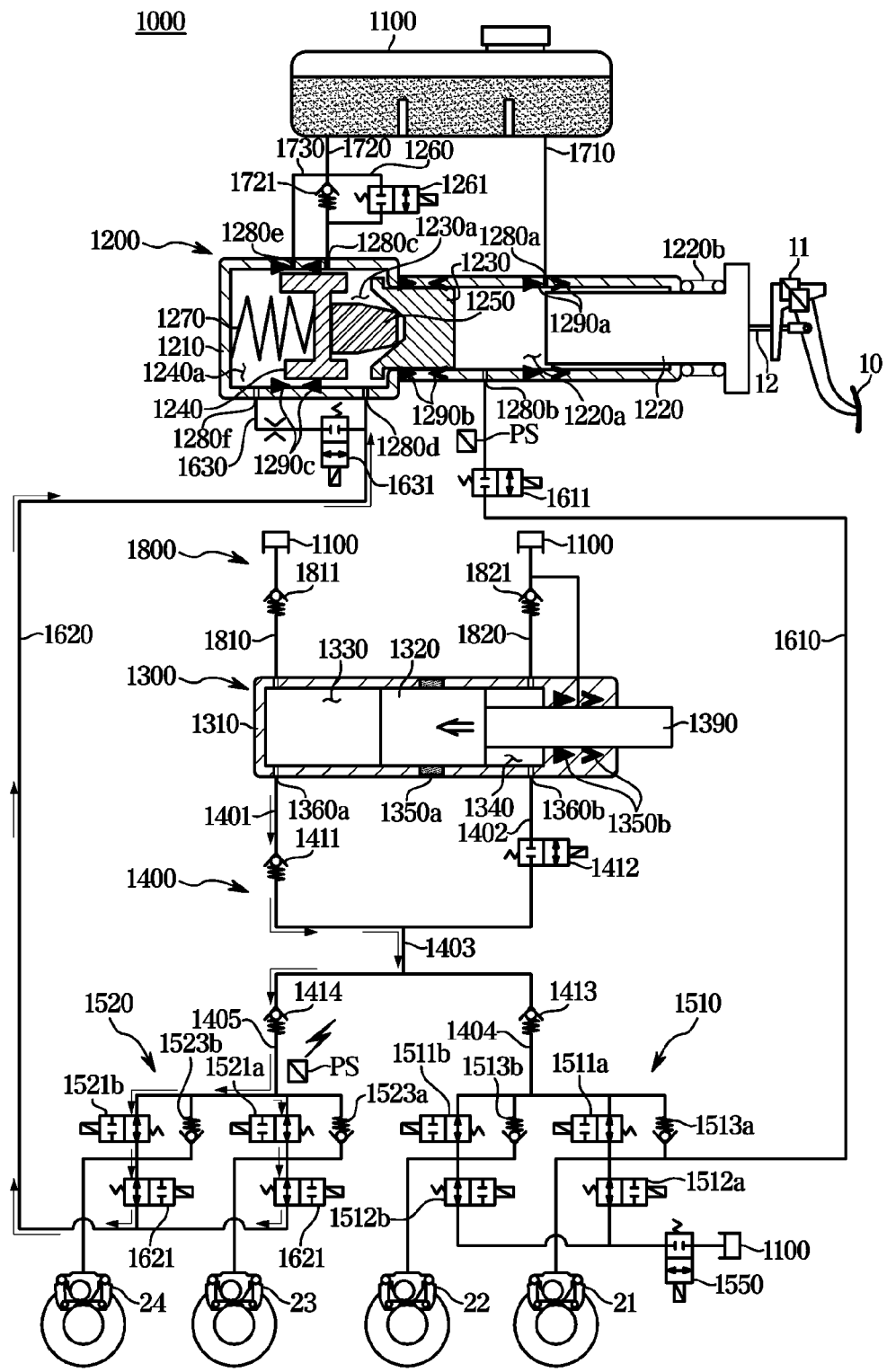

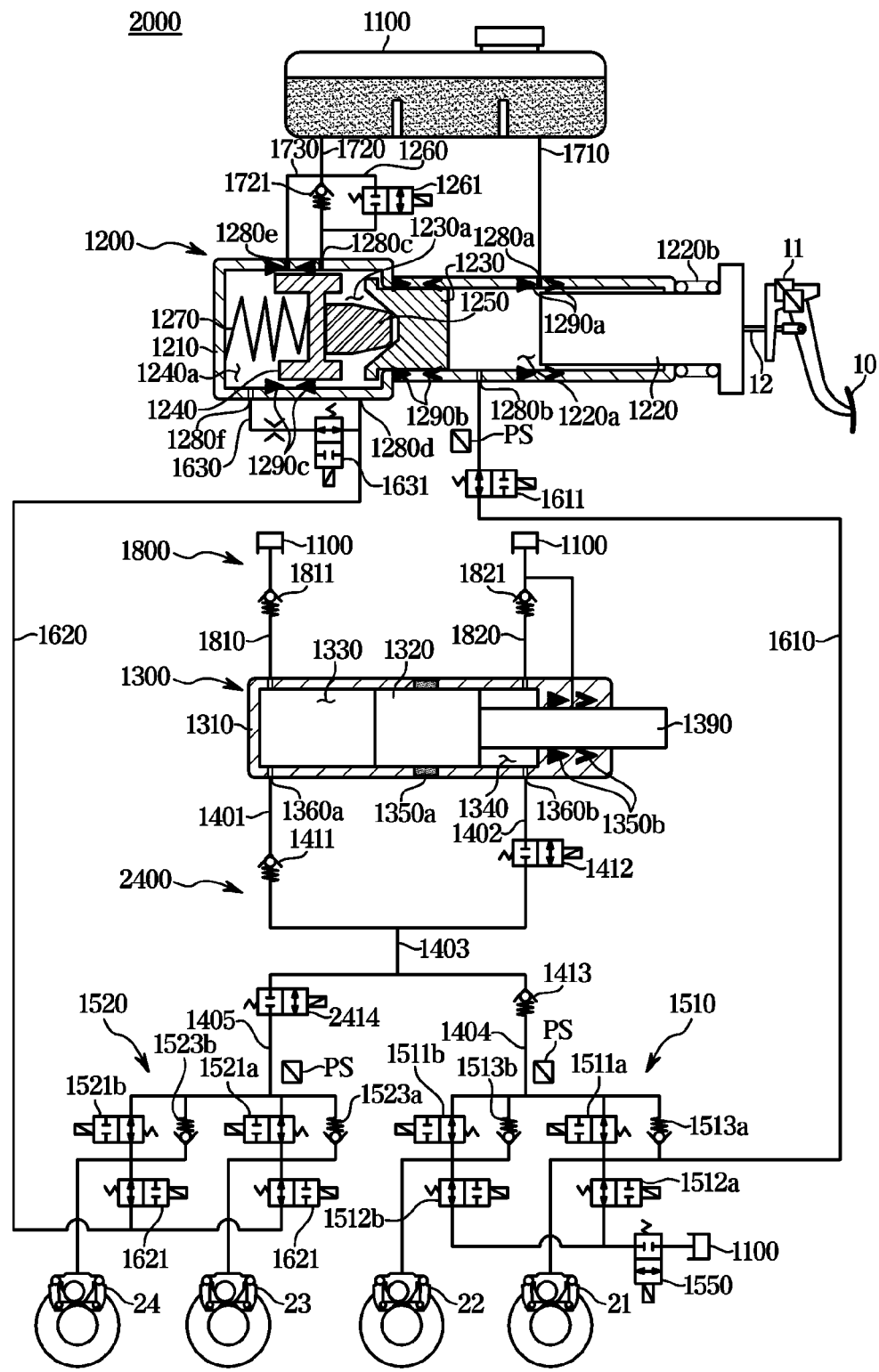
[Fig. 8]

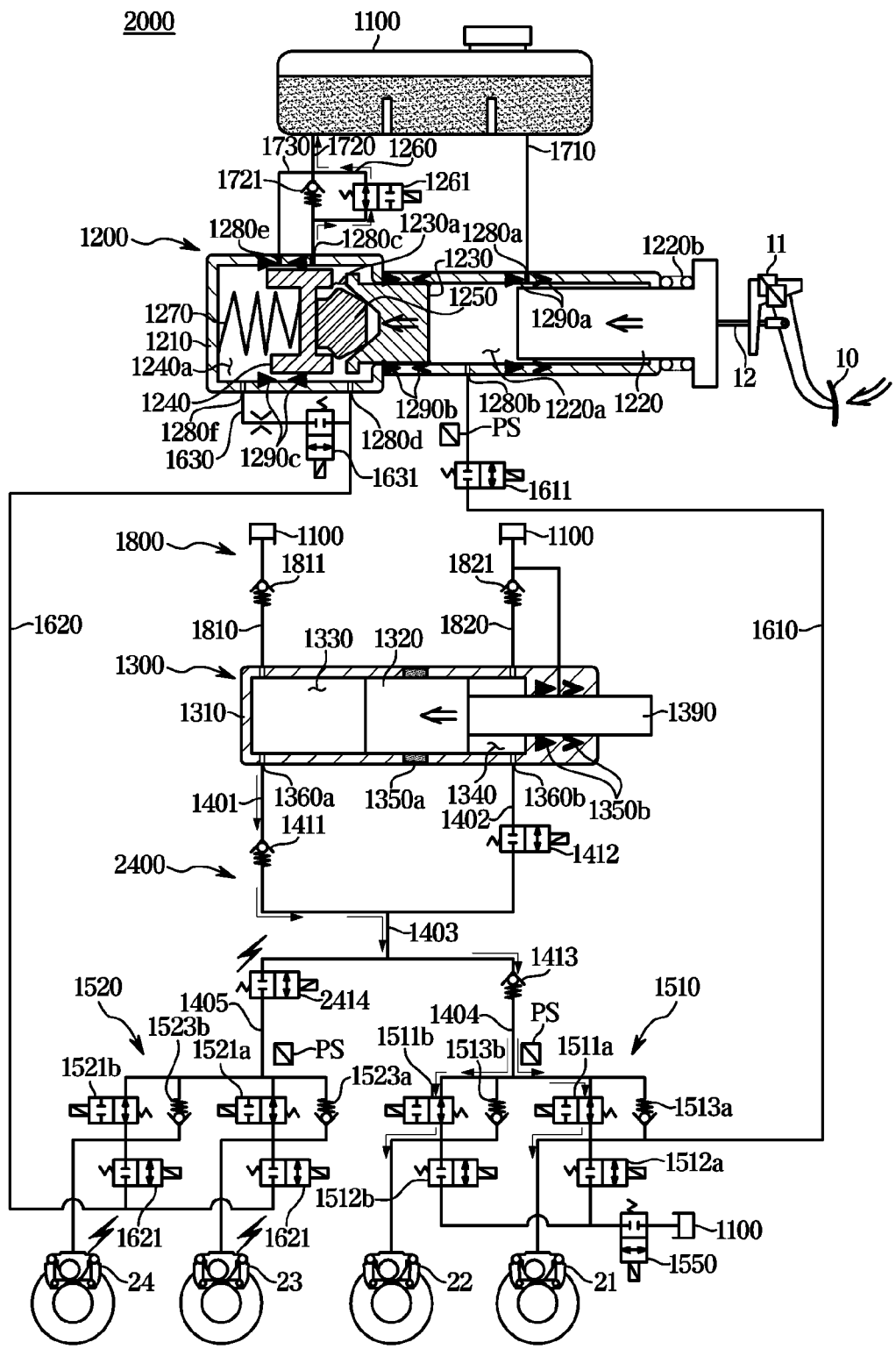
[Fig. 9]

[Fig. 10]
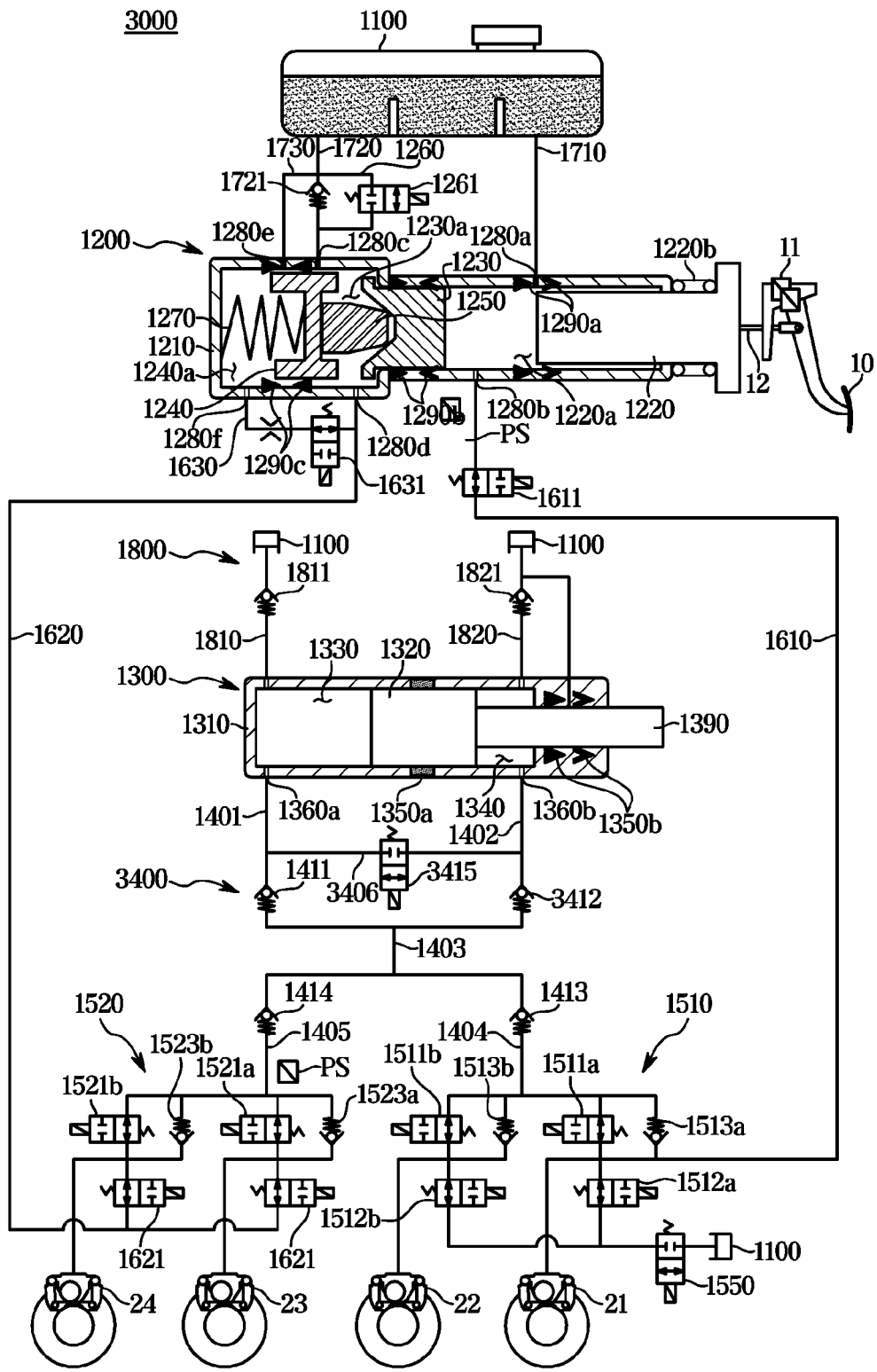

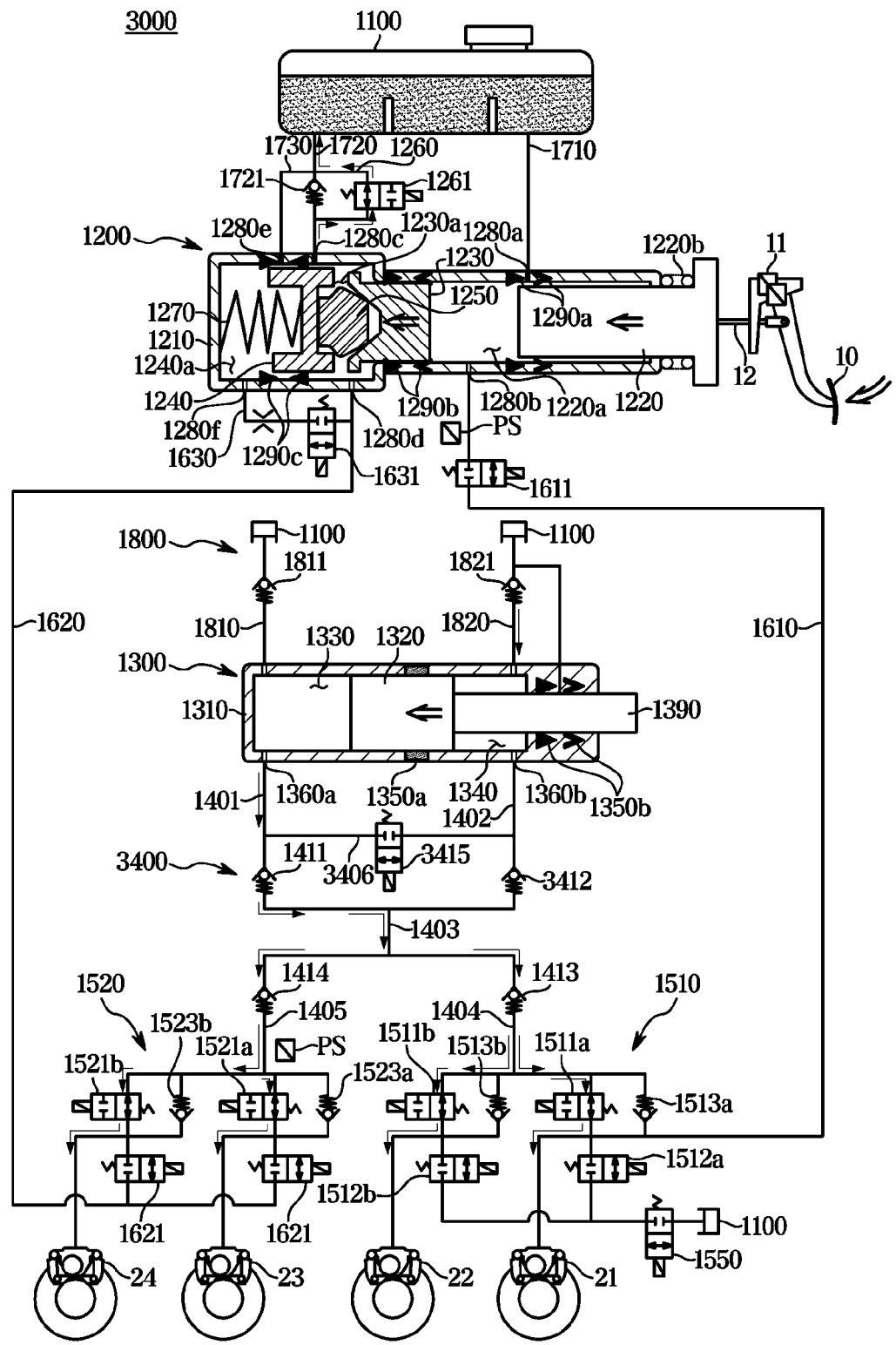
[Fig. 11]

[Fig. 12]
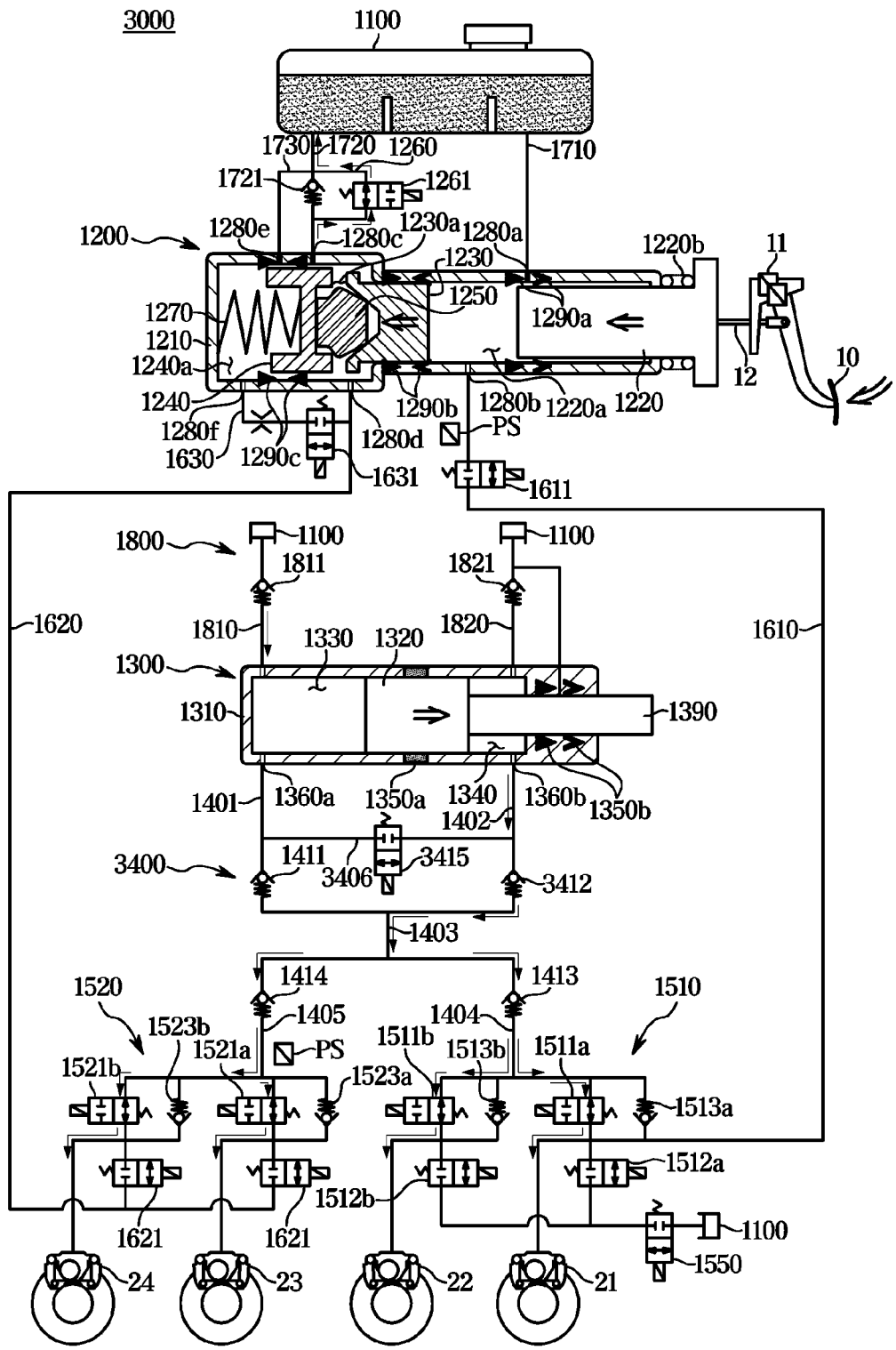

[Fig. 13]
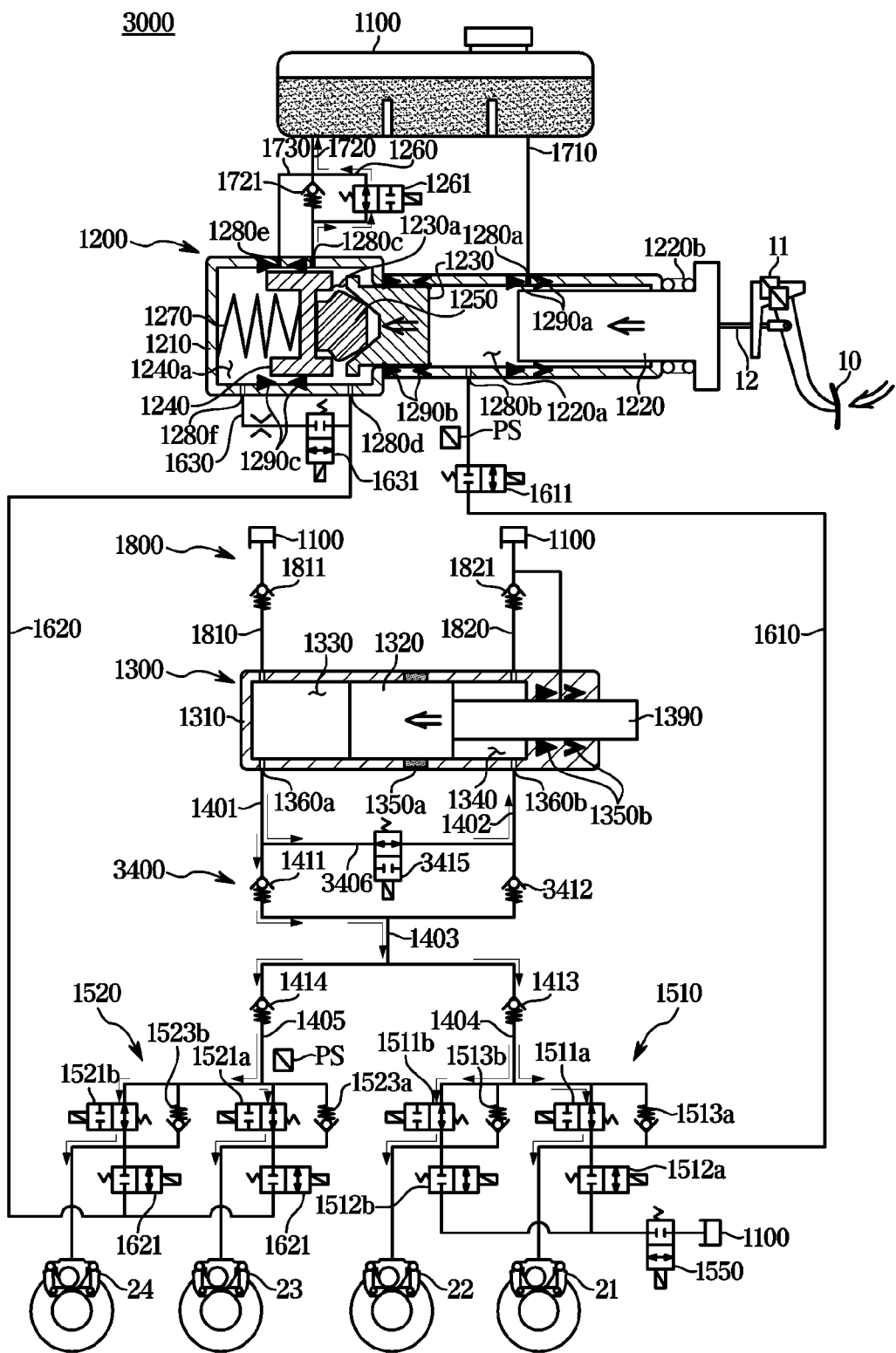

[Fig. 14]
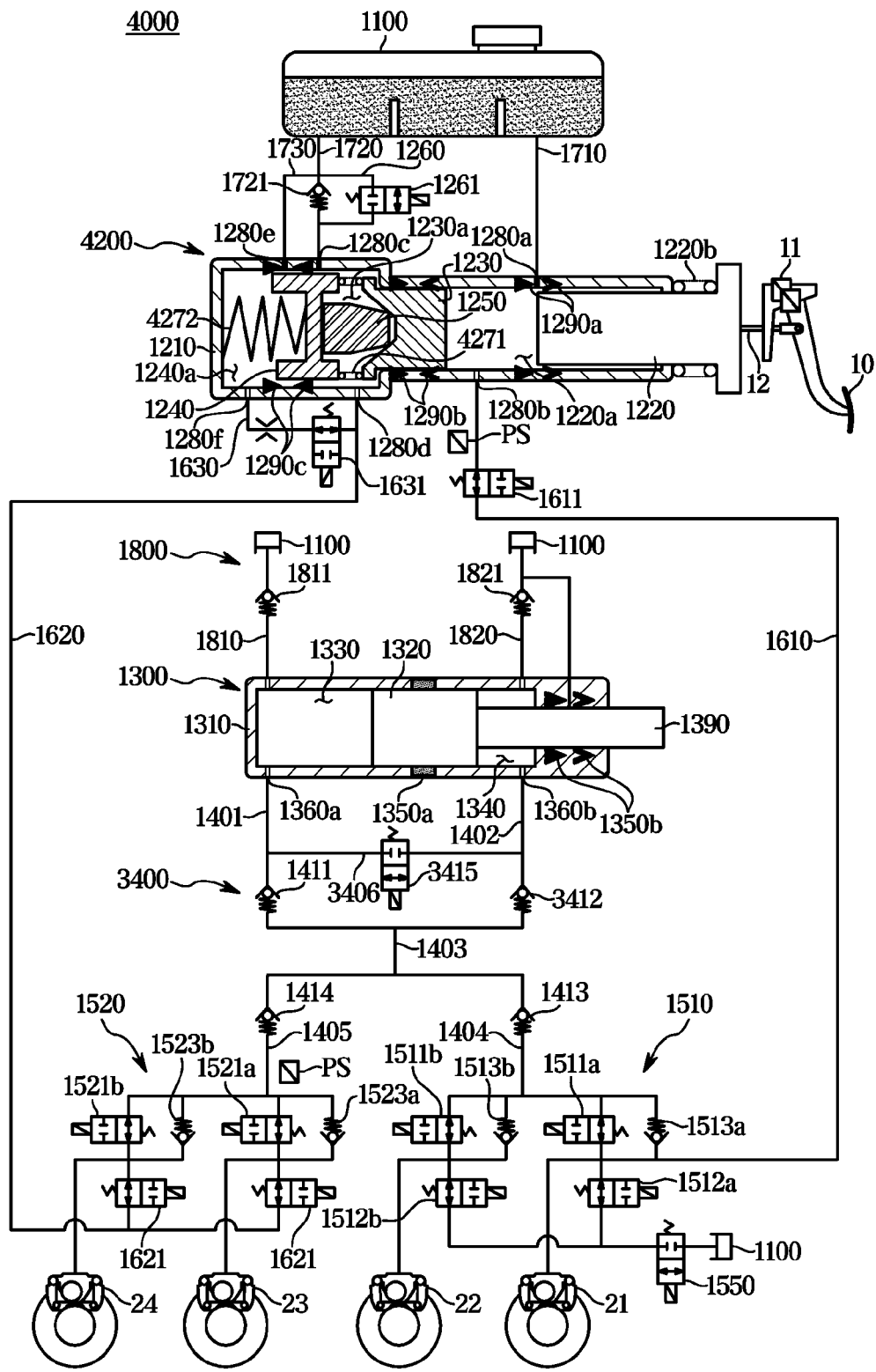

ELECTRONIC BRAKE SYSTEM AND OPERATION METHOD THEREOF

CROSS-REFERENCE TO RELATED APPLICATIONS

This application is a National Stage of International Application No. PCT/KR2020/005803 filed Apr. 29, 2020, claiming priority based on Korean Patent Application No. 10-2019-0064878 filed May 31, 2019.

TECHNICAL FIELD

The present disclosure relates to an electronic brake system and an operation method thereof, and more particularly, to an electronic brake system and an operation method thereof for generating a braking force using an electrical signal corresponding to a displacement of a brake pedal.

BACKGROUND ART

In general, vehicles are essentially equipped with a brake system for performing braking, and various types of brake systems have been proposed for the safety of drivers and passengers.

In a conventional brake system, a method of supplying a hydraulic pressure required for braking to wheel cylinders using a mechanically connected booster when a driver depresses a brake pedal has been mainly used. However, as market demands to implement various braking functions in a detailed response to operation environments of vehicles increase, in recent years, an electronic brake system, that receives an electrical signal corresponding to a pressing force by a driver from a pedal displacement sensor that detects a displacement of a brake pedal when the driver depresses the brake pedal and operates a hydraulic pressure supply device based on the electric signal to supply a hydraulic pressure required for braking to wheel cylinders, have been widely used.

In such an electronic brake system, an electrical signal is generated and provided when a driver depresses the brake pedal in a normal operation mode, and based on the electric signal, the hydraulic pressure supply device is electrically operated and controlled to generate a hydraulic pressure required for braking and transfer the hydraulic pressure to the wheel cylinders. As such, although such an electronic brake system and an operation method are electrically operated and controlled so that complex and various braking operations may be implemented, when a technical problem occurs in an electric component, a hydraulic pressure required for braking may not be stably generated, and thus the safety of passengers may not be secured.

Therefore, the electronic brake system enters an abnormal operation mode when a component fails or becomes out of control, and in this case, a mechanism is required in which the operation of the brake pedal by a driver is directly linked to the wheel cylinders. That is, in the abnormal operation mode in the electronic brake system, as the driver depresses the brake pedal, a hydraulic pressure required for braking needs to be generated immediately and transferred directly to the wheel cylinders.

DISCLOSURE

Technical Problem

The present disclosure is directed to providing an electronic brake system capable of reducing the number of parts to be applied and achieving a miniaturization and lightweight of a product.

The present disclosure is directed to providing an electronic brake system capable of effectively implementing braking in various operating situations.

The present disclosure is directed to providing an electronic brake system capable of stably generating a braking pressure of a high pressure.

The present disclosure is directed to providing an electronic brake system capable of improving performance and operational reliability.

The present disclosure is directed to providing an electronic brake system capable of improving durability of a product by reducing loads applied to components.

The present disclosure is directed to providing an electronic brake system capable of improving easiness of assembly and productivity of a product and reducing a manufacturing cost of the product.

Technical Solution

An aspect of the present disclosure provides an electronic brake system including a reservoir in which a pressurized medium is stored, an integrated master cylinder including a master chamber, a master piston provided in the master chamber to be displaceable by a brake pedal, a first simulation chamber, a first simulation piston provided in the first simulation chamber to be displaceable by a displacement of the master piston or a hydraulic pressure of the pressurized medium accommodated in the master chamber, a second simulation chamber, a second simulation piston provided in the second simulation chamber to be displaceable by a displacement of the first simulation piston or a hydraulic pressure in the first simulation chamber, and an elastic member provided between the first simulation piston and the second simulation piston, a hydraulic pressure supply device provided to generate a hydraulic pressure by operating the hydraulic piston according to an electrical signal output in response to a displacement of the brake pedal, a hydraulic control unit including a first hydraulic circuit provided to control the hydraulic pressure transferred to two wheel cylinders and a second hydraulic circuit provided to control the hydraulic pressure transferred to the other two wheel cylinders, and an electronic control unit provided to control valves based on hydraulic pressure information and displacement information of the brake pedal.

The first hydraulic circuit may include a first inlet valve and a second inlet valve provided to control a flow of the pressurized medium to be supplied to a first wheel cylinder and a second wheel cylinder, respectively, a first outlet valve and a second outlet valve provided to control the flow of the pressurized medium to be discharged from the first wheel cylinder and the second wheel cylinder, respectively, and a discharge valve provided to control the flow of the pressurized medium to be supplied to the reservoir by passing through each of the first outlet valve and the second outlet valve, wherein the discharge valve may be provided as a solenoid valve that is linearly controlled to adjust a flow rate of the pressurized medium.

The integrated master cylinder may further include a simulation flow path connecting the first simulation chamber and the reservoir, and a simulator valve provided in the simulation flow path to control a flow of the pressurized medium.

The electronic brake system may include a first backup flow path connecting the master chamber and the first hydraulic circuit, a second backup flow path connecting the first simulation chamber and the second hydraulic circuit, a first cut valve provided in the first backup flow path to control the flow of the pressurized medium, at least one second cut valve provided in the second backup flow path to control the flow of the pressurized medium, an auxiliary backup flow path connecting the second simulation chamber and the second backup flow path, and an inspection valve provided in the auxiliary backup flow path to control the flow of the pressurized medium.

The hydraulic pressure supply device may include a first pressure chamber provided on one side of the hydraulic piston movably accommodated in the cylinder block to be connected to one or more of the wheel cylinders, and a second pressure chamber provided on the other side of the hydraulic piston to be connected to one or more of the wheel cylinders, and the hydraulic control unit may include a first hydraulic flow path in communication with the first pressure chamber, a second hydraulic flow path in communication with the second pressure chamber, a third hydraulic flow path in which the first hydraulic flow path and the second hydraulic flow path join, a fourth hydraulic flow path branched from the third hydraulic flow path to be connected to the first hydraulic circuit, and a fifth hydraulic flow path branched from the third hydraulic flow path to be connected to the second hydraulic circuit.

The hydraulic control unit may include a first valve provided in the first hydraulic flow path to control the flow of the pressurized medium, a second valve provided in the second hydraulic flow path to control the flow of the pressurized medium, a third valve provided in the fourth hydraulic flow path to control the flow of the pressurized medium, and a fourth valve provided in the fifth hydraulic flow path to control the flow of the pressurized medium.

The first valve may be provided as a check valve allowing only the flow of the pressurized medium discharged from the first pressure chamber, the second valve may be provided as a solenoid valve controlling the flow of the pressurized medium in bidirectional directions, the third valve may be provided as a check valve allowing only the flow of the pressurized medium directing to the first hydraulic circuit from the third hydraulic flow path, and the fourth valve may be provided as a check valve allowing only the flow of the pressurized medium directing to the second hydraulic circuit from the third hydraulic flow path.

The second hydraulic circuit may include a third inlet valve and a fourth inlet valve provided to control the flow of the pressurized medium to be supplied to third wheel cylinder and fourth wheel cylinder, respectively, and the second backup flow path may be provided to connect at least one of downstream sides of the third and fourth inlet valves to the first simulation chamber.

The first valve may be provided as a check valve allowing only the flow of the pressurized medium discharged from the first pressure chamber, the second valve and the fourth valve may be provided as solenoid valves controlling the flow of the pressurized medium in bidirectional directions, and the third valve may be provided as a check valve allowing only the flow of the pressurized medium directing to the first hydraulic circuit from the third hydraulic flow path.

The electronic brake system may further include generators provided in third wheel cylinder and fourth wheel cylinder in the second hydraulic circuit, respectively.

The hydraulic control unit may further include a sixth hydraulic flow path connecting the first hydraulic flow path and the second hydraulic flow path, and a fifth valve provided in the sixth hydraulic flow path to control the flow of the pressurized medium.

The first valve may be provided as a check valve allowing only the flow of the pressurized medium discharged from the first pressure chamber, the second valve may be provided as a check valve allowing only the flow of the pressurized medium discharged from the second pressure chamber, the third valve may be provided as a check valve allowing only the flow of the pressurized medium directing to the first hydraulic circuit from the third hydraulic flow path, the fourth valve may be provided as a check valve allowing only the flow of the pressurized medium directing to the second hydraulic circuit from the third hydraulic flow path, and the fifth valve may be provided as a solenoid valve controlling the flow of the pressurized medium in bidirectional directions.

In a normal operation mode, the first cut valve may be closed to seal the master chamber, the inspection valve may be closed to seal the second simulation chamber, and the second cut valve may be closed but the simulator valve may be opened to communicate the first simulation chamber and the reservoir, so that the first simulation piston may compress the elastic member by an operation of the brake pedal, and an elastic restoring force of the elastic member may be provided to a driver as a pedal feeling.

The normal operation mode, as the hydraulic pressure transferred from the hydraulic pressure supply device to the wheel cylinders increases, may include a first braking mode in which the hydraulic pressure is firstly provided by a forward movement of the hydraulic piston, a second braking mode in which the hydraulic pressure is secondarily provided by a backward movement of the hydraulic piston after the first braking mode, and a third braking mode in which the hydraulic pressure is thirdly provided by the forward movement of the hydraulic piston after the second braking mode.

In the first braking mode, the second valve may be closed, so that the hydraulic pressure generated in the first pressure chamber by the forward movement of the hydraulic piston may be provided to the first hydraulic circuit by sequentially passing through the first hydraulic flow path, the third hydraulic flow path, and the fourth hydraulic flow path, and provided to the second hydraulic circuit by sequentially passing through the first hydraulic flow path, the third hydraulic flow path, and the fifth hydraulic flow path.

In the second braking mode, the second valve may be opened, so that the hydraulic pressure generated in the second pressure chamber by the backward movement of the hydraulic piston after the first braking mode may be provided to the first hydraulic circuit by sequentially passing through the second hydraulic flow path, the third hydraulic flow path, and the fourth hydraulic flow path, and provided to the second hydraulic circuit by sequentially passing through the second hydraulic flow path, the third hydraulic flow path, and the fifth hydraulic flow path.

In the third braking mode, the second valve may be opened, so that a part of the hydraulic pressure generated in the first pressure chamber by the forward movement of the hydraulic piston after the second braking mode may be provided to the first hydraulic circuit by sequentially passing through the first hydraulic flow path, the third hydraulic flow path, and the fourth hydraulic flow path, and provided to the second hydraulic circuit by sequentially passing through the first hydraulic flow path, the third hydraulic flow path, and the fifth hydraulic flow path, and the remaining part of the hydraulic pressure generated in the first pressure chamber may be provided to the second pressure chamber by sequentially passing through the first hydraulic flow path and the second hydraulic flow path.

The first hydraulic circuit may further include a discharge valve provided to control the flow of the pressurized medium to be discharged from the two wheel cylinders to the reservoir, the discharge valve being linearly controlled to adjust a flow rate of the pressurized medium, wherein the second cut valve or the simulator valve may be provided as a solenoid valve that is linearly controlled to adjust the flow rate of the pressurized medium, and wherein when the first to third braking modes are released, a degree of opening of the discharge valve may be controlled, so that the pressurized medium provided to the first hydraulic circuit may be recovered to the reservoir through the discharge valve, and a degree of opening of the second cut valve or the simulator valve may be controlled, so that the pressurized medium provided to the second hydraulic circuit may be recovered to the reservoir by sequentially passing through the first simulation chamber and the simulation flow path.

In the regenerative braking mode by the generator, the fourth valve may be closed, so that the supply of hydraulic pressure from the hydraulic pressure supply device to the third wheel cylinder and the fourth wheel cylinder may be blocked.

The normal operation mode, as the hydraulic pressure transferred from the hydraulic pressure supply device to the wheel cylinders increases, may include a first braking mode in which the hydraulic pressure is firstly provided by a forward movement of the hydraulic piston, a second braking mode in which the hydraulic pressure is secondarily provided by a backward movement of the hydraulic piston after the first braking mode, and a third braking mode in which the hydraulic pressure is thirdly provided by the forward movement of the hydraulic piston after the second braking mode, wherein in the third braking mode, the fifth valve may be opened, so that a part of the hydraulic pressure generated in the first pressure chamber by the forward movement of the hydraulic piston after the second braking mode may be provided to the first hydraulic circuit by sequentially passing through the first hydraulic flow path, the third hydraulic flow path, and the fourth hydraulic flow path, and provided to the second hydraulic circuit by sequentially passing through the first hydraulic flow path, the third hydraulic flow path, and the fifth hydraulic flow path, and the remaining part of the hydraulic pressure generated in the first pressure chamber may be provided to the second pressure chamber by sequentially passing through the first hydraulic flow path, the sixth hydraulic flow path, and the second hydraulic flow path.

Advantageous Effects

An electronic brake system according to the present embodiment can reduce the number of parts to be applied and achieve a miniaturization and lightweight of a product.

The electronic brake system according to the present embodiment can stably and effectively implement braking in various operating situations of a vehicle.

The electronic brake system according to the present embodiment can stably generate a braking pressure of a high pressure.

The electronic brake system according to the present embodiment can improve performance and operational reliability of the product.

The electronic brake system according to the present embodiment can stably provide a braking pressure even when a device fails or a pressurized medium leaks.

The electronic brake system according to the present embodiment can improve durability of the product by reducing loads applied to components.

The electronic brake system according to the present embodiment can improve easiness of assembly and productivity of the product and reduce a manufacturing cost of the product.

DESCRIPTION OF DRAWINGS

FIG. 1 is a hydraulic circuit diagram illustrating an electronic brake system according to a first embodiment of the present disclosure.

FIG. 2 is a hydraulic circuit diagram illustrating that the electronic brake system according to the first embodiment of the present disclosure performs a first braking mode.

FIG. 3 is a hydraulic circuit diagram illustrating that the electronic brake system according to the first embodiment of the present disclosure performs a second braking mode.

FIG. 4 is a hydraulic circuit diagram illustrating that the electronic brake system according to the first embodiment of the present disclosure performs a third braking mode.

FIG. 5 is a hydraulic circuit diagram illustrating that the electronic brake system according to the first embodiment of the present disclosure releases a braking mode.

FIG. 6 is a hydraulic circuit diagram illustrating that the electronic brake system according to the first embodiment of the present disclosure performs an abnormal operation mode (fallback mode).

FIG. 7 is a hydraulic circuit diagram illustrating that the electronic brake system according to the first embodiment of the present disclosure performs an inspection mode.

FIG. 8 is a hydraulic circuit diagram illustrating an electronic brake system according to a second embodiment of the present disclosure.

FIG. 9 is a hydraulic circuit diagram illustrating that the electronic brake system according to the second embodiment of the present disclosure performs a regenerative braking mode.

FIG. 10 is a hydraulic circuit diagram illustrating an electronic brake system according to a third embodiment of the present disclosure.

FIG. 11 is a hydraulic circuit diagram illustrating that the electronic brake system according to the third embodiment of the present disclosure performs a first braking mode.

FIG. 12 is a hydraulic circuit diagram illustrating that the electronic brake system according to the third embodiment of the present disclosure performs a second braking mode.

FIG. 13 is a hydraulic circuit diagram illustrating that the electronic brake system according to the third embodiment of the present disclosure performs a third braking mode.

FIG. 14 is a hydraulic circuit diagram illustrating an electronic brake system according to a fourth embodiment of the present disclosure.

MODE OF THE DISCLOSURE

Hereinafter, an embodiment of the present disclosure will be described in detail with reference to the accompanying drawings. The following embodiment is provided to fully convey the spirit of the present disclosure to a person having ordinary skill in the art to which the present disclosure belongs. The present disclosure is not limited to the embodiment shown herein but may be embodied in other forms. The drawings are not intended to limit the scope of the present disclosure in any way, and the size of components may be exaggerated for clarity of illustration.

FIG. 1 is a hydraulic circuit diagram illustrating an electronic brake system 1000 according to a first embodiment of the present disclosure.

Referring to FIG. 1, the electronic brake system 1000 according to the first embodiment of the present disclosure includes a reservoir 1100 in which a pressurized medium is stored, an integrated master cylinder 1200 provided to provide a reaction force against pressing of a brake pedal 10 to a driver and pressurize and discharge the pressurized medium such as brake oil accommodated therein, a hydraulic pressure supply device 1300 provided to receive an electrical signal corresponding to a pressing force by a driver from a pedal displacementsensor 11 that detects a displacement of the brake pedal 10 and to generate a hydraulic pressure of the pressurized medium through a mechanical operation, a hydraulic control unit 1400 provided to control the hydraulic pressure provided from the hydraulic pressure supply device 1300, hydraulic circuits 1510 and 1520 having wheel cylinders 20 for braking respective wheels RR, RL, FR, and FL as the hydraulic pressure of the pressurized medium is transferred, a dump controller 1800 provided between the hydraulic pressure supply device 1300 and the reservoir 1100 to control a flow of the pressurized medium, backup flow paths 1610 and 1620 are provided to hydraulically connect the integrated master cylinder 1200 and the hydraulic circuits 1510 and 1520, a reservoir flow path 1700 provided to hydraulically connect the reservoir 1100 and the integrated master cylinder 1200, and an electronic control unit (ECU, not shown) provided to control the hydraulic pressure supply device 1300 and various valves based on hydraulic pressure information and pedal displacement information.

The integrated master cylinder 1200 includes simulation chambers 1230a and 1240a, and a master chamber 1220a to, when the driver presses the brake pedal 10 for braking operation, provide a reaction force against the pressing to the driver to provide a stable pedal feel, and at the same time pressurize and discharge the pressurized medium accommodated therein.

The integrated master cylinder 1200 may be divided into a pedal simulation part to provide a pedal feel to the driver, and a master cylinder part to transfer the pressurized medium to the first hydraulic circuit 1510 side, which will be described later. The integrated master cylinder 1200 may be configured such that the master cylinder part and the pedal simulation part are sequentially provided from the brake pedal 10 side and disposed coaxially within a cylinder block 1210.

Specifically, the integrated master cylinder 1200 may include the cylinder block 1210 having a chamber formed therein, the master chamber 1220a formed on an inlet side of the cylinder block 1210 to which the brake pedal 10 is connected, a master piston 1220 provided in the master chamber 1220a and connected to the brake pedal 10 to be displaceable depending on the operation of the brake pedal 10, a piston spring 1220b provided to elastically support the master piston 1220, the first simulation chamber 1230a formed more inside than the master chamber 1220a on the cylinder block 1210, a first simulation piston 1230 provided in the first simulation chamber 1230a to be displaceable by a displacement of the master piston 1220 or a hydraulic pressure of the pressurized medium accommodated in the master chamber 1220a, the second simulation chamber 1240a formed more inside than the first simulation chamber 1230a on the cylinder block 1210, a second simulation piston 1240 provided in the second simulation chamber 1240a to be displaceable by a displacement of the first simulation chamber 1230a or a hydraulic pressure of the pressurized medium accommodated in the first simulation chamber 1230a, an elastic member 1250 disposed between the first simulation piston 1230 and the second simulation piston 1240 to provide a pedal feeling through an elastic restoring force generated during compression, a simulator spring 1270 provided to elastically support the second simulation piston 1240, a simulation flow path 1260 provided to connect the first simulation chamber 1230a and the reservoir 1100, and a simulator valve 1261 provided in the simulation flow path 1260 to control the flow of the pressurized medium.

The master chamber 1220a, the first simulation chamber 1230a, and the second simulation chamber 1240a may be sequentially formed toward the inside (left side of FIG. 1) from the brake pedal 10 side (right side of FIG. 1) on the cylinder block 1210 of the integrated master cylinder 1200. Also, the master piston 1220, the first simulation piston 1230, and the second simulation piston 1240 are disposed in the master chamber 1220a, the first simulation chamber 1230a, and the second simulation chamber 1240a, respectively, to generate a hydraulic pressure or a negative pressure by the pressurized medium accommodated in the respective chambers depending on forward or backward movement.

The master chamber 1220a may be formed on the inlet side or the outermost side (right side of FIG. 1) of the cylinder block 1210, and the master piston 1220 connected to the brake pedal 10 via an input rod 12 may be accommodated in the master chamber 1220a to enable reciprocating movement.

The pressurized medium may be introduced into and discharged from the master chamber 1220a through a first hydraulic port 1280a and a second hydraulic port 1280b. The first hydraulic port 1280a is connected to a first reservoir flow path 1710, which will be described later, so that the pressurized medium may be introduced into the master chamber 1220a from the reservoir 1100, and the second hydraulic port 1280b is connected to a first backup flow path 1610, which will be described later, so that the pressurized medium may be discharged into the first backup flow path 1610 side from the master chamber 1220a, or conversely, the pressurized medium may be introduced into the master chamber 1220a side from the first backup flow path 1610. A pair of sealing members 1290a are provided in front and rear of the first hydraulic port 1280a to prevent leakage of the pressurized medium. The pair of sealing members 1290a may allow the flow of the pressurized medium directing to the first master chamber 1220a from the reservoir 1100 through the first reservoir flow path 1710 while blocking the flow of the pressurized medium directing to the first reservoir flow path 1710 from the first master chamber 1220a.

The master piston 1220 may be accommodated in the master chamber 1220a to generate a hydraulic pressure by pressurizing the pressurized medium accommodated in the master chamber 1220a by moving forward (left direction of FIG. 1) or to generate a negative pressure inside the master chamber 1220a by moving backward (right direction of FIG. 1). The master piston 1220 may be elastically supported by the piston spring 1220b, and the piston spring 1220b may be provided with one end supported by the cylinder block 1210 and the other end supported by a flange portion formed by extending outwardly from an end of the master piston 1220.

The first simulation chamber 1230a may be formed at an inner side (left side of FIG. 1) of the master chamber 1220a on the cylinder block 1210, and the first simulation piston 1230 may be accommodated in the first simulation chamber 1230a to enable reciprocating movement.

The pressurized medium may be introduced into and discharged from the first simulation chamber 1230a through a third hydraulic port 1280c and a fourth hydraulic port

1280*d*. The third hydraulic port 1280*c* is connected to a second reservoir flow path 1720 and the simulation flow path 1260, which will be described later, so that the pressurized medium accommodated in the first simulation chamber 1230*a* may be discharged into the reservoir 1100 side, or conversely, the pressurized medium may be introduced from the reservoir 1100. The fourth hydraulic port 1280*d* is connected to the second backup flow path 1620, which will be described later, so that the pressurized medium accommodated in the first simulation chamber 1230*a* may be discharged into the second hydraulic circuit 1520 side, or conversely, the pressurized medium may be introduced into the first simulation chamber 1230*a* side from the second backup flow path 1620.

The first simulation piston 1230 may be accommodated in the first simulation chamber 1230*a* to generate a hydraulic pressure of the pressurized medium accommodated in the first simulation chamber 1230*a* or press the elastic member 1250, which will be described later, by moving forward, or to generate a negative pressure inside the first simulation chamber 1230*a* or return the elastic member 1250 to an original position and shape thereof by moving backward. At least one sealing member 1290*b* may be provided between an inner wall of the cylinder block 1210 and an outer circumferential surface of the first simulation piston 1230 to prevent leakage of the pressurized medium between the adjacent chambers.

A step portion formed to be stepped may be provided at a portion where the first simulation chamber 1230*a* is formed on the cylinder block 1210, and an extension portion provided to be caught on the step portion by expanding outwardly may be provided on the outer circumferential surface of the first simulation piston 1230. As the extension portion of the first simulation piston 1230 is provided to be caught on the step portion of the cylinder block 1210, in order for the first simulation piston 1230 to return to an original position thereof after moving forward by the operation of the brake pedal 10, a backward stroke degree of the first simulation piston 1230 when moving backward may be limited.

The second simulation chamber 1240*a* may be formed at an inner side (left side of FIG. 1) of the first simulation chamber 1230*a* on the cylinder block 1210, and the second simulation piston 1240 may be accommodated in the second simulation chamber 1240*a* to enable reciprocating movement.

The pressurized medium may be introduced into and discharged from the second simulation chamber 1240*a* through a fifth hydraulic port 1280*e* and a sixth hydraulic port 1280*f*. Specifically, the fifth hydraulic port 1280*e* is connected to a third reservoir flow path 1730, which will be described later, so that the pressurized medium may be introduced into the second simulation chamber 1240*a* side from the reservoir 1100 or discharged from the second simulation chamber 1240 to the reservoir 1100 side. The sixth hydraulic port 1280*f* is connected to an auxiliary backup flow path 1630, which will be described later, so that the pressurized medium accommodated in the second simulation chamber 1240*a* may be discharged into the second backup flow path 1620 side, or conversely, the pressurized medium may be introduced into the second simulation chamber 1240*a* side from the second backup flow path 1620 side.

The second simulation piston 1240 may be accommodated in the second simulation chamber 1240*a* to generate a hydraulic pressure of the pressurized medium accommodated in the second simulation chamber 1240*a* by moving forward, or to generate a negative pressure inside the second simulation chamber 1240*a* by moving backward. At least one sealing member 1290*c* may be provided between the inner wall of the cylinder block 1210 and an outer circumferential surface of the second simulation piston 1240 to prevent leakage of the pressurized medium between the adjacent chambers. The sealing member 1290*c* may allow the flow of the pressurized medium directing to the second simulation chamber 1240*a* from the reservoir 1100 through the third reservoir flow path 1730 while blocking the flow of the pressurized medium directing to the third reservoir flow path 1730 from the second simulation chamber 1240*a*.

The integrated master cylinder 1200 according to the present embodiment may secure safety in the event of a failure of a device by including the master chamber 1220*a* and the simulation chambers 1230*a* and 1240*a*. For example, the master chamber 1220*a* may be connected to the wheel cylinders 20 of any two of a right front wheel FR, a left front wheel FL, a left rear wheel RL, and a right rear wheel RR through the first backup flow path 1610, which will be described later, and the simulation chambers 1230*a* and 1240*a* may be connected to the wheel cylinders 20 of the other two through the second backup flow path 1620 and the auxiliary backup flow path 1630, which will be described later, and thus even when a problem such as a leak in any one of the chambers occurs, it may be possible to brake the vehicle. A detailed description thereof will be given later with reference to FIG. 6.

The elastic member 1250 is interposed between the first simulation piston 1230 and the second simulation piston 1240 to provide a pedal feeling of the brake pedal 10 to the driver by its own elastic restoring force. The elastic member 1250 may be made of a material such as compressible and expandable rubber, and when a displacement occurs in the first simulation piston 1230 by the operation of the brake pedal 10, but when the second simulation piston 1240 is maintained in an original position thereof, the elastic member 1250 is compressed, and the driver may receive a stable and familiar pedal feeling by the elastic restoring force of the compressed elastic member 1250. A detailed description thereof will be given later.

Accommodating grooves recessed in a shape corresponding to the shape of the elastic member 1250 to facilitate smooth compression and deformation of the elastic member 1250 may be provided on a rear surface (left surface of FIG. 1) of the first simulation piston 1230 and a front surface (right surface of FIG. 1) of the second simulation piston 1240, which face the elastic member 1250, respectively.

The simulator spring 1270 is provided to elastically support the second simulation piston 1240. The simulator spring 1270 has one end supported by the cylinder block 1210 and the other end supported by the second simulation piston 1240, thereby resiliently supporting the second simulation piston 1240. When the second simulation piston 1240 moves forward according to a braking operation to generate a displacement, the simulator spring 1270 is compressed, and thereafter, when the braking is released, as the simulator spring 1270 expands by an elastic force thereof, the second simulation piston 1240 may return to the original position.

The simulation flow path 1260 is provided such that the first simulation chamber 1230*a* and the reservoir 1100 are in communication with each other, and the simulator valve 1261 for controlling bidirectional flows of the pressurized medium may be provided in the simulation flow path 1260. The simulator valve 1261 may be provided as a normally closed type solenoid valve that operates to be opened when an electric signal is received from the electronic control unit in a normally closed state. The simulator valve 1261 may be opened in a normal operation mode of the electronic brake system 1000.

Explaining a pedal simulation operation by the integrated master cylinder 1200, at the same time as the driver operates the brake pedal 10 in a normal operation, a first cut valve 1611 and a second cut valve 1621 provided in the first backup flow path 1610 and the second backup flow path 1620, which will be described later, respectively, are closed, while the simulator valve 1261 in the simulation flow path 1260 is opened. As the operation of the brake pedal 10 progresses, the master piston 1220 moves forward, but the master chamber 1220*a* is sealed by a closing operation of the first cut valve 1611, so that as the hydraulic pressure of the pressurized medium accommodated in the master chamber 1220*a* is transferred to the first simulation piston 1230, the first simulation piston 1230 moves forward to generate a displacement. On the other hand, as the second cut valve 1621 is closed, the second simulation chamber 1240*a* is sealed so that a displacement of the second simulation piston 1240 is not generated, and thus the elastic member 1250 is compressed by the displacement of the first simulation piston 1230, and the elastic restoring force by compression of the elastic member 1250 may be provided to the driver as the pedal feeling. At this time, the pressurized medium accommodated in the first simulation chamber 1230*a* is transferred to the reservoir 1100 through the simulation flow path 1260. Thereafter, when the driver releases the pressing force of the brake pedal 10, the piston spring 1220*b* and the elastic member 1250 return to the original shape and position thereof by the elastic restoring force, and the first simulation chamber 1230*a* may be filled with the pressurized medium supplied from the reservoir 1100 through the simulation flow path 1260.

As such, because the insides of the first simulation chamber 1230*a* and the second simulation chamber 1240*a* are always filled with the pressurized medium, when the pedal simulation is operated, friction of the first simulation piston 1230 and the second simulation piston 1240 is minimized, so that the durability of the integrated master cylinder 1200 is improved and at the same time the inflow of foreign substances from the outside may be blocked.

A case in which the electronic brake system 1000 operates abnormally, that is, an operation of the integrated master cylinder 1200 in a fallback mode will be described later with reference to FIG. 6.

The reservoir 1100 may accommodate and store the pressurized medium therein. The reservoir 1100 may be connected to each component such as the integrated master cylinder 1200, the hydraulic pressure supply device 1300, which will be described later, and the hydraulic circuits, which will be described later, to supply or receive the pressurized medium. Although a plurality of the reservoirs 1100 is shown with the same reference numeral in the drawings, this is only an example for better understanding of the present disclosure, and the reservoir 1100 may be provided as a single component, or a plurality of the separate and independent reservoirs 1100 may be provided.

The reservoir flow path 1700 is provided to connect the integrated master cylinder 1200 and the reservoir 1100.

The reservoir flow path 1700 may include the first reservoir flow path 1710 connecting the master chamber 1220*a* and the reservoir 1100, the second reservoir flow path 1720 connecting the first simulation chamber 1230*a* and the reservoir 1100, and the third reservoir flow path 1730 connecting the second simulation chamber 1240*a* and the reservoir 1100. To this end, one end of the first reservoir flow path 1710 may communicate with the master chamber 1220*a* of the integrated master cylinder 1200 and the other end thereof may communicate with the reservoir 1100, one end of the second reservoir flow path 1720 may communicate with the first simulation chamber 1230*a* of the integrated master cylinder 1200 and the other end thereof may communicate with the reservoir 1100, and one end of the third reservoir flow path 1730 may communicate with the second simulation chamber 1240*a* of the integrated master cylinder 1200 and the other end thereof may communicate with the reservoir 1100. As shown in the drawing, the second reservoir flow path 1720 may be connected to the reservoir 1100 as the simulation flow path 1260 is branched from the second reservoir flow path 1720 and rejoins the second reservoir flow path 1720, but is not limited thereto, and the second reservoir flow path 1720 and the simulation flow path 1260 may be connected to the reservoir 1100 independently of each other.

A reservoir valve 1721 for controlling a flow of a braking fluid transferred through the second reservoir flow path 1720 may be provided in the second reservoir flow path 1720. The reservoir valve 1721 may be provided as a check valve allowing the flow of the pressurized medium directing to the first simulation chamber 1230*a* from the reservoir 1100 while blocking the flow of the pressurized medium directing to the reservoir 1100 from the first simulation chamber 1230*a*.

The hydraulic pressure supply device 1300 is provided to receive an electrical signal corresponding to a pressing force of the driver from the pedal displacement sensor 11 detecting a displacement of the brake pedal 10 and to generate a hydraulic pressure of the pressurized medium through a mechanical operation.

The hydraulic pressure supply device 1300 may include a hydraulic pressure providing unit to provide a pressure to the pressurized medium to be transferred to the wheel cylinders 20, a motor (not shown) to generate a rotational force by an electrical signal from the pedal displacement sensor 11, and a power conversion unit (not shown) to convert a rotational motion of the motor into a linear motion to provide the linear motion to the hydraulic pressure providing unit.

The hydraulic pressure providing unit includes a cylinder block 1310 provided such that the pressurized medium may be accommodated, a hydraulic piston 1320 accommodated in the cylinder block 1310, a sealing member 1350 provided between the hydraulic piston 1320 and the cylinder block 1310 to seal the pressure chambers 1330 and 1340, and a drive shaft 1390 to transfer power output from the power conversion unit to the hydraulic piston 1320.

The pressure chambers 1330 and 1340 may include the first pressure chamber 1330 located in the front of the hydraulic piston 1320 (left direction of the hydraulic piston 1320 in FIG. 1), and the second pressure chamber 1340 located in the rear of the hydraulic piston 1320 (right direction of the hydraulic piston 1320 in FIG. 1). That is, the first pressure chamber 1330 is provided to be partitioned by the cylinder block 1310 and a front surface of the hydraulic piston 1320 so that a volume thereof varies depending on the movement of the hydraulic piston 1320, and the second pressure chamber 1340 is provided to be partitioned by the cylinder block 1310 and a rear surface of the hydraulic piston 1320 so that a volume thereof varies depending on the movement of the hydraulic piston 1320.

The first pressure chamber 1330 is connected to a first hydraulic flow path 1401, which will be described later, through a first communication hole 1360*a* formed on the cylinder block 1310, and the second pressure chamber 1340 is connected to a second hydraulic flow path 1402, which will be described later, through a second communication hole 1360b formed on the cylinder block 1310.

The sealing members include a piston sealing member 1350a provided between the hydraulic piston 1320 and the cylinder block 1310 to seal between the first pressure chamber 1330 and the second pressure chamber 1340, and a drive shaft sealing member 1350b provided between the drive shaft 1390 and the cylinder block 1310 to seal between the second pressure chamber 1340 and an opening of the cylinder block 1310. The hydraulic pressure or negative pressure of the first pressure chamber 1330 and the second pressure chamber 1340 generated by the forward or backward movement of the hydraulic piston 1320 may not leak by being sealed by the piston sealing member 1350a and the drive shaft sealing member 1350b and may be transferred to the first hydraulic flow path 1401 and the second hydraulic flow path 1402, which will be described later.

The motor (not shown) is provided to generate a driving force of the hydraulic piston 1320 by an electric signal output from the electronic control unit. The motor may include a stator and a rotor, and through this configuration, may provide power to generate a displacement of the hydraulic piston 1320 by rotating in a forward or reverse direction. A rotational angular speed and a rotational angle of the motor may be precisely controlled by a motor control sensor. Because the motor is a well-known technology, a detailed description thereof will be omitted.

The power conversion unit (not shown) is provided to convert a rotational force of the motor into a linear motion. The power conversion unit may be provided as a structure including, for example, a worm shaft (not shown), a worm wheel (not shown), and the drive shaft 1390.

The worm shaft may be integrally formed with a rotation shaft of the motor and may rotate the worm wheel by a worm formed on an outer circumferential surface thereof to be engaged with the worm wheel. The worm wheel may linearly move the drive shaft 1390 by being connected to be engaged with the drive shaft 1390, and the drive shaft 1390 is connected to the hydraulic piston 1320 so that the hydraulic piston 1320 may be slidably moved within the cylinder block 1310.

Explaining the above operations again, when the displacement of the brake pedal 10 is detected by the pedal displacement sensor 11, the detected signal is transferred to the electronic control unit, and the electronic control unit drives the motor to rotate the worm shaft in one direction. The rotational force of the worm shaft is transferred to the drive shaft 1390 via the worm wheel, and the hydraulic piston 1320 connected to the drive shaft 1390 moves forward in the cylinder block 1310, thereby generating a hydraulic pressure in the first pressure chamber 1330.

Conversely, when the pressing force of the brake pedal 10 is released, the electronic control unit drives the motor to rotate the worm shaft in the opposite direction. Accordingly, the worm wheel also rotates in the opposite direction, and the hydraulic piston 1320 connected to the drive shaft 1390 moves backward in the cylinder block 1310, thereby generating a negative pressure in the first pressure chamber 1330.

The generation of a hydraulic pressure and negative pressure in the second pressure chamber 1340 may be implemented by operating opposite to the above operations. That is, when the displacement of the brake pedal 10 is detected by the pedal displacement sensor 11, the detected signal is transferred to the electronic control unit, and the electronic control unit drives the motor to rotate the worm shaft in the opposite direction. The rotational force of the worm shaft is transferred to the drive shaft 1390 via the worm wheel, and the hydraulic piston 1320 connected to the drive shaft 1390 moves backward within the cylinder block 1310, thereby generating a hydraulic pressure in the second pressure chamber 1340.

Conversely, when the pressing force of the brake pedal 10 is released, the electronic control unit drives the motor to rotate the worm shaft in one direction. Accordingly, the worm wheel also rotates in one direction, and the hydraulic piston 1320 connected to the drive shaft 1390 moves forward in the cylinder block 1310, thereby generating a negative pressure in the second pressure chamber 1340.

As such, the hydraulic pressure supply device 1300 may generate a hydraulic pressure or negative pressure in the first pressure chamber 1330 and the second pressure chamber 1340, respectively, depending on the rotation direction of the worm shaft by the operation of the motor, and whether a hydraulic pressure is transferred to the chambers to perform braking, or whether a negative pressure is generated in the chambers to release braking may be determined by controlling the valves. A detailed description thereof will be given later.

The power conversion unit according to the present embodiment is not limited to any one structure as long as it may convert the rotational motion of the motor into the linear motion of the hydraulic piston 1320, and may include devices having various structures and manners.

The hydraulic pressure supply device 1300 may be hydraulically connected to the reservoir 1100 by the dump controller 1800. The dump controller 1800 may include a first dump flow path 1810 connecting the first pressure chamber 1330 and the reservoir 1100, and a second dump flow path 1820 connecting the second pressure chamber 1340 and the reservoir 1100.

A first dump check valve 1811 and a second dump check valve 1821 for controlling the flow of the pressurized medium may be provided in the first dump flow path 1810 and the second dump flow path 1820, respectively. The first dump check valve 1811 may be provided to allow only the flow of the pressurized medium directing to the first pressure chamber 1330 from the reservoir 1100 and block the flow of the pressurized medium in the opposite direction, and the second dump check valve 1821 may be provided to allow only the flow of the pressurized medium directing to the second pressure chamber 1340 from the reservoir 1100 and block the flow of the pressurized medium in the opposite direction.

The hydraulic control unit 1400 may be provided to control a hydraulic pressure transferred to the respective wheel cylinders 20, and the electronic control unit (ECU) is provided to control the hydraulic pressure supply device 1300 and various valves based on the hydraulic pressure information and pedal displacement information.

The hydraulic control unit 1400 may include the first hydraulic circuit 1510 for controlling the flow of the hydraulic pressure to be transferred to first and second wheel cylinders 21 and 22 among the four wheel cylinders 20, and the second hydraulic circuit 1520 for controlling the flow of the hydraulic pressure to be transferred to third and fourth wheel cylinders 23 and 24, and includes a plurality of flow paths and valves to control the hydraulic pressure to be transferred from the hydraulic pressure supply device 1300 to the wheel cylinders 20.

The first hydraulic flow path 1401 is provided to be in communication with the first pressure chamber 1330, and the second hydraulic flow path 1402 is provided to be in communication with the second pressure chamber 1340. The first hydraulic flow path 1401 and the second hydraulic flow path 1402 may be provided to join in a third hydraulic flow path 1403, and then may be formed to be branched into a fifth hydraulic flow path 1405 and a sixth hydraulic flow path 1406 to be respectively connected to the first hydraulic circuit 1510 and the second hydraulic circuit 1520.

A first valve 1411 for controlling the flow of the pressurized medium may be provided in the first hydraulic flow path 1401. The first valve 1411 may be provided as a check valve allowing only the flow of the pressurized medium directing to the third hydraulic flow path 1403 from the first pressure chamber 1330 and blocking the flow of the pressurized medium in the opposite direction. A second valve 1412 for controlling the flow of the pressurized medium is provided in the second hydraulic flow path 1402, and the second valve 1412 may be provided as a bidirectional control valve for controlling the flow of the pressurized medium transferred along the second hydraulic flow path 1402. The second valve 1412 may be provided as a normally closed type solenoid valve that operates to be opened when an electric signal is received from the electronic control unit in a normally closed state. The second valve 1412 may be controlled to be opened in a second braking mode and a third braking mode in the normal operation mode of the electronic brake system 1000. A detailed description thereof will be given later with reference to FIGS. 3 and 4.

The first hydraulic flow path 1401 and the second hydraulic flow path 1402 may be joined to form the third hydraulic flow path 1403, and the third hydraulic flow path 1403 is formed to be branched into a fourth hydraulic flow path 1404 connected to the first hydraulic circuit 1510 and the fifth hydraulic flow path 1405 connected to the second hydraulic circuit 1520.

A third valve 1413 for controlling the flow of the pressurized medium may be provided in the fourth hydraulic flow path 1404. The third valve 1413 may be provided as a check valve allowing only the flow of the pressurized medium directing to the first hydraulic circuit 1510 from the third hydraulic flow path 1403 and blocking the flow of the pressurized medium in the opposite direction. A fourth valve 1414 for controlling the flow of the pressurized medium may be provided in the fifth hydraulic flow path 1405, and the fourth valve 1414 may be provided as a check valve allowing only the flow of the pressurized medium directing to the second hydraulic circuit 1520 from the third hydraulic flow path 1403 and blocking the flow of the pressurized medium in the opposite direction.

By the arrangement of the hydraulic flow paths and valves of the hydraulic control unit 1400 as described above, the hydraulic pressure generated in the first pressure chamber 1330 according to the forward movement of the hydraulic piston 1320 may be transferred to the first hydraulic circuit 1510 by sequentially passing through the first hydraulic flow path 1401, the third hydraulic flow path 1403, and the fourth hydraulic flow path 1404, and may be transferred to the second hydraulic circuit 1520 by sequentially passing through the first hydraulic flow path 1401, the third hydraulic flow path 1403, and the fifth hydraulic flow path 1405. Also, the hydraulic pressure formed in the second pressure chamber 1340 according to the backward movement of the hydraulic piston 1320 may be transferred to the first hydraulic circuit 1510 by sequentially passing through the second hydraulic flow path 1402, the third hydraulic flow path 1403, and the fourth hydraulic flow path 1404, and may be transferred to the second hydraulic circuit 1520 by sequentially passing through the second hydraulic flow path 1402, the third hydraulic flow path 1403, and the fifth hydraulic flow path 1405.

Conversely, a negative pressure may be generated in the first pressure chamber 1330 according to the backward movement of the hydraulic piston 1320, and thus the pressurized medium may be supplied from the reservoir 1100 to the first pressure chamber 1330 through the first dump flow path 1810. Also, a negative pressure may be generated in the second pressure chamber 1340 according to the forward movement of the hydraulic piston 1320, and thus the pressurized medium may be supplied from the reservoir 1100 to the second pressure chamber 1340 through the second dump flow path 1820.

A detailed description of the transfer of the hydraulic pressure and negative pressure by the arrangement of these hydraulic flow paths and valves will be given later with reference to FIGS. 2 to 5.

The first hydraulic circuit 1510 of the hydraulic control unit 1400 may control the hydraulic pressure in the first wheel cylinder 21 and the second wheel cylinder 22, which are the two wheel cylinders 20 among the four wheels RR, RL, FR, and FL, and the second hydraulic circuit 1520 may control the hydraulic pressure in the third and fourth wheel cylinders 23 and 24 which are the other two wheel cylinders 20.

The first hydraulic circuit 1510 receives the hydraulic pressure through the fourth hydraulic flow path 1404, and the fourth hydraulic flow path 1404 may be formed to be branched into two flow paths connected to the first wheel cylinder 21 and the second wheel cylinder 22. Also, the second hydraulic circuit 1520 receives the hydraulic pressure through the fifth hydraulic flow path 1405, and the fifth hydraulic flow path 1405 may be formed to be branched into two flow paths connected to the third wheel cylinder 23 and the fourth wheel cylinder 242.

The first and second hydraulic circuits 1510 and 1520 may include first to fourth inlet valves 1511a, 1511b, 1521a, and 1521b, respectively, to control the flow and hydraulic pressure of the pressurized medium to be transferred to the first to fourth wheel cylinders 21 to 24. The first to fourth inlet valves 1511a, 1511b, 1521a, and 1521b are disposed on upstream sides of the first to fourth wheel cylinders 20, respectively, and may be provided as a normally open type solenoid valve that operates to be closed when an electric signal is received from the electronic control unit in a normally open state.

The first and second hydraulic circuits 1510 and 1520 may include first to fourth check valves 1513a, 1513b, 1523a, and 1523b provided to be connected in parallel with respect to the first to fourth inlet valves 1511a, 1511b, 1521a, and 1521b. The check valves 1513a, 1513b, 1523a, and 1523b may be provided in bypass flow paths connecting front sides and rear sides of the first to fourth inlet valves 1511a, 1511b, 1521a, and 1521b on the first and second hydraulic circuits 1510 and 1520, and may allow only the flow of pressurized medium from each of the wheel cylinders 20 to the hydraulic pressure supply device 1300 while blocking the flow of the pressurized medium from the hydraulic pressure supply device 1300 to the wheel cylinders 20. By the first to fourth check valves 1513a, 1513b, 1523a, and 1523b, the hydraulic pressure of the pressurized medium applied to each of the wheel cylinders 20 may be quickly released, and even when the first to fourth inlet valves 1511a, 1511b, 1521a, and 1521b do not operate normally, the hydraulic pressure of the pressurized medium applied to the wheel cylinders 20 may be smoothly returned to the hydraulic pressure providing unit.

The first hydraulic circuit 1510 may include first and second outlet valves 1512a and 1512b for controlling the flow of the pressurized medium discharged from the first and second wheel cylinders 21 and 22 to improve performance when braking of the first and second wheel cylinders 21 and 22 is released. The first and second outlet valves 1512a and 1512b are provided on discharge sides of the first and second wheel cylinders 21 and 22, respectively, to control the flow of the pressurized medium transferred from the first and second wheel cylinders 21 and 22 to a discharge valve 1550, which will be described late. The first and second outlet valves 1512a and 1512b may be provided as normally open type solenoid valves that operate to be closed when an electric signal is received from the electronic control unit in a normally open state.

The discharge valve 1550 is provided to control the flow of the pressurized medium recovered from the first and second outlet valves 1512a and 1512b to the reservoir 1100. To this end, the discharge valve 1550 may be provided between the first and second outlet valves 1512a and 1512b and the reservoir 1100, is provided as a normally closed type valve that operates to be opened when an electric signal is received from the electronic control unit in a normally closed state, and may be provided as a solenoid valve in which an opening degree thereof is linearly adjustable to control a flow rate of the pressurized medium discharged from the first and second outlet valves 1512a and 1512b to the reservoir 1100. The discharge valve 1550 may discharge the hydraulic pressure of the pressurized medium applied to the first and second wheel cylinders 21 and 22 to the reservoir 1100 side by adjusting the opening degree in the normal operation mode of the electromagnetic brake system 1000, thereby performing a pressure reduction braking or a braking release. A release of the braking modes of the electromagnetic brake system 1000 by the discharge valve 1550 will be described later with reference to FIG. 5.

The second backup flow path 1620, which will be described later, may be branched and connected to the third and fourth wheel cylinders 23 and 24 of the second hydraulic circuit 1520, and the second cut valve 1621 may be provided in the second backup flow path 1620 to control the flow of the pressurized medium between the third and fourth wheel cylinders 23 and 24 and the integrated master cylinder 1200.

The electronic brake system 1000 according to the present embodiment may include the first and second backup flow paths 1610 and 1620 and the auxiliary backup flow path 1630 to implement braking by directly supplying the pressurized medium discharged from the integrated master cylinder 1200 to the wheel cylinders 20 when the normal operation is impossible due to a device failure or the like. A mode in which the hydraulic pressure in the integrated master cylinder 1200 is directly transferred to the wheel cylinders 20 is referred to as an abnormal operation mode, that is, a fallback mode.

The first backup flow path 1610 may be provided to connect the master chamber 1220a of the integrated master cylinder 1200 and the first hydraulic circuit 1510, and the second backup flow path 1620 may be provided to connect the first simulation chamber 1230a of the integrated master cylinder 1200 and the second hydraulic circuit 1520. The auxiliary backup flow path 1630 is provided to connect the second simulation chamber 1240a of the integrated master cylinder 1200 and the second backup flow path 1620.

Specifically, the first backup flow path 1610 may have one end connected to the master chamber 1220a and the other end connected between the first inlet valve 1511a and the first outlet valve 1512a on the first hydraulic circuit 1510, and the second backup flow path 1620 may have one end connected to the first simulation chamber 1230a and the other end connected to downstream sides of the third and fourth inlet valves 1521a and 1521b on the second hydraulic circuit 1520. Although FIG. 1 illustrates that the first backup flow path 1610 is connected between the first inlet valve 1511a and the first outlet valve 1512a, the first backup flow path 1610 may be branched and connected to at least one of upstream sides of the first outlet valve 1512a and the second outlet valve 1512b. The auxiliary backup flow path 1630 has one end connected to the second simulation chamber 1240a and the other end provided to join the second backup flow path 1620, so that the pressurized medium accommodated in the second simulation chamber 1240a may be transferred to the second backup flow path 1620.

The first cut valve 1611 for controlling the bidirectional flows of the pressurized medium may be provided in the first backup flow path 1610, and the at least one second cut valve 1621 for controlling the bidirectional flows of the pressurized medium may be provided in the second backup flow path 1620. The first cut valve 1611 and the second cut valve 1621 may be provided as normally open type solenoid valves that operate to be closed when a closing signal is received from the electronic control unit in a normally open state.

An inspection valve 1631 for controlling the bidirectional flows of the pressurized medium is provided in the auxiliary backup flow path 1630, and the inspection valve 1631 may be provided as a normally open type solenoid valve that operates to be closed when a closing signal is received from the electronic control unit in a normally open state. The inspection valve 1631 may be closed in the normal operation of the electronic brake system 1000 to seal the second simulation chamber 1240a, and may be closed in an inspection mode of inspecting whether a leak occurs in the integrated master cylinder 1200 or the simulator valve 1261. A detailed description thereof will be given later.

Accordingly, when the first and second cut valves 1621 are closed, the pressurized medium in the integrated master cylinder 1200 may be prevented from being directly transferred to the wheel cylinders 20, and at the same time the hydraulic pressure provided from the hydraulic pressure supply device 1300 may be supplied to the first and second hydraulic circuits 1510 and 1520 side through the hydraulic control unit 1400, and when the first and second cut valves 1611 and 1612 and inspection valve 1631 are opened, the pressurized medium pressurized in the integrated master cylinder 1200 may be directly supplied to the first and second hydraulic circuits 1510 and 1520 side through the first and second backup flow paths 1620 and the auxiliary backup flow path 1630, thereby performing braking.

The electronic brake system 1000 according to the present embodiment may include a pressure sensor PS to detect a hydraulic pressure in at least one of the first hydraulic circuit 1510 and the second hydraulic circuit 1520. The drawing illustrates that the pressure sensor PS is provided in the second hydraulic circuit 1520 side, but the pressure sensor is not limited to the above position and number, and as long as the hydraulic pressures in the hydraulic circuits and the integrated master cylinder 1200 may be detected, the pressure sensor may be provided in various positions and in various numbers.

Hereinafter, operation methods of the electronic brake system 1000 according to the first embodiment of the present disclosure will be described.

The operation of the electronic brake system 1000 according to the present embodiment may include the normal operation mode in which various devices and valves operate normally without failure or malfunction, the abnormal operation mode (fallback mode) in which various devices and valves operate abnormally due to failure or malfunction, and the inspection mode of inspecting whether a leak occurs in the integrated master cylinder 1200 or the simulation valve 1261.

First, the normal operation mode among the operating methods of the electronic brake system 1000 according to the present embodiment will be described.

The normal operation mode of the electronic brake system 1000 according to the present embodiment may be classified into a first braking mode, a second braking mode, and a third braking mode as the hydraulic pressure transferred from the hydraulic pressure supply device 1300 to the wheel cylinders 20 increases. Specifically, in the first braking mode, the hydraulic pressure may be firstly provided to the wheel cylinders 20 by the hydraulic pressure supply device 1300, in the second braking mode, the hydraulic pressure may be secondarily provided to the wheel cylinders 20 by the hydraulic pressure supply device 1300 to transfer a higher braking pressure than in the first braking mode, and in the third braking mode, the hydraulic pressure may be thirdly provided to the wheel cylinders 20 by the hydraulic pressure supply device 1300 to transfer a higher braking pressure than in the second braking mode.

The first to third braking modes may be changed by varying the operations of the hydraulic pressure supply device 1300 and the hydraulic control unit 1400. The hydraulic pressure supply device 1300 may provide a sufficiently high hydraulic pressure of the pressurized medium without a high specification motor by utilizing the first to third braking modes, and furthermore, may prevent unnecessary loads applied to the motor. Therefore, a stable braking force may be secured while reducing the cost and weight of the brake system, and durability and operational reliability of the devices may be improved.

FIG. 2 is a hydraulic circuit diagram illustrating that the electronic brake system 1000 according to the present embodiment performs the first braking mode.

Referring to FIG. 2, when the driver depresses the brake pedal 10 at a beginning of braking, the motor (not shown) operates to rotate in one direction, the rotational force of the motor is transferred to the hydraulic pressure providing unit by the power conversion unit, and the hydraulic piston 1320 of the hydraulic pressure providing unit moves forward, thereby generating a hydraulic pressure in the first pressure chamber 1330. The hydraulic pressure discharged from the first pressure chamber 1330 is transferred to the respective wheel cylinders 20 through the hydraulic control unit 1400, the first hydraulic circuit 1510 and the second hydraulic circuit 1520, thereby generating a braking force.

Specifically, the hydraulic pressure generated in the first pressure chamber 1330 is primarily transferred to the first wheel cylinder 21 and the second wheel cylinder 22 provided in the first hydraulic circuit 1510 by sequentially passing through the first hydraulic flow path 1401, the third hydraulic flow path 1403, and the fourth hydraulic flow path 1404. At this time, as the first valve 1411 and the third valve 1413 are provided as check valves allowing only the flow of the pressurized medium directing to the first hydraulic circuit 1510 side from the first pressure chamber 1330, the hydraulic pressure of the pressurized medium may be smoothly transferred to the first and second wheel cylinders 21 and 22. Also, the first inlet valve 1511a and the second inlet valve 1511b provided in the first hydraulic circuit 1510 are maintained in an open state, and the first outlet valve 1512a, the second outlet valve 1512b, and the discharge valve 1550 are controlled to be closed, thereby preventing the hydraulic pressure of the pressurized medium from leaking into the reservoir 1100 side.

Also, the hydraulic pressure of the pressurized medium generated in the first pressure chamber 1330 is primarily transferred to the third and fourth wheel cylinders 23 and 24 provided in the second hydraulic circuit 1520 by sequentially passing through the first hydraulic flow path 1401, and the third hydraulic flow path 1403, and the fifth hydraulic flow path 1405. As described above, as the first valve 1411 and the fourth valve 1414 are provided as check valves allowing only the flow of the pressurized medium directing to the second hydraulic circuit 1520 side from the first pressure chamber 1330, the hydraulic pressure of the pressurized medium may be smoothly transferred to the third and fourth wheel cylinders 23 and 24. Also, the third inlet valve 1521a and the fourth inlet valve 1521b provided in the second hydraulic circuit 1520 are maintained in an open state, and a second cut valve 1622 is maintained in a closed state, thereby preventing the hydraulic pressure of the pressurized medium from leaking into the second backup flow path 1620 side.

In the first braking mode, as the second dump check valve 1821 provided in the second dump flow path 1820 connected to the second pressure chamber 1340 allows the pressurized medium to be supplied from the reservoir 1100 to the second pressure chamber 1340, the second pressure chamber 1340 may be filled with the pressurized medium, thereby preparing the second braking mode, which will be described later.

In the first braking mode in which braking of the wheel cylinders 20 is performed by the hydraulic pressure supply device 1300, the first cut valve 1611 and the second cut valve 1621 provided in the first backup flow path 1610 and the second backup flow path 1620, respectively, are switched to be closed, so that the pressurized medium discharged from the integrated master cylinder 1200 is prevented from being transferred to the wheel cylinders 20 side.

Specifically, because the first cut valve 1611 is closed when a pressing force is applied to the brake pedal 10, the master chamber 1220a is sealed. Therefore, as the pressing force is applied to the brake pedal 10, the pressurized medium accommodated in the master chamber 1220a is pressurized to generate a hydraulic pressure, the hydraulic pressure of the pressurized medium generated in the master chamber 1220a is transferred to the front surface (right side of FIG. 2) of the first simulation piston 1230, and the simulator valve 1261 is opened in the normal operation mode, so that a displacement is generated in the first simulation piston 1230. On the other hand, because the inspection valve 1631 is closed in the normal operation mode of the electronic brake system 1000, the second simulation chamber 1240a is sealed so that a displacement is not generated in the second simulation piston 1240, and thus the elastic member 1250 is compressed by the displacement of the first simulation piston 1230, and the elastic restoring force by the compression of the elastic member 1250 is provided to the driver as a pedal feeling. At this time, the pressurized medium accommodated in the first simulation chamber 1230a is discharged to the reservoir 1100 through the simulation flow path 1260.

The electronic brake system 1000 according to the present embodiment may switch from the first braking mode to the second braking mode illustrated in FIG. 3 when a braking pressure higher than that in the first braking mode is to be provided.

FIG. 3 is a hydraulic circuit diagram illustrating that the electronic brake system 1000 according to the present embodiment performs the second braking mode, and referring to FIG. 3, when a displacement or an operating speed of the brake pedal 10 detected by the pedal displacement sensor 11 is higher than a preset level or a hydraulic pressure detected by the pressure sensor is higher than a preset level, the electronic control unit may switch from the first braking mode to the second braking mode by determining that a higher braking pressure is required.

When the first braking mode is switched to the second braking mode, the motor operates to rotate in the other direction, and the rotational force of the motor is transferred to the hydraulic pressure providing unit by the power conversion unit so that the hydraulic piston 1320 moves backward, thereby generating a hydraulic pressure in the second pressure chamber 1340. The hydraulic pressure discharged from the second pressure chamber 1340 is transferred to the respective wheel cylinders 20 through the hydraulic control unit 1400, the first hydraulic circuit 1510, and the second hydraulic circuit 1520, thereby generating a braking force.

Specifically, the hydraulic pressure generated in the second pressure chamber 1340 is secondarily transferred to the first wheel cylinder 21 and the second wheel cylinder 22 provided in the first hydraulic circuit 1510 by sequentially passing through the second hydraulic flow path 1402, the third hydraulic flow path 1403, and the fourth hydraulic flow path 1404. At this time, as the second valve 1412 provided in the second hydraulic flow path 1402 is opened, the flow of the pressurized medium transferred along the second hydraulic flow path 1402 toward the third hydraulic flow path 1403 may be stably provided. The first inlet valve 1511a and the second inlet valve 1511b provided in the first hydraulic circuit 1510 are maintained in the open state, and the first outlet valve 1512a, the second outlet valve 1512b, and the discharge valve 1550 are closed, thereby preventing the hydraulic pressure of the pressurized medium from leaking into the reservoir 1100 side.

Also, the hydraulic pressure generated in the second pressure chamber 1340 is secondarily transferred to the third wheel cylinder 23 and the fourth wheel cylinder 24 provided in the second hydraulic circuit 1520 by sequentially passing through the second hydraulic flow path 1402, the third hydraulic flow path 1403, and the fifth hydraulic flow path 1405.

As the fourth valve 1414 provided in the fifth hydraulic flow path 1405 is provided as a check valve allowing only the flow of the pressurized medium directing to the second hydraulic circuit 1520 side from the second pressure chamber 1340, the hydraulic pressure of the pressurized medium may be smoothly transferred to the third wheel cylinder 23 and the fourth wheel cylinder 24. The third inlet valve 1521a and the fourth inlet valve 1521b provided in the second hydraulic circuit 1520 are maintained in the open state, and the second cut valve 1622 is maintained in the closed state, thereby preventing the hydraulic pressure of the pressurized medium from leaking into the second backup flow path 1620 side.

In the second braking mode, as the first valve 1411 provided in the first hydraulic flow path 1401 is provided as a check valve blocking the flow of the pressurized medium directing to the first pressure chamber 1330, the hydraulic pressure of the pressurizing medium generated in the second pressure chamber 1340 may be prevented from being transferred to the first pressure chamber 1330. Also, as the first dump check valve 1811 provided in the first dump flow path 1810 connected to the first pressure chamber 1330 allows the pressurized medium to be supplied from the reservoir 1100 to the first pressure chamber 1330, the first pressure chamber 1330 may be filled with the pressurized medium, thereby preparing the third braking mode, which will be described later.

Because an operation of the integrated master cylinder 1200 in the second braking mode is the same as the operation of the integrated master cylinder 1200 in the first braking mode described above, a description thereof will be omitted to prevent duplication of contents.

The electronic brake system 1000 according to the present embodiment may switch from the second braking mode to the third braking mode illustrated in FIG. 4 when a braking pressure higher than that in the second braking mode is to be provided.

FIG. 4 is a hydraulic circuit diagram illustrating that the electronic brake system 1000 according to the present embodiment performs the third braking mode.

Referring to FIG. 4, when a displacement or an operating speed of the brake pedal 10 detected by the pedal displacement sensor 11 is higher than a preset level or a hydraulic pressure detected by the pressure sensor is higher than a preset level, the electronic control unit may switch from the second braking mode to the third braking mode by determining that a higher braking pressure is required.

When the second braking mode is switched to the third braking mode, the motor (not shown) operates to rotate in one direction, and the rotational force of the motor is transferred to the hydraulic pressure providing unit by the power conversion unit so that the hydraulic piston 1320 of the hydraulic pressure providing unit moves forward again, thereby generating a hydraulic pressure in the first pressure chamber 1330. The hydraulic pressure discharged from the first pressure chamber 1330 is transferred to the respective wheel cylinders 20 through the hydraulic control unit 1400, the first hydraulic circuit 1510, and the second hydraulic circuit 1520, thereby generating a braking force.

Specifically, the hydraulic pressure generated in the first pressure chamber 1330 is thirdly transferred to the first wheel cylinder 21 and the second wheel cylinder 22 provided in the first hydraulic circuit 1510 by sequentially passing through the first hydraulic flow path 1401, the third hydraulic flow path 1403, and the fourth hydraulic flow path 1404. At this time, as the first valve 1411 and the third valve 1413 are provided as check valves allowing only the flow of the pressurized medium directing to the first hydraulic circuit 1510 side from the first pressure chamber 1330, the hydraulic pressure of the pressurized medium may be smoothly transferred to the first and second wheel cylinders 21 and 22. Also, the first inlet valve 1511a and the second inlet valve 1511b provided in the first hydraulic circuit 1510 are maintained in the open state, and the first outlet valve 1512a, the second outlet valve 1512b, and the discharge valve 1550 are maintained in a closed state, thereby preventing the hydraulic pressure of the pressurized medium from leaking into the reservoir 1100 side.

Also, the hydraulic pressure of the pressurized medium generated in the first pressure chamber 1330 is thirdly transferred to the third wheel cylinder 23 and the fourth wheel cylinder 24 provided in the second hydraulic circuit 1520 by sequentially passing through the first hydraulic flow path 1401, the third hydraulic flow path 1403, and the fifth hydraulic flow path 1405. As described above, as the first valve 1411 and the fourth valve 1414 are provided as check valves allowing only the flow of the pressurized medium directing to the second hydraulic circuit 1520 side from the first pressure chamber 1330, the hydraulic pressure of the pressurized medium may be smoothly transferred to the third wheel cylinder 23 and the fourth wheel cylinder 24. The third inlet valve 1521*a* and the fourth inlet valve 1521*b* provided in the second hydraulic circuit 1520 are maintained in the open state, and the second cut valve 1622 is maintained in the closed state, thereby preventing the hydraulic pressure of the pressurized medium from leaking into the second backup flow path 1620 side.

Because the hydraulic pressure of a high pressure is provided in the third braking mode, as the hydraulic piston 1320 moves forward, a force of the hydraulic pressure in the first pressure chamber 1330 to move the hydraulic piston 1320 backward also increases, so that a load applied to the motor increases rapidly. Accordingly, in the third braking mode, the second valve 1412 is operated to open, thereby allowing the flow of the pressurized medium through the second hydraulic flow path 1402. In other words, a part of the hydraulic pressure generated in the first pressure chamber 1330 may be supplied to the second pressure chamber 1340 by sequentially passing through the first hydraulic flow path 1401 and the second flow path 1402, and through this, the first pressure chamber 1330 and the second pressure chamber 1340 are in communication with each other to synchronize the hydraulic pressure, so that the load applied to the motor may be reduced and the durability and reliability of the devices may be improved.

Because an operation of the integrated master cylinder 1200 in the third braking mode is the same as the operation of the integrated master cylinder 1200 in the first braking mode described above, a description thereof will be omitted to prevent duplication of contents.

Hereinafter, an operation method of releasing the braking in the normal operation mode of the electronic brake system 1000 according to the present embodiment will be described.

FIG. 5 is a hydraulic circuit diagram illustrating that the electronic brake system 1000 according to the present embodiment releases the braking.

Referring to FIG. 5, when the pressing force applied to the brake pedal 10 is released, the motor generates a rotational force in any one direction and transmits the rotational force to the power conversion unit, and the power conversion unit returns the hydraulic piston 1320 to an original position thereof. As the hydraulic piston 1320 moves forward or backward to return to the original position, the hydraulic pressure generated in the first pressure chamber 1330 or the second pressure chamber 1340 may be transferred to the first hydraulic circuit 1510 or the second hydraulic circuit 1520 through the hydraulic control unit 1400 to be discharged to the reservoir 1100 side together with the hydraulic pressure of the pressurizing medium applied to the wheel cylinders 20.

Specifically, the hydraulic pressure of the pressurized medium applied to the first wheel cylinder 21 and the second wheel cylinder 22 provided in the first hydraulic circuit 1510 may be discharged to the reservoir 1100 by sequentially passing through the first outlet valve 1512*a*, the second outlet valve 1512*b*, and the discharge valve 1550. To this end, the first and second outlet valves 1512*a* and 1512*b* may be switched to an open state, and the discharge valve 1550 may adjust the flow rate of the pressurized medium to be discharged to the reservoir 1100 by adjusting the opening degree depending on a displacement amount of the brake pedal 10, thereby performing the pressure reduction braking or the braking release. At this time, as described above, the first inlet valve 1511*a* and the second inlet valve 1511*b* may be maintained in the open state so that the hydraulic pressure generated in the first pressure chamber 1330 or the second pressure chamber 1340 by the return of the hydraulic piston 1320 to the original position may also be discharged to the reservoir 1100 by sequentially passing through the first outlet valve 1512*a*, the second outlet valve 1512*b*, and the discharge valve 1550.

Also, the hydraulic pressure of the pressurized medium applied to the third wheel cylinder 23 and the fourth wheel cylinder 24 provided in the second hydraulic circuit 1520 may be discharged to the reservoir 1100 by sequentially passing through the second backup flow path 1620, the first simulation chamber 1230*a*, and the simulation flow path 1260. To this end, the second cut valve 1621 and the simulator valve 1261 may be switched to an open state, and at least one of the second cut valve 1621 and in response to a degree of pressure reduction of the hydraulic pressure applied to the first hydraulic circuit 1510 being adjusted by the discharge valve 1550, the simulator valve 1261 may be provided as a solenoid valve that is linearly controlled to adjust the flow rate of the pressurized medium passing therethrough, like the discharge valve 1550. At this time, as described above, the third inlet valve 1521*a* and the fourth inlet valve 1521*b* may be maintained in the open state so that the hydraulic pressure generated in the first pressure chamber 1330 or the second pressure chamber 1340 by the return of the hydraulic piston 1320 to the original position may also be discharged to the reservoir 1100 by sequentially passing through the second backup flow path 1620, the first simulation chamber 1230*a*, and the simulation flow path 1260.

Hereinafter, the case in which the electronic brake system 1000 according to the present embodiment does not operate normally, that is, operates in the fallback mode will be described.

FIG. 6 is a hydraulic circuit diagram illustrating that the electronic brake system 1000 according to the present embodiment operates in the case in which the normal operation is impossible due to a device failure or the like, that is, in the case of the abnormal operation mode (fallback mode).

Referring to FIG. 6, in the abnormal operation mode, each of the valves is controlled to an initial braking state which is a non-operational state. At this time, when the driver depresses the brake pedal 10, the master piston 1220 connected to the brake pedal 10 moves forward to generate a displacement. Because the first cut valve 1611 is provided in the open state in the non-operational state, by the forward movement of the master piston 1220, the pressurized medium accommodated in the master chamber 1220*a* is transferred to the first wheel cylinder 21 and the second wheel cylinder 22 of the first hydraulic circuit 1510 along the first backup flow path 1610, thereby performing braking.

Also, the pressurized medium accommodated in the master chamber 1220*a* moves the first simulation piston 1230 forward to generate a displacement, so that the pressurized medium accommodated in the first simulation chamber 1230*a* is transferred to the third wheel cylinder 23 and the fourth wheel cylinder 24 of the second hydraulic circuit 1520 along the second backup flow path 1620, thereby performing braking. At the same time, the second simulation piston 1240 also generates a displacement by moving forward due to the displacement of the first simulation piston 1230, so that the pressurized medium accommodated in the second simulation chamber 1240*a* may be provided to the second hydraulic circuit 1520 by joining into the second backup flow path 1620 along the auxiliary backup flow path 1630. At this time, because the simulator valve 1261 is provided in a closed state in the non-operational state, the pressurized medium accommodated in the first simulation chamber 1230a may be transferred to the second backup flow path 1620 without being discharged to the reservoir 1100, and at the same time, may generate a hydraulic pressure for moving the second simulation piston 1240 forward, and because the inspection valve 1631 and the second cut valve 1621 are provided in an open state, the pressurized medium accommodated in the first simulation chamber 1230a and the second simulation chamber 1240a may be transferred to the second backup flow path 1620.

Hereinafter, the inspection mode of the electronic brake system 1000 according to the present embodiment will be described.

FIG. 7 is a hydraulic circuit diagram illustrating that the electronic brake system 1000 according to the present embodiment performs the inspection mode, and referring to FIG. 7, the electronic brake system 1000 according to the present embodiment may perform the inspection mode of inspecting whether a leak is generated in the integrated master cylinder 1200 or the simulator valve 1261. When the inspection mode is performed, the electronic control unit controls to supply the hydraulic pressure generated from the hydraulic pressure supply device 1300 to the first simulation chamber 1230a of the integrated master cylinder 1200.

Specifically, in a state in which each of the valves is controlled to the initial braking state, which is the non-operational state, the electronic control unit operates to move the hydraulic piston 1320 forward, so that a hydraulic pressure is generated in the first pressure chamber 1330, the inspection valve 1631 and the first cut valve 1611 are switched to a closed state, and the second cut valve 1621 is maintained in the open state. Accordingly, as the hydraulic pressure generated in the first pressure chamber 1330 is transferred to the second hydraulic circuit 1520 side by sequentially passing through the first hydraulic flow path 1401, the third hydraulic flow path 1403, and the fifth hydraulic flow path 1405, and the third inlet valve 1521a and the fourth inlet valve 1521b are maintained in a normally open state, the pressurized medium transferred to the second hydraulic circuit 1520 is introduced into the first simulation chamber 1230a through the second backup flow path 1620. At this time, the simulator valve 1261 is maintained in the closed state to induce the first simulation chamber 1230a to be in a sealed state.

In this state, by comparing an expected hydraulic pressure value of the pressurized medium to be generated by the displacement of the hydraulic piston 1320 with a hydraulic pressure value in the second hydraulic circuit 1520 or the first simulation chamber 1230a measured by the pressure sensor PS, a leak in the integrated master cylinder 1200 or the simulator valve 1261 may be diagnosed. Specifically, the expected hydraulic pressure value calculated based on a displacement amount of the hydraulic piston 1320 or a rotational angle measured by a motor control sensor (not shown) is compared with an actual hydraulic pressure value measured by the pressure sensor PS, and when the two hydraulic pressure values match, it may be determined that there is no leak in the integrated master cylinder 1200 or the simulator valve 1261. On the other hand, when the actual hydraulic pressure value measured by the pressure sensor PS is lower than the expected hydraulic pressure value calculated based on the displacement amount of the hydraulic piston 1320 or the rotational angle measured by the motor control sensor (not shown), this is due to the loss of a part of the hydraulic pressure of the pressurized medium applied to the first simulation chamber 1230a, and thus it may be determined that there is a leak in the integrated master cylinder 1200 or the simulator valve 1261, and this leak may be notified to the driver.

Hereinafter, an electronic brake system 2000 according to a second embodiment of the present disclosure will be described.

FIG. 8 is a hydraulic circuit diagram illustrating the electronic brake system 2000 according to the second embodiment of the present disclosure, and referring to FIG. 8, a fourth valve 2414 of a hydraulic control unit 2400 according to the second embodiment of the present disclosure is provided to perform cooperative control for a regenerative braking mode.

Because the following description of the electronic brake system 2000 according to the second embodiment of the present disclosure except for additional explanation with separate reference numerals is the same as the above description of the electronic brake system 1000 according to the first embodiment of the present disclosure, a description thereof will be omitted in order to prevent redundant description.

Recently, as the market demand for eco-friendly vehicles increases, hybrid vehicles with improved fuel efficiency are gaining popularity. The hybrid vehicle recovers kinetic energy as electric energy while braking the vehicle, stores the electric energy in a battery, and then utilizes the motor as an auxiliary driving source of the vehicle, and the hybrid vehicle typically recovers energy by a generator (not shown) or the like during a braking operation of the vehicle in order to increase the energy recovery rate. This braking operation is referred to as a regenerative braking mode, and in the electronic brake system 2000 according to the present embodiment, a generator (not shown) may be provided in the third wheel cylinder 23 and the fourth wheel cylinder 24 of the second hydraulic circuit 1520 to implement the regenerative braking mode. The generator and the fourth valve 2414 in the third and fourth wheel cylinders 23 and 24 may perform the regenerative braking mode through cooperative control.

The fourth valve 2414 provided in the fifth hydraulic flow path 1405 may be provided as a bidirectional control valve for controlling the flow of the pressurized medium transferred along the fifth hydraulic flow path 1405. The fourth valve 2414 may be provided as a normally closed type solenoid valve that operates to be opened when an electric signal is received from the electronic control unit in a normally closed state. The fourth valve 2414 is controlled to be opened in a normal operation mode of the electronic brake system 2000, and may be switched to a closed state when entering the regenerative braking mode by the generator (not shown) provided in the third wheel cylinder 23 and the fourth wheel cylinder 24.

Hereinafter, the regenerative braking mode of the electronic brake system 2000 according to the second embodiment of the present disclosure will be described.

FIG. 9 is a hydraulic circuit diagram illustrating that the electronic brake system 2000 according to the second embodiment of the present disclosure performs the regenerative braking mode, and referring to FIG. 9, while in the case of the first wheel cylinder 21 and the second wheel cylinder 22 of the first hydraulic circuit 1510, a braking force that the driver intends to implement is only generated by the hydraulic pressure of the pressurized medium by the operation of the hydraulic pressure supply device 1300, in the case of the third wheel cylinder 23 and the fourth wheel cylinder 24 of the second hydraulic circuit 1520 in which an energy recovery device such as a generator is installed, the sum of the braking pressure of the pressurized medium by the hydraulic pressure supply device 1300 and the total braking pressure plus the regenerative braking pressure by the generator should be equal to the total braking force of the first wheel cylinder 21 and the second wheel cylinder 22.

Therefore, when entering the regenerative braking mode, as the braking pressure by the hydraulic pressure supply device 1300 applied to the third wheel cylinder 23 and the fourth wheel cylinder 24 is removed or maintained constant by closing the fourth valve 2414, and at the same time the regenerative braking pressure by the generator is increased, the total braking force of the third and fourth wheel cylinders 23 and 24 may be equal to the braking force of the first and second wheel cylinders 21 and 22.

Specifically, when the driver depresses the brake pedal 10 to brake the vehicle, the motor (not shown) operates to rotate in one direction, the rotational force of the motor is transferred to the hydraulic pressure providing unit by the power conversion unit, and the hydraulic piston 1320 of the hydraulic pressure providing unit moves forward, thereby generating a hydraulic pressure in the first pressure chamber 1330. The hydraulic pressure discharged from the first pressure chamber 1330 is transferred to the respective wheel cylinders 20 through the hydraulic control unit 1400, the first hydraulic circuit 1510 and the second hydraulic circuit 1520, thereby generating a braking force.

In the case of the first hydraulic circuit 1510 in which an energy recovery device such as a generator is not installed, the hydraulic pressure of the pressurized medium generated in the first pressure chamber 1330 sequentially passes through the first hydraulic flow path 1401, the third hydraulic flow path 1403, and the fourth hydraulic flow path 1404, and is transferred to the first and second wheel cylinders 21 and 22, thereby performing braking. As described above, as the first valve 1411 and the third valve 1413 allow the flow of the pressurized medium directing to the first hydraulic circuit 1510 from the first pressure chamber 1330, the hydraulic pressure of the pressurizing medium generated in the first pressure chamber 1330 may be transferred to the first hydraulic circuit 1510.

On the other hand, in the case of the second hydraulic circuit 1520 in which the generator is installed, when the electronic control unit determines that it is possible to enter the regenerative braking mode by sensing a speed, deceleration, etc. of the vehicle, the electronic control unit may close the fourth valve 2414 to block transmission of the hydraulic pressure of the pressurized medium to the third wheel cylinder 23 and the fourth wheel cylinder 24, and may implement regenerative braking by the generator. Thereafter, when the electronic control unit determines that the vehicle is in an unsuitable state for regenerative braking, or the braking pressure in the first hydraulic circuit 1510 and the braking pressure in the second hydraulic circuit 1520 are different, the electronic control unit may control the hydraulic pressure of the pressurizing medium to be transferred to the second hydraulic circuit 1520 by switching the fourth valve 2414 to an open state, and the at the same time may synchronize the braking pressure in the first hydraulic circuit 1510 and the braking pressure in the second hydraulic circuit 1520. Accordingly, the braking pressure or braking force applied to the first to fourth wheel cylinders 20 may be uniformly controlled, so that in addition to braking stability of the vehicle, oversteering or understeering may be prevented to improve driving stability of the vehicle.

Hereinafter, an electronic brake system 3000 according to a third embodiment of the present disclosure will be described.

FIG. 10 is a hydraulic circuit diagram illustrating the electronic brake system 3000 according to the third embodiment of the present disclosure, and referring to FIG. 10, a hydraulic control unit 3400 according to the third embodiment of the present disclosure may be provided to further include a sixth hydraulic flow path 3406 connecting the first hydraulic flow path 1401 and the second hydraulic flow path 1402, and a fifth valve 3415 provided in the sixth hydraulic flow path 3406 to control the flow of the pressurized medium, and a second valve 3412 provided in the second hydraulic flow path 1402 may be provided as a check valve allowing only the flow of the pressurized medium discharged from the second pressure chamber 1340.

Because the following description of the electronic brake system 3000 according to the third embodiment of the present disclosure except for additional explanation with separate reference numerals is the same as the above description of the electronic brake system 1000 according to the first embodiment of the present disclosure, a description thereof will be omitted in order to prevent redundant description.

The second valve 3412 provided in the second hydraulic flow path 1402 may be provided as a check valve allowing only the flow of the pressurized medium directing to the third hydraulic flow path 1403 from the second pressure chamber 1340 and blocking the flow of the pressurized medium in the opposite direction.

The sixth hydraulic flow path 3406 is provided to connect the first hydraulic flow path 1401 and the second hydraulic flow path 1402. Specifically, one end of the sixth hydraulic flow path 3406 may be connected between the first pressure chamber 1330 and the first valve 1411 on the first hydraulic flow path 1401, and the other end thereof may be connected between the second pressure chamber 1340 and the second valve 3412 on the second hydraulic flow path 1402. The fifth valve 3415 is provided in the sixth hydraulic flow path 3406 to control the flow of the pressurized medium, and may be provided as a bidirectional control valve for controlling the flow of the pressurized medium transferred along the second hydraulic flow path 1402. The fifth valve 3415 may be provided as a normally closed type solenoid valve that operates to be opened when an electric signal is received from the electronic control unit in a normally closed state. The fifth valve 3415 may be controlled to be opened in a third braking mode of a normal operation mode of the electronic brake system 3000. A detailed description thereof will be given later with reference to FIG. 13.

Hereinafter, an operation method of the electronic brake system 3000 according to the third embodiment of the present disclosure will be described.

The normal operation mode of the electronic brake system 3000 according to the third embodiment of the present disclosure may be classified into a first braking mode, a second braking mode, and the third braking mode as the hydraulic pressure transferred from the hydraulic pressure supply device 1300 to the wheel cylinders 20 increases. Specifically, in the first braking mode, the hydraulic pressure may be firstly provided to the wheel cylinders 20 by the hydraulic pressure supply device 1300, in the second braking mode, the hydraulic pressure may be secondarily provided to the wheel cylinders 20 by the hydraulic pressure supply device 1300 to transfer a higher braking pressure than in the first braking mode, and in the third braking mode, the hydraulic pressure may be thirdly provided to the wheel cylinders 20 by the hydraulic pressure supply device 1300 to transfer a higher braking pressure than in the second braking mode.

The first to third braking modes may be changed by varying the operations of the hydraulic pressure supply device 1300 and the hydraulic control unit 3400. The hydraulic pressure supply device 1300 may provide a sufficiently high hydraulic pressure of the pressurized medium without a high specification motor by utilizing the first to third braking modes, and furthermore, may prevent unnecessary loads applied to the motor. Therefore, a stable braking force may be secured while reducing the cost and weight of the brake system, and durability and operational reliability of the devices may be improved.

FIG. 11 is a hydraulic circuit diagram illustrating that the electronic brake system 3000 according to the third embodiment of the present disclosure performs the first braking mode.

Referring to FIG. 11, when the driver depresses the brake pedal 10 at the beginning of braking, the motor (not shown) operates to rotate in one direction, the rotational force of the motor is transferred to the hydraulic pressure providing unit by the power conversion unit, and the hydraulic piston 1320 of the hydraulic pressure providing unit moves forward, thereby generating a hydraulic pressure in the first pressure chamber 1330. The hydraulic pressure discharged from the first pressure chamber 1330 is transferred to the respective wheel cylinders 20 through the hydraulic control unit 1400, the first hydraulic circuit 1510 and the second hydraulic circuit 1520, thereby generating a braking force.

Specifically, the hydraulic pressure generated in the first pressure chamber 1330 is primarily transferred to the first wheel cylinder 21 and the second wheel cylinder 22 provided in the first hydraulic circuit 1510 by sequentially passing through the first hydraulic flow path 1401, the third hydraulic flow path 1403, and the fourth hydraulic flow path 1404. At this time, the fifth valve 3415 is maintained in a closed state to prevent the hydraulic pressure generated in the first pressure chamber 1330 from leaking into the second pressure chamber 1340 along the sixth hydraulic flow path 3406. Also, as the first valve 1411 and the third valve 1413 are provided as check valves allowing only the flow of the pressurized medium directing to the first hydraulic circuit 1510 side from the first pressure chamber 1330, the hydraulic pressure of the pressurized medium may be smoothly transferred to the first and second wheel cylinders 21 and 22. The first inlet valve 1511$a$ and the second inlet valve 1511$b$ provided in the first hydraulic circuit 1510 are maintained in the open state, and the first outlet valve 1512$a$, the second outlet valve 1512$b$, and the discharge valve 1550 are maintained in the closed state, thereby preventing the hydraulic pressure of the pressurized medium from leaking into the reservoir 1100 side.

The hydraulic pressure of the pressurized medium generated in the first pressure chamber 1330 is primarily transferred to the third and fourth wheel cylinders 23 and 24 provided in the second hydraulic circuit 1520 by sequentially passing through the first hydraulic flow path 1401, and the third hydraulic flow path 1403, and the fifth hydraulic flow path 1405. As described above, the fifth valve 3415 is maintained in the closed state to prevent the hydraulic pressure generated in the first pressure chamber 1330 from leaking into the second pressure chamber 1340 side along the sixth hydraulic flow path 3406, and as the first valve 1411 and the fourth valve 1414 are provided as check valves allowing only the flow of the pressurized medium directing to the second hydraulic circuit 1520 side from the first pressure chamber 1330, the hydraulic pressure of the pressurized medium may be smoothly transferred to the third and fourth wheel cylinders 23 and 24. The third inlet valve 1521$a$ and the fourth inlet valve 1521$b$ provided in the second hydraulic circuit 1520 are maintained in the open state, and the second cut valve 1622 is maintained in the closed state, thereby preventing the hydraulic pressure of the pressurized medium from leaking into the second backup flow path 1620 side.

In the first braking mode, as the second dump check valve 1821 provided in the second dump flow path 1820 connected to the second pressure chamber 1340 allows the pressurized medium to be supplied from the reservoir 1100 to the second pressure chamber 1340, the second pressure chamber 1340 may be filled with the pressurized medium, thereby preparing the second braking mode, which will be described later.

Because an operation of the integrated master cylinder 1200 in the first braking mode is the same as the operation of the integrated master cylinder 1200 in the first to third braking modes of the electronic brake system according to the first embodiment described above, a description thereof will be omitted to prevent duplication of contents.

The electronic brake system 3000 according to the third embodiment of the present disclosure may switch from the first braking mode to the second braking mode illustrated in FIG. 12 when a braking pressure higher than that in the first braking mode is to be provided.

FIG. 12 is a hydraulic circuit diagram illustrating that the electronic brake system 3000 according to the third embodiment of the present disclosure performs the second braking mode, and referring to FIG. 12, when a displacement or an operating speed of the brake pedal 10 detected by the pedal displacement sensor 11 is higher than a preset level or a hydraulic pressure detected by the pressure sensor is higher than a preset level, the electronic control unit may switch from the first braking mode to the second braking mode by determining that a higher braking pressure is required.

When the first braking mode is switched to the second braking mode, the motor operates to rotate in the other direction, and the rotational force of the motor is transferred to the hydraulic pressure providing unit by the power conversion unit so that the hydraulic piston 1320 moves backward, thereby generating a hydraulic pressure in the second pressure chamber 1340. The hydraulic pressure discharged from the second pressure chamber 1340 is transferred to the respective wheel cylinders 20 through the hydraulic control unit 1400, the first hydraulic circuit 1510, and the second hydraulic circuit 1520, thereby generating a braking force.

Specifically, the hydraulic pressure generated in the second pressure chamber 1340 is secondarily transferred to the first wheel cylinder 21 and the second wheel cylinder 22 provided in the first hydraulic circuit 1510 by sequentially passing through the second hydraulic flow path 1402, the third hydraulic flow path 1403, and the fourth hydraulic flow path 1404. At this time, the fifth valve 3415 is maintained in the closed state to prevent the hydraulic pressure generated in the second pressure chamber 1340 from leaking into the first pressure chamber 1330 side along the sixth hydraulic flow path 3406. Also, as the second valve 3412 and the third valve 1413 are provided as check valves allowing only the flow of the pressurized medium directing to the first hydraulic circuit 1510 side from the first pressure chamber 1330, the hydraulic pressure of the pressurized medium may be smoothly transferred to the first and second wheel cylinders 21 and 22. The first inlet valve 1511$a$ and the second inlet valve 1511$b$ provided in the first hydraulic circuit 1510 are maintained in the open state, and the first outlet valve 1512*a*, the second outlet valve 1512*b*, and the discharge valve 1550 are maintained in the closed state, thereby preventing the hydraulic pressure of the pressurized medium from leaking into the reservoir 1100 side.

Also, the hydraulic pressure generated in the second pressure chamber 1340 is secondarily transferred to the third wheel cylinder 23 and the fourth wheel cylinder 24 provided in the second hydraulic circuit 1520 by sequentially passing through the second hydraulic flow path 1402, the third hydraulic flow path 1403, and the fifth hydraulic flow path 1405. At this time, as described above, the fifth valve 3415 is maintained in the closed state to prevent the hydraulic pressure generated in the second pressure chamber 1340 from leaking into the first pressure chamber 1330 side along the sixth hydraulic flow path 3406, and as the fourth valve 1414 provided in the fifth hydraulic flow path 1405 is provided as check valves allowing only the flow of the pressurized medium directing to the second hydraulic circuit 1520 side from the second pressure chamber 1340, the hydraulic pressure of the pressurized medium may be smoothly transferred to the third wheel cylinder 23 and the fourth wheel cylinder 24. The third inlet valve 1521*a* and the fourth inlet valve 1521*b* provided in the second hydraulic circuit 1520 are maintained in the open state, and the second cut valve 1622 is maintained in the closed state, thereby preventing the hydraulic pressure of the pressurized medium from leaking into the second backup flow path 1620 side.

In the second braking mode, as the first dump check valve 1811 provided in the first dump flow path 1810 connected to the first pressure chamber 1330 allows the pressurized medium to be supplied from the reservoir 1100 to the first pressure chamber 1330, the first pressure chamber 1330 may be filled with the pressurized medium, thereby preparing the third braking mode, which will be described later.

Because an operation of the integrated master cylinder 1200 in the second braking mode is the same as the operation of the integrated master cylinder 1200 in the first to third braking modes of electronic brake system described above, a description thereof will be omitted to prevent duplication of contents.

The electronic brake system 3000 according to the third embodiment of the present disclosure may switch from the second braking mode to the third braking mode illustrated in FIG. 13 when a braking pressure higher than that in the second braking mode is to be provided.

FIG. 13 is a hydraulic circuit diagram illustrating that the electronic brake system 3000 according to the third embodiment of the present disclosure performs the third braking mode.

Referring to FIG. 13, when a displacement or an operating speed of the brake pedal 10 detected by the pedal displacement sensor 11 is higher than a preset level or a hydraulic pressure detected by the pressure sensor is higher than a preset level, the electronic control unit may switch from the second braking mode to the third braking mode by determining that a higher braking pressure is required.

When the second braking mode is switched to the third braking mode, the motor (not shown) operates to rotate in one direction, and the rotational force of the motor is transferred to the hydraulic pressure providing unit by the power conversion unit so that the hydraulic piston 1320 of the hydraulic pressure providing unit moves forward again, thereby generating a hydraulic pressure in the first pressure chamber 1330. The hydraulic pressure discharged from the first pressure chamber 1330 is transferred to the respective wheel cylinders 20 through the hydraulic control unit 3400, the first hydraulic circuit 1510, and the second hydraulic circuit 1520, thereby generating a braking force.

Specifically, the hydraulic pressure generated in the first pressure chamber 1330 is thirdly transferred to the first wheel cylinder 21 and the second wheel cylinder 22 provided in the first hydraulic circuit 1510 by sequentially passing through the first hydraulic flow path 1401, the third hydraulic flow path 1403, and the fourth hydraulic flow path 1404. At this time, as the first valve 1411 and the third valve 1413 are provided as check valves allowing only the flow of the pressurized medium directing to the first hydraulic circuit 1510 side from the first pressure chamber 1330, the hydraulic pressure of the pressurized medium may be smoothly transferred to the first and second wheel cylinders 21 and 22. The first inlet valve 1511*a* and the second inlet valve 1511*b* provided in the first hydraulic circuit 1510 are maintained in the open state, and the first outlet valve 1512*a*, the second outlet valve 1512*b*, and the discharge valve 1550 are maintained in the closed state, thereby preventing the hydraulic pressure of the pressurized medium from leaking into the reservoir 1100 side.

Also, the hydraulic pressure of the pressurized medium generated in the first pressure chamber 1330 is thirdly transferred to the third wheel cylinder 23 and the fourth wheel cylinder 24 provided in the second hydraulic circuit 1520 by sequentially passing through the first hydraulic flow path 1401, the third hydraulic flow path 1403, and the fifth hydraulic flow path 1405. As described above, as the first valve 1411 and the fourth valve 1414 are provided as check valves allowing only the flow of the pressurized medium directing to the second hydraulic circuit 1520 side from the first pressure chamber 1330, the hydraulic pressure of the pressurized medium may be smoothly transferred to the third wheel cylinder 23 and the fourth wheel cylinder 24. Also, the third inlet valve 1521*a* and the fourth inlet valve 1521*b* provided in the second hydraulic circuit 1520 are maintained in the open state, and the second cut valve 1622 is maintained in the closed state, thereby preventing the hydraulic pressure of the pressurized medium from leaking into the second backup flow path 1620 side.

Because the hydraulic pressure of a high pressure is provided in the third braking mode, as the hydraulic piston 1320 moves forward, a force of the hydraulic pressure in the first pressure chamber 1330 to move the hydraulic piston 1320 backward also increases, so that a load applied to the motor increases rapidly. Accordingly, in the third braking mode, the fifth valve 3415 is operated to open, thereby allowing the flow of the pressurized medium through the sixth hydraulic flow path 3406. In other words, a part of the hydraulic pressure generated in the first pressure chamber 1330 may be supplied to the second pressure chamber 1340 by sequentially passing through the first hydraulic flow path 1401, the sixth hydraulic flow path 3406, and the second flow path 1402, and through this, the first pressure chamber 1330 and the second pressure chamber 1340 are in communication with each other to synchronize the hydraulic pressure, so that the load applied to the motor may be reduced and the durability and reliability of the devices may be improved.

Because an operation of the integrated master cylinder 1200 in the third braking mode is the same as the operation of the integrated master cylinder 1200 in the first to third braking modes of electronic brake system described above, a description thereof will be omitted to prevent duplication of contents.

Also, because an operation method of releasing the braking in the normal operation mode of the electronic brake system 3000 according to the third embodiment of the present disclosure is the same as the operation method of releasing the braking in the normal operation mode of the electronic brake system 1000 according to the first embodiment of the present disclosure described above, a separate description thereof will be omitted.

Hereinafter, an electronic brake system 4000 according to a fourth embodiment of the present disclosure will be described.

FIG. 14 is a hydraulic circuit diagram illustrating the electronic brake system 4000 according to the fourth embodiment of the present disclosure, and referring to FIG. 14, an integrated master cylinder 4200 according to the fourth embodiment may further include a first simulator spring 4271 provided to elastically support the first simulation piston 1230, and a second simulator spring 4272 provided to elastically support the second simulation piston 4272.

Because the following description of the electronic brake system 4000 according to the fourth embodiment of the present disclosure except for additional explanation with separate reference numerals is the same as the above description of the electronic brake system 3000 according to the third embodiment of the present disclosure, a description thereof will be omitted in order to prevent redundant description.

The first simulator spring 4271 is provided to elastically support the first simulation piston 1230. To this end, one end of the first simulation spring 4271 may be supported on the rear surface (left surface of FIG. 14) of the first simulation piston 1230, and the other end thereof may be supported on the front surface (right surface of FIG. 14) of the second simulation piston 1240. When the first simulation piston 1230 moves forward according to a braking operation to generate a displacement, the first simulator spring 4271 is compressed, and at this time, a pedal feeling may be provided to the driver together with the elastic member 1250 by the elastic restoring force. Thereafter, when the braking is released, as the first simulator spring 4271 expands by an elastic force thereof, the first simulation piston 1230 may return to the original position.

The second simulator spring 4272 is provided to elastically support the second simulation piston 1240. As one end of the second simulator spring 4272 is supported on the cylinder block 1210 and the other end thereof is supported on the second simulation piston 1240, the second simulator spring 4272 may elastically support the second simulation piston 1240. When the second simulation piston 1240 moves forward according to the braking operation to generate a displacement, the second simulator spring 4272 is compressed, and thereafter, when the braking is released, as the second simulator spring 4272 expands by an elastic force thereof, the second simulation piston 1240 may return to the original position.

Hereinafter, an embodiment of the present disclosure will be described in detail with reference to the accompanying drawings. The following embodiment is provided to fully convey the spirit of the present disclosure to a person having ordinary skill in the art to which the present disclosure belongs. The present disclosure is not limited to the embodiment shown herein but may be embodied in other forms. The drawings are not intended to limit the scope of the present disclosure in any way, and the size of components may be exaggerated for clarity of illustration.

FIG. 1 is a hydraulic circuit diagram illustrating an electronic brake system 1000 according to a first embodiment of the present disclosure.

Referring to FIG. 1, the electronic brake system 1000 according to the first embodiment of the present disclosure includes a reservoir 1100 in which a pressurized medium is stored, an integrated master cylinder 1200 provided to provide a reaction force against pressing of a brake pedal 10 to a driver and pressurize and discharge the pressurized medium such as brake oil accommodated therein, a hydraulic pressure supply device 1300 provided to receive an electrical signal corresponding to a pressing force by a driver from a pedal displacement sensor 11 that detects a displacement of the brake pedal 10 and to generate a hydraulic pressure of the pressurized medium through a mechanical operation, a hydraulic control unit 1400 provided to control the hydraulic pressure provided from the hydraulic pressure supply device 1300, hydraulic circuits 1510 and 1520 having wheel cylinders 20 for braking respective wheels RR, RL, FR, and FL as the hydraulic pressure of the pressurized medium is transferred, a dump controller 1800 provided between the hydraulic pressure supply device 1300 and the reservoir 1100 to control a flow of the pressurized medium, backup flow paths 1610 and 1620 are provided to hydraulically connect the integrated master cylinder 1200 and the hydraulic circuits 1510 and 1520, a reservoir flow path 1700 provided to hydraulically connect the reservoir 1100 and the integrated master cylinder 1200, and an electronic control unit (ECU, not shown) provided to control the hydraulic pressure supply device 1300 and various valves based on hydraulic pressure information and pedal displacement information.

The integrated master cylinder 1200 includes simulation chambers 1230a and 1240a, and a master chamber 1220a to, when the driver presses the brake pedal 10 for braking operation, provide a reaction force against the pressing to the driver to provide a stable pedal feel, and at the same time pressurize and discharge the pressurized medium accommodated therein.

The integrated master cylinder 1200 may be divided into a pedal simulation part to provide a pedal feel to the driver, and a master cylinder part to transfer the pressurized medium to the first hydraulic circuit 1510 side, which will be described later. The integrated master cylinder 1200 may be configured such that the master cylinder part and the pedal simulation part are sequentially provided from the brake pedal 10 side and disposed coaxially within a cylinder block 1210.

Specifically, the integrated master cylinder 1200 may include the cylinder block 1210 having a chamber formed therein, the master chamber 1220a formed on an inlet side of the cylinder block 1210 to which the brake pedal 10 is connected, a master piston 1220 provided in the master chamber 1220a and connected to the brake pedal 10 to be displaceable depending on the operation of the brake pedal 10, a piston spring 1220b provided to elastically support the master piston 1220, the first simulation chamber 1230a formed more inside than the master chamber 1220a on the cylinder block 1210, a first simulation piston 1230 provided in the first simulation chamber 1230a to be displaceable by a displacement of the master piston 1220 or a hydraulic pressure of the pressurized medium accommodated in the master chamber 1220a, the second simulation chamber 1240a formed more inside than the first simulation chamber 1230a on the cylinder block 1210, a second simulation piston 1240 provided in the second simulation chamber 1240a to be displaceable by a displacement of the first simulation chamber 1230a or a hydraulic pressure of the pressurized medium accommodated in the first simulation chamber 1230a, an elastic member 1250 disposed between the first simulation piston 1230 and the second simulation piston 1240 to provide a pedal feeling through an elastic restoring force generated during compression, a simulator spring 1270 provided to elastically support the second simulation piston 1240, a simulation flow path 1260 provided to connect the first simulation chamber 1230a and the reservoir 1100, and a simulator valve 1261 provided in the simulation flow path 1260 to control the flow of the pressurized medium.

The master chamber 1220a, the first simulation chamber 1230a, and the second simulation chamber 1240a may be sequentially formed toward the inside (left side of FIG. 1) from the brake pedal 10 side (right side of FIG. 1) on the cylinder block 1210 of the integrated master cylinder 1200. Also, the master piston 1220, the first simulation piston 1230, and the second simulation piston 1240 are disposed in the master chamber 1220a, the first simulation chamber 1230a, and the second simulation chamber 1240a, respectively, to generate a hydraulic pressure or a negative pressure by the pressurized medium accommodated in the respective chambers depending on forward or backward movement.

The master chamber 1220a may be formed on the inlet side or the outermost side (right side of FIG. 1) of the cylinder block 1210, and the master piston 1220 connected to the brake pedal 10 via an input rod 12 may be accommodated in the master chamber 1220a to enable reciprocating movement.

The pressurized medium may be introduced into and discharged from the master chamber 1220a through a first hydraulic port 1280a and a second hydraulic port 1280b. The first hydraulic port 1280a is connected to a first reservoir flow path 1710, which will be described later, so that the pressurized medium may be introduced into the master chamber 1220a from the reservoir 1100, and the second hydraulic port 1280b is connected to a first backup flow path 1610, which will be described later, so that the pressurized medium may be discharged into the first backup flow path 1610 side from the master chamber 1220a, or conversely, the pressurized medium may be introduced into the master chamber 1220a side from the first backup flow path 1610. A pair of sealing members 1290a are provided in front and rear of the first hydraulic port 1280a to prevent leakage of the pressurized medium. The pair of sealing members 1290a may allow the flow of the pressurized medium directing to the first master chamber 1220a from the reservoir 1100 through the first reservoir flow path 1710 while blocking the flow of the pressurized medium directing to the first reservoir flow path 1710 from the first master chamber 1220a.

The master piston 1220 may be accommodated in the master chamber 1220a to generate a hydraulic pressure by pressurizing the pressurized medium accommodated in the master chamber 1220a by moving forward (left direction of FIG. 1) or to generate a negative pressure inside the master chamber 1220a by moving backward (right direction of FIG. 1). The master piston 1220 may be elastically supported by the piston spring 1220b, and the piston spring 1220b may be provided with one end supported by the cylinder block 1210 and the other end supported by a flange portion formed by extending outwardly from an end of the master piston 1220.

The first simulation chamber 1230a may be formed at an inner side (left side of FIG. 1) of the master chamber 1220a on the cylinder block 1210, and the first simulation piston 1230 may be accommodated in the first simulation chamber 1230a to enable reciprocating movement.

The pressurized medium may be introduced into and discharged from the first simulation chamber 1230a through a third hydraulic port 1280c and a fourth hydraulic port 1280d. The third hydraulic port 1280c is connected to a second reservoir flow path 1720 and the simulation flow path 1260, which will be described later, so that the pressurized medium accommodated in the first simulation chamber 1230a may be discharged into the reservoir 1100 side, or conversely, the pressurized medium may be introduced from the reservoir 1100. The fourth hydraulic port 1280d is connected to the second backup flow path 1620, which will be described later, so that the pressurized medium accommodated in the first simulation chamber 1230a may be discharged into the second hydraulic circuit 1520 side, or conversely, the pressurized medium may be introduced into the first simulation chamber 1230a side from the second backup flow path 1620.

The first simulation piston 1230 may be accommodated in the first simulation chamber 1230a to generate a hydraulic pressure of the pressurized medium accommodated in the first simulation chamber 1230a or press the elastic member 1250, which will be described later, by moving forward, or to generate a negative pressure inside the first simulation chamber 1230a or return the elastic member 1250 to an original position and shape thereof by moving backward. At least one sealing member 1290b may be provided between an inner wall of the cylinder block 1210 and an outer circumferential surface of the first simulation piston 1230 to prevent leakage of the pressurized medium between the adjacent chambers.

A step portion formed to be stepped may be provided at a portion where the first simulation chamber 1230a is formed on the cylinder block 1210, and an extension portion provided to be caught on the step portion by expanding outwardly may be provided on the outer circumferential surface of the first simulation piston 1230. As the extension portion of the first simulation piston 1230 is provided to be caught on the step portion of the cylinder block 1210, in order for the first simulation piston 1230 to return to an original position thereof after moving forward by the operation of the brake pedal 10, a backward stroke degree of the first simulation piston 1230 when moving backward may be limited.

The second simulation chamber 1240a may be formed at an inner side (left side of FIG. 1) of the first simulation chamber 1230a on the cylinder block 1210, and the second simulation piston 1240 may be accommodated in the second simulation chamber 1240a to enable reciprocating movement.

The pressurized medium may be introduced into and discharged from the second simulation chamber 1240a through a fifth hydraulic port 1280e and a sixth hydraulic port 1280f. Specifically, the fifth hydraulic port 1280e is connected to a third reservoir flow path 1730, which will be described later, so that the pressurized medium may be introduced into the second simulation chamber 1240a side from the reservoir 1100 or discharged from the second simulation chamber 1240 to the reservoir 1100 side. The sixth hydraulic port 1280f is connected to an auxiliary backup flow path 1630, which will be described later, so that the pressurized medium accommodated in the second simulation chamber 1240a may be discharged into the second backup flow path 1620 side, or conversely, the pressurized medium may be introduced into the second simulation chamber 1240a side from the second backup flow path 1620 side.

The second simulation piston 1240 may be accommodated in the second simulation chamber 1240a to generate a hydraulic pressure of the pressurized medium accommodated in the second simulation chamber 1240a by moving forward, or to generate a negative pressure inside the second simulation chamber 1240*a* by moving backward. At least one sealing member 1290*c* may be provided between the inner wall of the cylinder block 1210 and an outer circumferential surface of the second simulation piston 1240 to prevent leakage of the pressurized medium between the adjacent chambers. The sealing member 1290*c* may allow the flow of the pressurized medium directing to the second simulation chamber 1240*a* from the reservoir 1100 through the third reservoir flow path 1730 while blocking the flow of the pressurized medium directing to the third reservoir flow path 1730 from the second simulation chamber 1240*a*.

The integrated master cylinder 1200 according to the present embodiment may secure safety in the event of a failure of a device by including the master chamber 1220*a* and the simulation chambers 1230*a* and 1240*a*. For example, the master chamber 1220*a* may be connected to the wheel cylinders 20 of any two of a right front wheel FR, a left front wheel FL, a left rear wheel RL, and a right rear wheel RR through the first backup flow path 1610, which will be described later, and the simulation chambers 1230*a* and 1240*a* may be connected to the wheel cylinders 20 of the other two through the second backup flow path 1620 and the auxiliary backup flow path 1630, which will be described later, and thus even when a problem such as a leak in any one of the chambers occurs, it may be possible to brake the vehicle. A detailed description thereof will be given later with reference to FIG. 6.

The elastic member 1250 is interposed between the first simulation piston 1230 and the second simulation piston 1240 to provide a pedal feeling of the brake pedal 10 to the driver by its own elastic restoring force. The elastic member 1250 may be made of a material such as compressible and expandable rubber, and when a displacement occurs in the first simulation piston 1230 by the operation of the brake pedal 10, but when the second simulation piston 1240 is maintained in an original position thereof, the elastic member 1250 is compressed, and the driver may receive a stable and familiar pedal feeling by the elastic restoring force of the compressed elastic member 1250. A detailed description thereof will be given later.

Accommodating grooves recessed in a shape corresponding to the shape of the elastic member 1250 to facilitate smooth compression and deformation of the elastic member 1250 may be provided on a rear surface (left surface of FIG. 1) of the first simulation piston 1230 and a front surface (right surface of FIG. 1) of the second simulation piston 1240, which face the elastic member 1250, respectively.

The simulator spring 1270 is provided to elastically support the second simulation piston 1240. The simulator spring 1270 has one end supported by the cylinder block 1210 and the other end supported by the second simulation piston 1240, thereby resiliently supporting the second simulation piston 1240. When the second simulation piston 1240 moves forward according to a braking operation to generate a displacement, the simulator spring 1270 is compressed, and thereafter, when the braking is released, as the simulator spring 1270 expands by an elastic force thereof, the second simulation piston 1240 may return to the original position.

The simulation flow path 1260 is provided such that the first simulation chamber 1230*a* and the reservoir 1100 are in communication with each other, and the simulator valve 1261 for controlling bidirectional flows of the pressurized medium may be provided in the simulation flow path 1260. The simulator valve 1261 may be provided as a normally closed type solenoid valve that operates to be opened when an electric signal is received from the electronic control unit in a normally closed state. The simulator valve 1261 may be opened in a normal operation mode of the electronic brake system 1000.

Explaining a pedal simulation operation by the integrated master cylinder 1200, at the same time as the driver operates the brake pedal 10 in a normal operation, a first cut valve 1611 and a second cut valve 1621 provided in the first backup flow path 1610 and the second backup flow path 1620, which will be described later, respectively, are closed, while the simulator valve 1261 in the simulation flow path 1260 is opened. As the operation of the brake pedal 10 progresses, the master piston 1220 moves forward, but the master chamber 1220*a* is sealed by a closing operation of the first cut valve 1611, so that as the hydraulic pressure of the pressurized medium accommodated in the master chamber 1220*a* is transferred to the first simulation piston 1230, the first simulation piston 1230 moves forward to generate a displacement. On the other hand, as the second cut valve 1621 is closed, the second simulation chamber 1240*a* is sealed so that a displacement of the second simulation piston 1240 is not generated, and thus the elastic member 1250 is compressed by the displacement of the first simulation piston 1230, and the elastic restoring force by compression of the elastic member 1250 may be provided to the driver as the pedal feeling. At this time, the pressurized medium accommodated in the first simulation chamber 1230*a* is transferred to the reservoir 1100 through the simulation flow path 1260. Thereafter, when the driver releases the pressing force of the brake pedal 10, the piston spring 1220*b* and the elastic member 1250 return to the original shape and position thereof by the elastic restoring force, and the first simulation chamber 1230*a* may be filled with the pressurized medium supplied from the reservoir 1100 through the simulation flow path 1260.

As such, because the insides of the first simulation chamber 1230*a* and the second simulation chamber 1240*a* are always filled with the pressurized medium, when the pedal simulation is operated, friction of the first simulation piston 1230 and the second simulation piston 1240 is minimized, so that the durability of the integrated master cylinder 1200 is improved and at the same time the inflow of foreign substances from the outside may be blocked.

A case in which the electronic brake system 1000 operates abnormally, that is, an operation of the integrated master cylinder 1200 in a fallback mode will be described later with reference to FIG. 6.

The reservoir 1100 may accommodate and store the pressurized medium therein. The reservoir 1100 may be connected to each component such as the integrated master cylinder 1200, the hydraulic pressure supply device 1300, which will be described later, and the hydraulic circuits, which will be described later, to supply or receive the pressurized medium. Although a plurality of the reservoirs 1100 is shown with the same reference numeral in the drawings, this is only an example for better understanding of the present disclosure, and the reservoir 1100 may be provided as a single component, or a plurality of the separate and independent reservoirs 1100 may be provided.

The reservoir flow path 1700 is provided to connect the integrated master cylinder 1200 and the reservoir 1100.

The reservoir flow path 1700 may include the first reservoir flow path 1710 connecting the master chamber 1220*a* and the reservoir 1100, the second reservoir flow path 1720 connecting the first simulation chamber 1230*a* and the reservoir 1100, and the third reservoir flow path 1730 connecting the second simulation chamber 1240*a* and the reservoir 1100. To this end, one end of the first reservoir flow path 1710 may communicate with the master chamber 1220a of the integrated master cylinder 1200 and the other end thereof may communicate with the reservoir 1100, one end of the second reservoir flow path 1720 may communicate with the first simulation chamber 1230a of the integrated master cylinder 1200 and the other end thereof may communicate with the reservoir 1100, and one end of the third reservoir flow path 1730 may communicate with the second simulation chamber 1240a of the integrated master cylinder 1200 and the other end thereof may communicate with the reservoir 1100. As shown in the drawing, the second reservoir flow path 1720 may be connected to the reservoir 1100 as the simulation flow path 1260 is branched from the second reservoir flow path 1720 and rejoins the second reservoir flow path 1720, but is not limited thereto, and the second reservoir flow path 1720 and the simulation flow path 1260 may be connected to the reservoir 1100 independently of each other.

A reservoir valve 1721 for controlling a flow of a braking fluid transferred through the second reservoir flow path 1720 may be provided in the second reservoir flow path 1720. The reservoir valve 1721 may be provided as a check valve allowing the flow of the pressurized medium directing to the first simulation chamber 1230a from the reservoir 1100 while blocking the flow of the pressurized medium directing to the reservoir 1100 from the first simulation chamber 1230a.

The hydraulic pressure supply device 1300 is provided to receive an electrical signal corresponding to a pressing force of the driver from the pedal displacement sensor 11 detecting a displacement of the brake pedal 10 and to generate a hydraulic pressure of the pressurized medium through a mechanical operation.

The hydraulic pressure supply device 1300 may include a hydraulic pressure providing unit to provide a pressure to the pressurized medium to be transferred to the wheel cylinders 20, a motor (not shown) to generate a rotational force by an electrical signal from the pedal displacement sensor 11, and a power conversion unit (not shown) to convert a rotational motion of the motor into a linear motion to provide the linear motion to the hydraulic pressure providing unit.

The hydraulic pressure providing unit includes a cylinder block 1310 provided such that the pressurized medium may be accommodated, a hydraulic piston 1320 accommodated in the cylinder block 1310, a sealing member 1350 provided between the hydraulic piston 1320 and the cylinder block 1310 to seal the pressure chambers 1330 and 1340, and a drive shaft 1390 to transfer power output from the power conversion unit to the hydraulic piston 1320.

The pressure chambers 1330 and 1340 may include the first pressure chamber 1330 located in the front of the hydraulic piston 1320 (left direction of the hydraulic piston 1320 in FIG. 1), and the second pressure chamber 1340 located in the rear of the hydraulic piston 1320 (right direction of the hydraulic piston 1320 in FIG. 1). That is, the first pressure chamber 1330 is provided to be partitioned by the cylinder block 1310 and a front surface of the hydraulic piston 1320 so that a volume thereof varies depending on the movement of the hydraulic piston 1320, and the second pressure chamber 1340 is provided to be partitioned by the cylinder block 1310 and a rear surface of the hydraulic piston 1320 so that a volume thereof varies depending on the movement of the hydraulic piston 1320.

The first pressure chamber 1330 is connected to a first hydraulic flow path 1401, which will be described later, through a first communication hole 1360a formed on the cylinder block 1310, and the second pressure chamber 1340 is connected to a second hydraulic flow path 1402, which will be described later, through a second communication hole 1360b formed on the cylinder block 1310.

The sealing members include a piston sealing member 1350a provided between the hydraulic piston 1320 and the cylinder block 1310 to seal between the first pressure chamber 1330 and the second pressure chamber 1340, and a drive shaft sealing member 1350b provided between the drive shaft 1390 and the cylinder block 1310 to seal between the second pressure chamber 1340 and an opening of the cylinder block 1310. The hydraulic pressure or negative pressure of the first pressure chamber 1330 and the second pressure chamber 1340 generated by the forward or backward movement of the hydraulic piston 1320 may not leak by being sealed by the piston sealing member 1350a and the drive shaft sealing member 1350b and may be transferred to the first hydraulic flow path 1401 and the second hydraulic flow path 1402, which will be described later.

The motor (not shown) is provided to generate a driving force of the hydraulic piston 1320 by an electric signal output from the electronic control unit. The motor may include a stator and a rotor, and through this configuration, may provide power to generate a displacement of the hydraulic piston 1320 by rotating in a forward or reverse direction. A rotational angular speed and a rotational angle of the motor may be precisely controlled by a motor control sensor. Because the motor is a well-known technology, a detailed description thereof will be omitted.

The power conversion unit (not shown) is provided to convert a rotational force of the motor into a linear motion. The power conversion unit may be provided as a structure including, for example, a worm shaft (not shown), a worm wheel (not shown), and the drive shaft 1390.

The worm shaft may be integrally formed with a rotation shaft of the motor and may rotate the worm wheel by a worm formed on an outer circumferential surface thereof to be engaged with the worm wheel. The worm wheel may linearly move the drive shaft 1390 by being connected to be engaged with the drive shaft 1390, and the drive shaft 1390 is connected to the hydraulic piston 1320 so that the hydraulic piston 1320 may be slidably moved within the cylinder block 1310.

Explaining the above operations again, when the displacement of the brake pedal 10 is detected by the pedal displacement sensor 11, the detected signal is transferred to the electronic control unit, and the electronic control unit drives the motor to rotate the worm shaft in one direction. The rotational force of the worm shaft is transferred to the drive shaft 1390 via the worm wheel, and the hydraulic piston 1320 connected to the drive shaft 1390 moves forward in the cylinder block 1310, thereby generating a hydraulic pressure in the first pressure chamber 1330.

Conversely, when the pressing force of the brake pedal 10 is released, the electronic control unit drives the motor to rotate the worm shaft in the opposite direction. Accordingly, the worm wheel also rotates in the opposite direction, and the hydraulic piston 1320 connected to the drive shaft 1390 moves backward in the cylinder block 1310, thereby generating a negative pressure in the first pressure chamber 1330.

The generation of a hydraulic pressure and negative pressure in the second pressure chamber 1340 may be implemented by operating opposite to the above operations. That is, when the displacement of the brake pedal 10 is detected by the pedal displacement sensor 11, the detected signal is transferred to the electronic control unit, and the electronic control unit drives the motor to rotate the worm shaft in the opposite direction. The rotational force of the worm shaft is transferred to the drive shaft 1390 via the worm wheel, and the hydraulic piston 1320 connected to the drive shaft 1390 moves backward within the cylinder block 1310, thereby generating a hydraulic pressure in the second pressure chamber 1340.

Conversely, when the pressing force of the brake pedal 10 is released, the electronic control unit drives the motor to rotate the worm shaft in one direction. Accordingly, the worm wheel also rotates in one direction, and the hydraulic piston 1320 connected to the drive shaft 1390 moves forward in the cylinder block 1310, thereby generating a negative pressure in the second pressure chamber 1340.

As such, the hydraulic pressure supply device 1300 may generate a hydraulic pressure or negative pressure in the first pressure chamber 1330 and the second pressure chamber 1340, respectively, depending on the rotation direction of the worm shaft by the operation of the motor, and whether a hydraulic pressure is transferred to the chambers to perform braking, or whether a negative pressure is generated in the chambers to release braking may be determined by controlling the valves. A detailed description thereof will be given later.

The power conversion unit according to the present embodiment is not limited to any one structure as long as it may convert the rotational motion of the motor into the linear motion of the hydraulic piston 1320, and may include devices having various structures and manners.

The hydraulic pressure supply device 1300 may be hydraulically connected to the reservoir 1100 by the dump controller 1800. The dump controller 1800 may include a first dump flow path 1810 connecting the first pressure chamber 1330 and the reservoir 1100, and a second dump flow path 1820 connecting the second pressure chamber 1340 and the reservoir 1100.

A first dump check valve 1811 and a second dump check valve 1821 for controlling the flow of the pressurized medium may be provided in the first dump flow path 1810 and the second dump flow path 1820, respectively. The first dump check valve 1811 may be provided to allow only the flow of the pressurized medium directing to the first pressure chamber 1330 from the reservoir 1100 and block the flow of the pressurized medium in the opposite direction, and the second dump check valve 1821 may be provided to allow only the flow of the pressurized medium directing to the second pressure chamber 1340 from the reservoir 1100 and block the flow of the pressurized medium in the opposite direction.

The hydraulic control unit 1400 may be provided to control a hydraulic pressure transferred to the respective wheel cylinders 20, and the electronic control unit (ECU) is provided to control the hydraulic pressure supply device 1300 and various valves based on the hydraulic pressure information and pedal displacement information.

The hydraulic control unit 1400 may include the first hydraulic circuit 1510 for controlling the flow of the hydraulic pressure to be transferred to first and second wheel cylinders 21 and 22 among the four wheel cylinders 20, and the second hydraulic circuit 1520 for controlling the flow of the hydraulic pressure to be transferred to third and fourth wheel cylinders 23 and 24, and includes a plurality of flow paths and valves to control the hydraulic pressure to be transferred from the hydraulic pressure supply device 1300 to the wheel cylinders 20.

The first hydraulic flow path 1401 is provided to be in communication with the first pressure chamber 1330, and the second hydraulic flow path 1402 is provided to be in communication with the second pressure chamber 1340. The first hydraulic flow path 1401 and the second hydraulic flow path 1402 may be provided to join in a third hydraulic flow path 1403, and then may be formed to be branched into a fifth hydraulic flow path 1405 and a sixth hydraulic flow path 1406 to be respectively connected to the first hydraulic circuit 1510 and the second hydraulic circuit 1520.

A first valve 1411 for controlling the flow of the pressurized medium may be provided in the first hydraulic flow path 1401. The first valve 1411 may be provided as a check valve allowing only the flow of the pressurized medium directing to the third hydraulic flow path 1403 from the first pressure chamber 1330 and blocking the flow of the pressurized medium in the opposite direction. A second valve 1412 for controlling the flow of the pressurized medium is provided in the second hydraulic flow path 1402, and the second valve 1412 may be provided as a bidirectional control valve for controlling the flow of the pressurized medium transferred along the second hydraulic flow path 1402. The second valve 1412 may be provided as a normally closed type solenoid valve that operates to be opened when an electric signal is received from the electronic control unit in a normally closed state. The second valve 1412 may be controlled to be opened in a second braking mode and a third braking mode in the normal operation mode of the electronic brake system 1000. A detailed description thereof will be given later with reference to FIGS. 3 and 4.

The first hydraulic flow path 1401 and the second hydraulic flow path 1402 may be joined to form the third hydraulic flow path 1403, and the third hydraulic flow path 1403 is formed to be branched into a fourth hydraulic flow path 1404 connected to the first hydraulic circuit 1510 and the fifth hydraulic flow path 1405 connected to the second hydraulic circuit 1520.

A third valve 1413 for controlling the flow of the pressurized medium may be provided in the fourth hydraulic flow path 1404. The third valve 1413 may be provided as a check valve allowing only the flow of the pressurized medium directing to the first hydraulic circuit 1510 from the third hydraulic flow path 1403 and blocking the flow of the pressurized medium in the opposite direction. A fourth valve 1414 for controlling the flow of the pressurized medium may be provided in the fifth hydraulic flow path 1405, and the fourth valve 1414 may be provided as a check valve allowing only the flow of the pressurized medium directing to the second hydraulic circuit 1520 from the third hydraulic flow path 1403 and blocking the flow of the pressurized medium in the opposite direction.

By the arrangement of the hydraulic flow paths and valves of the hydraulic control unit 1400 as described above, the hydraulic pressure generated in the first pressure chamber 1330 according to the forward movement of the hydraulic piston 1320 may be transferred to the first hydraulic circuit 1510 by sequentially passing through the first hydraulic flow path 1401, the third hydraulic flow path 1403, and the fourth hydraulic flow path 1404, and may be transferred to the second hydraulic circuit 1520 by sequentially passing through the first hydraulic flow path 1401, the third hydraulic flow path 1403, and the fifth hydraulic flow path 1405. Also, the hydraulic pressure formed in the second pressure chamber 1340 according to the backward movement of the hydraulic piston 1320 may be transferred to the first hydraulic circuit 1510 by sequentially passing through the second hydraulic flow path 1402, the third hydraulic flow path 1403, and the fourth hydraulic flow path 1404, and may be transferred to the second hydraulic circuit 1520 by sequentially passing through the second hydraulic flow path 1402, the third hydraulic flow path 1403, and the fifth hydraulic flow path 1405.

Conversely, a negative pressure may be generated in the first pressure chamber 1330 according to the backward movement of the hydraulic piston 1320, and thus the pressurized medium may be supplied from the reservoir 1100 to the first pressure chamber 1330 through the first dump flow path 1810. Also, a negative pressure may be generated in the second pressure chamber 1340 according to the forward movement of the hydraulic piston 1320, and thus the pressurized medium may be supplied from the reservoir 1100 to the second pressure chamber 1340 through the second dump flow path 1820.

A detailed description of the transfer of the hydraulic pressure and negative pressure by the arrangement of these hydraulic flow paths and valves will be given later with reference to FIGS. 2 to 5.

The first hydraulic circuit 1510 of the hydraulic control unit 1400 may control the hydraulic pressure in the first wheel cylinder 21 and the second wheel cylinder 22, which are the two wheel cylinders 20 among the four wheels RR, RL, FR, and FL, and the second hydraulic circuit 1520 may control the hydraulic pressure in the third and fourth wheel cylinders 23 and 24 which are the other two wheel cylinders 20.

The first hydraulic circuit 1510 receives the hydraulic pressure through the fourth hydraulic flow path 1404, and the fourth hydraulic flow path 1404 may be formed to be branched into two flow paths connected to the first wheel cylinder 21 and the second wheel cylinder 22. Also, the second hydraulic circuit 1520 receives the hydraulic pressure through the fifth hydraulic flow path 1405, and the fifth hydraulic flow path 1405 may be formed to be branched into two flow paths connected to the third wheel cylinder 23 and the fourth wheel cylinder 242.

The first and second hydraulic circuits 1510 and 1520 may include first to fourth inlet valves 1511a, 1511b, 1521a, and 1521b, respectively, to control the flow and hydraulic pressure of the pressurized medium to be transferred to the first to fourth wheel cylinders 21 to 24. The first to fourth inlet valves 1511a, 1511b, 1521a, and 1521b are disposed on upstream sides of the first to fourth wheel cylinders 20, respectively, and may be provided as a normally open type solenoid valve that operates to be closed when an electric signal is received from the electronic control unit in a normally open state.

The first and second hydraulic circuits 1510 and 1520 may include first to fourth check valves 1513a, 1513b, 1523a, and 1523b provided to be connected in parallel with respect to the first to fourth inlet valves 1511a, 1511b, 1521a, and 1521b. The check valves 1513a, 1513b, 1523a, and 1523b may be provided in bypass flow paths connecting front sides and rear sides of the first to fourth inlet valves 1511a, 1511b, 1521a, and 1521b on the first and second hydraulic circuits 1510 and 1520, and may allow only the flow of pressurized medium from each of the wheel cylinders 20 to the hydraulic pressure supply device 1300 while blocking the flow of the pressurized medium from the hydraulic pressure supply device 1300 to the wheel cylinders 20. By the first to fourth check valves 1513a, 1513b, 1523a, and 1523b, the hydraulic pressure of the pressurized medium applied to each of the wheel cylinders 20 may be quickly released, and even when the first to fourth inlet valves 1511a, 1511b, 1521a, and 1521b do not operate normally, the hydraulic pressure of the pressurized medium applied to the wheel cylinders 20 may be smoothly returned to the hydraulic pressure providing unit.

The first hydraulic circuit 1510 may include first and second outlet valves 1512a and 1512b for controlling the flow of the pressurized medium discharged from the first and second wheel cylinders 21 and 22 to improve performance when braking of the first and second wheel cylinders 21 and 22 is released. The first and second outlet valves 1512a and 1512b are provided on discharge sides of the first and second wheel cylinders 21 and 22, respectively, to control the flow of the pressurized medium transferred from the first and second wheel cylinders 21 and 22 to a discharge valve 1550, which will be described late. The first and second outlet valves 1512a and 1512b may be provided as normally open type solenoid valves that operate to be closed when an electric signal is received from the electronic control unit in a normally open state.

The discharge valve 1550 is provided to control the flow of the pressurized medium recovered from the first and second outlet valves 1512a and 1512b to the reservoir 1100. To this end, the discharge valve 1550 may be provided between the first and second outlet valves 1512a and 1512b and the reservoir 1100, is provided as a normally closed type valve that operates to be opened when an electric signal is received from the electronic control unit in a normally closed state, and may be provided as a solenoid valve in which an opening degree thereof is linearly adjustable to control a flow rate of the pressurized medium discharged from the first and second outlet valves 1512a and 1512b to the reservoir 1100. The discharge valve 1550 may discharge the hydraulic pressure of the pressurized medium applied to the first and second wheel cylinders 21 and 22 to the reservoir 1100 side by adjusting the opening degree in the normal operation mode of the electromagnetic brake system 1000, thereby performing a pressure reduction braking or a braking release. A release of the braking modes of the electromagnetic brake system 1000 by the discharge valve 1550 will be described later with reference to FIG. 5.

The second backup flow path 1620, which will be described later, may be branched and connected to the third and fourth wheel cylinders 23 and 24 of the second hydraulic circuit 1520, and the second cut valve 1621 may be provided in the second backup flow path 1620 to control the flow of the pressurized medium between the third and fourth wheel cylinders 23 and 24 and the integrated master cylinder 1200.

The electronic brake system 1000 according to the present embodiment may include the first and second backup flow paths 1610 and 1620 and the auxiliary backup flow path 1630 to implement braking by directly supplying the pressurized medium discharged from the integrated master cylinder 1200 to the wheel cylinders 20 when the normal operation is impossible due to a device failure or the like. A mode in which the hydraulic pressure in the integrated master cylinder 1200 is directly transferred to the wheel cylinders 20 is referred to as an abnormal operation mode, that is, a fallback mode.

The first backup flow path 1610 may be provided to connect the master chamber 1220a of the integrated master cylinder 1200 and the first hydraulic circuit 1510, and the second backup flow path 1620 may be provided to connect the first simulation chamber 1230a of the integrated master cylinder 1200 and the second hydraulic circuit 1520. The auxiliary backup flow path 1630 is provided to connect the second simulation chamber 1240a of the integrated master cylinder 1200 and the second backup flow path 1620.

Specifically, the first backup flow path 1610 may have one end connected to the master chamber 1220a and the other end connected between the first inlet valve 1511a and the first outlet valve 1512a on the first hydraulic circuit 1510, and the second backup flow path 1620 may have one end connected to the first simulation chamber 1230a and the other end connected to downstream sides of the third and fourth inlet valves 1521a and 1521b on the second hydraulic circuit 1520. Although FIG. 1 illustrates that the first backup flow path 1610 is connected between the first inlet valve 1511a and the first outlet valve 1512a, the first backup flow path 1610 may be branched and connected to at least one of upstream sides of the first outlet valve 1512a and the second outlet valve 1512b. The auxiliary backup flow path 1630 has one end connected to the second simulation chamber 1240a and the other end provided to join the second backup flow path 1620, so that the pressurized medium accommodated in the second simulation chamber 1240a may be transferred to the second backup flow path 1620.

The first cut valve 1611 for controlling the bidirectional flows of the pressurized medium may be provided in the first backup flow path 1610, and the at least one second cut valve 1621 for controlling the bidirectional flows of the pressurized medium may be provided in the second backup flow path 1620. The first cut valve 1611 and the second cut valve 1621 may be provided as normally open type solenoid valves that operate to be closed when a closing signal is received from the electronic control unit in a normally open state.

An inspection valve 1631 for controlling the bidirectional flows of the pressurized medium is provided in the auxiliary backup flow path 1630, and the inspection valve 1631 may be provided as a normally open type solenoid valve that operates to be closed when a closing signal is received from the electronic control unit in a normally open state. The inspection valve 1631 may be closed in the normal operation of the electronic brake system 1000 to seal the second simulation chamber 1240a, and may be closed in an inspection mode of inspecting whether a leak occurs in the integrated master cylinder 1200 or the simulator valve 1261. A detailed description thereof will be given later.

Accordingly, when the first and second cut valves 1621 are closed, the pressurized medium in the integrated master cylinder 1200 may be prevented from being directly transferred to the wheel cylinders 20, and at the same time the hydraulic pressure provided from the hydraulic pressure supply device 1300 may be supplied to the first and second hydraulic circuits 1510 and 1520 side through the hydraulic control unit 1400, and when the first and second cut valves 1611 and 1612 and inspection valve 1631 are opened, the pressurized medium pressurized in the integrated master cylinder 1200 may be directly supplied to the first and second hydraulic circuits 1510 and 1520 side through the first and second backup flow paths 1620 and the auxiliary backup flow path 1630, thereby performing braking.

The electronic brake system 1000 according to the present embodiment may include a pressure sensor PS to detect a hydraulic pressure in at least one of the first hydraulic circuit 1510 and the second hydraulic circuit 1520. The drawing illustrates that the pressure sensor PS is provided in the second hydraulic circuit 1520 side, but the pressure sensor is not limited to the above position and number, and as long as the hydraulic pressures in the hydraulic circuits and the integrated master cylinder 1200 may be detected, the pressure sensor may be provided in various positions and in various numbers.

Hereinafter, operation methods of the electronic brake system 1000 according to the first embodiment of the present disclosure will be described.

The operation of the electronic brake system 1000 according to the present embodiment may include the normal operation mode in which various devices and valves operate normally without failure or malfunction, the abnormal operation mode (fallback mode) in which various devices and valves operate abnormally due to failure or malfunction, and the inspection mode of inspecting whether a leak occurs in the integrated master cylinder 1200 or the simulation valve 1261.

First, the normal operation mode among the operating methods of the electronic brake system 1000 according to the present embodiment will be described.

The normal operation mode of the electronic brake system 1000 according to the present embodiment may be classified into a first braking mode, a second braking mode, and a third braking mode as the hydraulic pressure transferred from the hydraulic pressure supply device 1300 to the wheel cylinders 20 increases. Specifically, in the first braking mode, the hydraulic pressure may be firstly provided to the wheel cylinders 20 by the hydraulic pressure supply device 1300, in the second braking mode, the hydraulic pressure may be secondarily provided to the wheel cylinders 20 by the hydraulic pressure supply device 1300 to transfer a higher braking pressure than in the first braking mode, and in the third braking mode, the hydraulic pressure may be thirdly provided to the wheel cylinders 20 by the hydraulic pressure supply device 1300 to transfer a higher braking pressure than in the second braking mode.

The first to third braking modes may be changed by varying the operations of the hydraulic pressure supply device 1300 and the hydraulic control unit 1400. The hydraulic pressure supply device 1300 may provide a sufficiently high hydraulic pressure of the pressurized medium without a high specification motor by utilizing the first to third braking modes, and furthermore, may prevent unnecessary loads applied to the motor. Therefore, a stable braking force may be secured while reducing the cost and weight of the brake system, and durability and operational reliability of the devices may be improved.

FIG. 2 is a hydraulic circuit diagram illustrating that the electronic brake system 1000 according to the present embodiment performs the first braking mode.

Referring to FIG. 2, when the driver depresses the brake pedal 10 at a beginning of braking, the motor (not shown) operates to rotate in one direction, the rotational force of the motor is transferred to the hydraulic pressure providing unit by the power conversion unit, and the hydraulic piston 1320 of the hydraulic pressure providing unit moves forward, thereby generating a hydraulic pressure in the first pressure chamber 1330. The hydraulic pressure discharged from the first pressure chamber 1330 is transferred to the respective wheel cylinders 20 through the hydraulic control unit 1400, the first hydraulic circuit 1510 and the second hydraulic circuit 1520, thereby generating a braking force.

Specifically, the hydraulic pressure generated in the first pressure chamber 1330 is primarily transferred to the first wheel cylinder 21 and the second wheel cylinder 22 provided in the first hydraulic circuit 1510 by sequentially passing through the first hydraulic flow path 1401, the third hydraulic flow path 1403, and the fourth hydraulic flow path 1404. At this time, as the first valve 1411 and the third valve 1413 are provided as check valves allowing only the flow of the pressurized medium directing to the first hydraulic circuit 1510 side from the first pressure chamber 1330, the hydraulic pressure of the pressurized medium may be smoothly transferred to the first and second wheel cylinders 21 and 22. Also, the first inlet valve 1511a and the second inlet valve 1511b provided in the first hydraulic circuit 1510 are maintained in an open state, and the first outlet valve 1512a, the second outlet valve 1512b, and the discharge valve 1550 are controlled to be closed, thereby preventing the hydraulic pressure of the pressurized medium from leaking into the reservoir 1100 side.

Also, the hydraulic pressure of the pressurized medium generated in the first pressure chamber 1330 is primarily transferred to the third and fourth wheel cylinders 23 and 24 provided in the second hydraulic circuit 1520 by sequentially passing through the first hydraulic flow path 1401, and the third hydraulic flow path 1403, and the fifth hydraulic flow path 1405. As described above, as the first valve 1411 and the fourth valve 1414 are provided as check valves allowing only the flow of the pressurized medium directing to the second hydraulic circuit 1520 side from the first pressure chamber 1330, the hydraulic pressure of the pressurized medium may be smoothly transferred to the third and fourth wheel cylinders 23 and 24. Also, the third inlet valve 1521a and the fourth inlet valve 1521b provided in the second hydraulic circuit 1520 are maintained in an open state, and a second cut valve 1622 is maintained in a closed state, thereby preventing the hydraulic pressure of the pressurized medium from leaking into the second backup flow path 1620 side.

In the first braking mode, as the second dump check valve 1821 provided in the second dump flow path 1820 connected to the second pressure chamber 1340 allows the pressurized medium to be supplied from the reservoir 1100 to the second pressure chamber 1340, the second pressure chamber 1340 may be filled with the pressurized medium, thereby preparing the second braking mode, which will be described later.

In the first braking mode in which braking of the wheel cylinders 20 is performed by the hydraulic pressure supply device 1300, the first cut valve 1611 and the second cut valve 1621 provided in the first backup flow path 1610 and the second backup flow path 1620, respectively, are switched to be closed, so that the pressurized medium discharged from the integrated master cylinder 1200 is prevented from being transferred to the wheel cylinders 20 side.

Specifically, because the first cut valve 1611 is closed when a pressing force is applied to the brake pedal 10, the master chamber 1220a is sealed. Therefore, as the pressing force is applied to the brake pedal 10, the pressurized medium accommodated in the master chamber 1220a is pressurized to generate a hydraulic pressure, the hydraulic pressure of the pressurized medium generated in the master chamber 1220a is transferred to the front surface (right side of FIG. 2) of the first simulation piston 1230, and the simulator valve 1261 is opened in the normal operation mode, so that a displacement is generated in the first simulation piston 1230. On the other hand, because the inspection valve 1631 is closed in the normal operation mode of the electronic brake system 1000, the second simulation chamber 1240a is sealed so that a displacement is not generated in the second simulation piston 1240, and thus the elastic member 1250 is compressed by the displacement of the first simulation piston 1230, and the elastic restoring force by the compression of the elastic member 1250 is provided to the driver as a pedal feeling. At this time, the pressurized medium accommodated in the first simulation chamber 1230a is discharged to the reservoir 1100 through the simulation flow path 1260.

The electronic brake system 1000 according to the present embodiment may switch from the first braking mode to the second braking mode illustrated in FIG. 3 when a braking pressure higher than that in the first braking mode is to be provided.

FIG. 3 is a hydraulic circuit diagram illustrating that the electronic brake system 1000 according to the present embodiment performs the second braking mode, and referring to FIG. 3, when a displacement or an operating speed of the brake pedal 10 detected by the pedal displacement sensor 11 is higher than a preset level or a hydraulic pressure detected by the pressure sensor is higher than a preset level, the electronic control unit may switch from the first braking mode to the second braking mode by determining that a higher braking pressure is required.

When the first braking mode is switched to the second braking mode, the motor operates to rotate in the other direction, and the rotational force of the motor is transferred to the hydraulic pressure providing unit by the power conversion unit so that the hydraulic piston 1320 moves backward, thereby generating a hydraulic pressure in the second pressure chamber 1340. The hydraulic pressure discharged from the second pressure chamber 1340 is transferred to the respective wheel cylinders 20 through the hydraulic control unit 1400, the first hydraulic circuit 1510, and the second hydraulic circuit 1520, thereby generating a braking force.

Specifically, the hydraulic pressure generated in the second pressure chamber 1340 is secondarily transferred to the first wheel cylinder 21 and the second wheel cylinder 22 provided in the first hydraulic circuit 1510 by sequentially passing through the second hydraulic flow path 1402, the third hydraulic flow path 1403, and the fourth hydraulic flow path 1404. At this time, as the second valve 1412 provided in the second hydraulic flow path 1402 is opened, the flow of the pressurized medium transferred along the second hydraulic flow path 1402 toward the third hydraulic flow path 1403 may be stably provided. The first inlet valve 1511a and the second inlet valve 1511b provided in the first hydraulic circuit 1510 are maintained in the open state, and the first outlet valve 1512a, the second outlet valve 1512b, and the discharge valve 1550 are closed, thereby preventing the hydraulic pressure of the pressurized medium from leaking into the reservoir 1100 side.

Also, the hydraulic pressure generated in the second pressure chamber 1340 is secondarily transferred to the third wheel cylinder 23 and the fourth wheel cylinder 24 provided in the second hydraulic circuit 1520 by sequentially passing through the second hydraulic flow path 1402, the third hydraulic flow path 1403, and the fifth hydraulic flow path 1405.

As the fourth valve 1414 provided in the fifth hydraulic flow path 1405 is provided as a check valve allowing only the flow of the pressurized medium directing to the second hydraulic circuit 1520 side from the second pressure chamber 1340, the hydraulic pressure of the pressurized medium may be smoothly transferred to the third wheel cylinder 23 and the fourth wheel cylinder 24. The third inlet valve 1521a and the fourth inlet valve 1521b provided in the second hydraulic circuit 1520 are maintained in the open state, and the second cut valve 1622 is maintained in the closed state, thereby preventing the hydraulic pressure of the pressurized medium from leaking into the second backup flow path 1620 side.

In the second braking mode, as the first valve 1411 provided in the first hydraulic flow path 1401 is provided as a check valve blocking the flow of the pressurized medium directing to the first pressure chamber 1330, the hydraulic pressure of the pressurizing medium generated in the second pressure chamber 1340 may be prevented from being transferred to the first pressure chamber 1330. Also, as the first dump check valve 1811 provided in the first dump flow path 1810 connected to the first pressure chamber 1330 allows the pressurized medium to be supplied from the reservoir 1100 to the first pressure chamber 1330, the first pressure chamber 1330 may be filled with the pressurized medium, thereby preparing the third braking mode, which will be described later.

Because an operation of the integrated master cylinder 1200 in the second braking mode is the same as the operation of the integrated master cylinder 1200 in the first braking mode described above, a description thereof will be omitted to prevent duplication of contents.

The electronic brake system 1000 according to the present embodiment may switch from the second braking mode to the third braking mode illustrated in FIG. 4 when a braking pressure higher than that in the second braking mode is to be provided.

FIG. 4 is a hydraulic circuit diagram illustrating that the electronic brake system 1000 according to the present embodiment performs the third braking mode.

Referring to FIG. 4, when a displacement or an operating speed of the brake pedal 10 detected by the pedal displacement sensor 11 is higher than a preset level or a hydraulic pressure detected by the pressure sensor is higher than a preset level, the electronic control unit may switch from the second braking mode to the third braking mode by determining that a higher braking pressure is required.

When the second braking mode is switched to the third braking mode, the motor (not shown) operates to rotate in one direction, and the rotational force of the motor is transferred to the hydraulic pressure providing unit by the power conversion unit so that the hydraulic piston 1320 of the hydraulic pressure providing unit moves forward again, thereby generating a hydraulic pressure in the first pressure chamber 1330. The hydraulic pressure discharged from the first pressure chamber 1330 is transferred to the respective wheel cylinders 20 through the hydraulic control unit 1400, the first hydraulic circuit 1510, and the second hydraulic circuit 1520, thereby generating a braking force.

Specifically, the hydraulic pressure generated in the first pressure chamber 1330 is thirdly transferred to the first wheel cylinder 21 and the second wheel cylinder 22 provided in the first hydraulic circuit 1510 by sequentially passing through the first hydraulic flow path 1401, the third hydraulic flow path 1403, and the fourth hydraulic flow path 1404. At this time, as the first valve 1411 and the third valve 1413 are provided as check valves allowing only the flow of the pressurized medium directing to the first hydraulic circuit 1510 side from the first pressure chamber 1330, the hydraulic pressure of the pressurized medium may be smoothly transferred to the first and second wheel cylinders 21 and 22. Also, the first inlet valve 1511a and the second inlet valve 1511b provided in the first hydraulic circuit 1510 are maintained in the open state, and the first outlet valve 1512a, the second outlet valve 1512b, and the discharge valve 1550 are maintained in a closed state, thereby preventing the hydraulic pressure of the pressurized medium from leaking into the reservoir 1100 side.

Also, the hydraulic pressure of the pressurized medium generated in the first pressure chamber 1330 is thirdly transferred to the third wheel cylinder 23 and the fourth wheel cylinder 24 provided in the second hydraulic circuit 1520 by sequentially passing through the first hydraulic flow path 1401, the third hydraulic flow path 1403, and the fifth hydraulic flow path 1405. As described above, as the first valve 1411 and the fourth valve 1414 are provided as check valves allowing only the flow of the pressurized medium directing to the second hydraulic circuit 1520 side from the first pressure chamber 1330, the hydraulic pressure of the pressurized medium may be smoothly transferred to the third wheel cylinder 23 and the fourth wheel cylinder 24. The third inlet valve 1521a and the fourth inlet valve 1521b provided in the second hydraulic circuit 1520 are maintained in the open state, and the second cut valve 1622 is maintained in the closed state, thereby preventing the hydraulic pressure of the pressurized medium from leaking into the second backup flow path 1620 side.

Because the hydraulic pressure of a high pressure is provided in the third braking mode, as the hydraulic piston 1320 moves forward, a force of the hydraulic pressure in the first pressure chamber 1330 to move the hydraulic piston 1320 backward also increases, so that a load applied to the motor increases rapidly. Accordingly, in the third braking mode, the second valve 1412 is operated to open, thereby allowing the flow of the pressurized medium through the second hydraulic flow path 1402. In other words, a part of the hydraulic pressure generated in the first pressure chamber 1330 may be supplied to the second pressure chamber 1340 by sequentially passing through the first hydraulic flow path 1401 and the second flow path 1402, and through this, the first pressure chamber 1330 and the second pressure chamber 1340 are in communication with each other to synchronize the hydraulic pressure, so that the load applied to the motor may be reduced and the durability and reliability of the devices may be improved.

Because an operation of the integrated master cylinder 1200 in the third braking mode is the same as the operation of the integrated master cylinder 1200 in the first braking mode described above, a description thereof will be omitted to prevent duplication of contents.

Hereinafter, an operation method of releasing the braking in the normal operation mode of the electronic brake system 1000 according to the present embodiment will be described.

FIG. 5 is a hydraulic circuit diagram illustrating that the electronic brake system 1000 according to the present embodiment releases the braking.

Referring to FIG. 5, when the pressing force applied to the brake pedal 10 is released, the motor generates a rotational force in any one direction and transmits the rotational force to the power conversion unit, and the power conversion unit returns the hydraulic piston 1320 to an original position thereof. As the hydraulic piston 1320 moves forward or backward to return to the original position, the hydraulic pressure generated in the first pressure chamber 1330 or the second pressure chamber 1340 may be transferred to the first hydraulic circuit 1510 or the second hydraulic circuit 1520 through the hydraulic control unit 1400 to be discharged to the reservoir 1100 side together with the hydraulic pressure of the pressurizing medium applied to the wheel cylinders 20.

Specifically, the hydraulic pressure of the pressurized medium applied to the first wheel cylinder 21 and the second wheel cylinder 22 provided in the first hydraulic circuit 1510 may be discharged to the reservoir 1100 by sequentially passing through the first outlet valve 1512a, the second outlet valve 1512b, and the discharge valve 1550. To this end, the first and second outlet valves 1512a and 1512b may be switched to an open state, and the discharge valve 1550 may adjust the flow rate of the pressurized medium to be discharged to the reservoir 1100 by adjusting the opening degree depending on a displacement amount of the brake pedal 10, thereby performing the pressure reduction braking or the braking release. At this time, as described above, the first inlet valve 1511a and the second inlet valve 1511b may be maintained in the open state so that the hydraulic pressure generated in the first pressure chamber 1330 or the second pressure chamber 1340 by the return of the hydraulic piston 1320 to the original position may also be discharged to the reservoir 1100 by sequentially passing through the first outlet valve 1512a, the second outlet valve 1512b, and the discharge valve 1550.

Also, the hydraulic pressure of the pressurized medium applied to the third wheel cylinder 23 and the fourth wheel cylinder 24 provided in the second hydraulic circuit 1520 may be discharged to the reservoir 1100 by sequentially passing through the second backup flow path 1620, the first simulation chamber 1230a, and the simulation flow path 1260. To this end, the second cut valve 1621 and the simulator valve 1261 may be switched to an open state, and at least one of the second cut valve 1621 and in response to a degree of pressure reduction of the hydraulic pressure applied to the first hydraulic circuit 1510 being adjusted by the discharge valve 1550, the simulator valve 1261 may be provided as a solenoid valve that is linearly controlled to adjust the flow rate of the pressurized medium passing therethrough, like the discharge valve 1550. At this time, as described above, the third inlet valve 1521a and the fourth inlet valve 1521b may be maintained in the open state so that the hydraulic pressure generated in the first pressure chamber 1330 or the second pressure chamber 1340 by the return of the hydraulic piston 1320 to the original position may also be discharged to the reservoir 1100 by sequentially passing through the second backup flow path 1620, the first simulation chamber 1230a, and the simulation flow path 1260. Hereinafter, the case in which the electronic brake system 1000 according to the present embodiment does not operate normally, that is, operates in the fallback mode will be described.

FIG. 6 is a hydraulic circuit diagram illustrating that the electronic brake system 1000 according to the present embodiment operates in the case in which the normal operation is impossible due to a device failure or the like, that is, in the case of the abnormal operation mode (fallback mode).

Referring to FIG. 6, in the abnormal operation mode, each of the valves is controlled to an initial braking state which is a non-operational state. At this time, when the driver depresses the brake pedal 10, the master piston 1220 connected to the brake pedal 10 moves forward to generate a displacement. Because the first cut valve 1611 is provided in the open state in the non-operational state, by the forward movement of the master piston 1220, the pressurized medium accommodated in the master chamber 1220a is transferred to the first wheel cylinder 21 and the second wheel cylinder 22 of the first hydraulic circuit 1510 along the first backup flow path 1610, thereby performing braking.

Also, the pressurized medium accommodated in the master chamber 1220a moves the first simulation piston 1230 forward to generate a displacement, so that the pressurized medium accommodated in the first simulation chamber 1230a is transferred to the third wheel cylinder 23 and the fourth wheel cylinder 24 of the second hydraulic circuit 1520 along the second backup flow path 1620, thereby performing braking. At the same time, the second simulation piston 1240 also generates a displacement by moving forward due to the displacement of the first simulation piston 1230, so that the pressurized medium accommodated in the second simulation chamber 1240a may be provided to the second hydraulic circuit 1520 by joining into the second backup flow path 1620 along the auxiliary backup flow path 1630. At this time, because the simulator valve 1261 is provided in a closed state in the non-operational state, the pressurized medium accommodated in the first simulation chamber 1230a may be transferred to the second backup flow path 1620 without being discharged to the reservoir 1100, and at the same time, may generate a hydraulic pressure for moving the second simulation piston 1240 forward, and because the inspection valve 1631 and the second cut valve 1621 are provided in an open state, the pressurized medium accommodated in the first simulation chamber 1230a and the second simulation chamber 1240a may be transferred to the second backup flow path 1620.

Hereinafter, the inspection mode of the electronic brake system 1000 according to the present embodiment will be described.

FIG. 7 is a hydraulic circuit diagram illustrating that the electronic brake system 1000 according to the present embodiment performs the inspection mode, and referring to FIG. 7, the electronic brake system 1000 according to the present embodiment may perform the inspection mode of inspecting whether a leak is generated in the integrated master cylinder 1200 or the simulator valve 1261. When the inspection mode is performed, the electronic control unit controls to supply the hydraulic pressure generated from the hydraulic pressure supply device 1300 to the first simulation chamber 1230a of the integrated master cylinder 1200.

Specifically, in a state in which each of the valves is controlled to the initial braking state, which is the non-operational state, the electronic control unit operates to move the hydraulic piston 1320 forward, so that a hydraulic pressure is generated in the first pressure chamber 1330, the inspection valve 1631 and the first cut valve 1611 are switched to a closed state, and the second cut valve 1621 is maintained in the open state. Accordingly, as the hydraulic pressure generated in the first pressure chamber 1330 is transferred to the second hydraulic circuit 1520 side by sequentially passing through the first hydraulic flow path 1401, the third hydraulic flow path 1403, and the fifth hydraulic flow path 1405, and the third inlet valve 1521a and the fourth inlet valve 1521b are maintained in a normally open state, the pressurized medium transferred to the second hydraulic circuit 1520 is introduced into the first simulation chamber 1230a through the second backup flow path 1620. At this time, the simulator valve 1261 is maintained in the closed state to induce the first simulation chamber 1230a to be in a sealed state.

In this state, by comparing an expected hydraulic pressure value of the pressurized medium to be generated by the displacement of the hydraulic piston 1320 with a hydraulic pressure value in the second hydraulic circuit 1520 or the first simulation chamber 1230a measured by the pressure sensor PS, a leak in the integrated master cylinder 1200 or the simulator valve 1261 may be diagnosed. Specifically, the expected hydraulic pressure value calculated based on a displacement amount of the hydraulic piston 1320 or a rotational angle measured by a motor control sensor (not shown) is compared with an actual hydraulic pressure value measured by the pressure sensor PS, and when the two hydraulic pressure values match, it may be determined that there is no leak in the integrated master cylinder 1200 or the simulator valve 1261. On the other hand, when the actual hydraulic pressure value measured by the pressure sensor PS is lower than the expected hydraulic pressure value calculated based on the displacement amount of the hydraulic piston 1320 or the rotational angle measured by the motor control sensor (not shown), this is due to the loss of a part of the hydraulic pressure of the pressurized medium applied to the first simulation chamber 1230*a*, and thus it may be determined that there is a leak in the integrated master cylinder 1200 or the simulator valve 1261, and this leak may be notified to the driver.

Hereinafter, an electronic brake system 2000 according to a second embodiment of the present disclosure will be described.

FIG. 8 is a hydraulic circuit diagram illustrating the electronic brake system 2000 according to the second embodiment of the present disclosure, and referring to FIG. 8, a fourth valve 2414 of a hydraulic control unit 2400 according to the second embodiment of the present disclosure is provided to perform cooperative control for a regenerative braking mode.

Because the following description of the electronic brake system 2000 according to the second embodiment of the present disclosure except for additional explanation with separate reference numerals is the same as the above description of the electronic brake system 1000 according to the first embodiment of the present disclosure, a description thereof will be omitted in order to prevent redundant description.

Recently, as the market demand for eco-friendly vehicles increases, hybrid vehicles with improved fuel efficiency are gaining popularity. The hybrid vehicle recovers kinetic energy as electric energy while braking the vehicle, stores the electric energy in a battery, and then utilizes the motor as an auxiliary driving source of the vehicle, and the hybrid vehicle typically recovers energy by a generator (not shown) or the like during a braking operation of the vehicle in order to increase the energy recovery rate. This braking operation is referred to as a regenerative braking mode, and in the electronic brake system 2000 according to the present embodiment, a generator (not shown) may be provided in the third wheel cylinder 23 and the fourth wheel cylinder 24 of the second hydraulic circuit 1520 to implement the regenerative braking mode. The generator and the fourth valve 2414 in the third and fourth wheel cylinders 23 and 24 may perform the regenerative braking mode through cooperative control.

The fourth valve 2414 provided in the fifth hydraulic flow path 1405 may be provided as a bidirectional control valve for controlling the flow of the pressurized medium transferred along the fifth hydraulic flow path 1405. The fourth valve 2414 may be provided as a normally closed type solenoid valve that operates to be opened when an electric signal is received from the electronic control unit in a normally closed state. The fourth valve 2414 is controlled to be opened in a normal operation mode of the electronic brake system 2000, and may be switched to a closed state when entering the regenerative braking mode by the generator (not shown) provided in the third wheel cylinder 23 and the fourth wheel cylinder 24.

Hereinafter, the regenerative braking mode of the electronic brake system 2000 according to the second embodiment of the present disclosure will be described.

FIG. 9 is a hydraulic circuit diagram illustrating that the electronic brake system 2000 according to the second embodiment of the present disclosure performs the regenerative braking mode, and referring to FIG. 9, while in the case of the first wheel cylinder 21 and the second wheel cylinder 22 of the first hydraulic circuit 1510, a braking force that the driver intends to implement is only generated by the hydraulic pressure of the pressurized medium by the operation of the hydraulic pressure supply device 1300, in the case of the third wheel cylinder 23 and the fourth wheel cylinder 24 of the second hydraulic circuit 1520 in which an energy recovery device such as a generator is installed, the sum of the braking pressure of the pressurized medium by the hydraulic pressure supply device 1300 and the total braking pressure plus the regenerative braking pressure by the generator should be equal to the total braking force of the first wheel cylinder 21 and the second wheel cylinder 22.

Therefore, when entering the regenerative braking mode, as the braking pressure by the hydraulic pressure supply device 1300 applied to the third wheel cylinder 23 and the fourth wheel cylinder 24 is removed or maintained constant by closing the fourth valve 2414, and at the same time the regenerative braking pressure by the generator is increased, the total braking force of the third and fourth wheel cylinders 23 and 24 may be equal to the braking force of the first and second wheel cylinders 21 and 22.

Specifically, when the driver depresses the brake pedal 10 to brake the vehicle, the motor (not shown) operates to rotate in one direction, the rotational force of the motor is transferred to the hydraulic pressure providing unit by the power conversion unit, and the hydraulic piston 1320 of the hydraulic pressure providing unit moves forward, thereby generating a hydraulic pressure in the first pressure chamber 1330. The hydraulic pressure discharged from the first pressure chamber 1330 is transferred to the respective wheel cylinders 20 through the hydraulic control unit 1400, the first hydraulic circuit 1510 and the second hydraulic circuit 1520, thereby generating a braking force.

In the case of the first hydraulic circuit 1510 in which an energy recovery device such as a generator is not installed, the hydraulic pressure of the pressurized medium generated in the first pressure chamber 1330 sequentially passes through the first hydraulic flow path 1401, the third hydraulic flow path 1403, and the fourth hydraulic flow path 1404, and is transferred to the first and second wheel cylinders 21 and 22, thereby performing braking. As described above, as the first valve 1411 and the third valve 1413 allow the flow of the pressurized medium directing to the first hydraulic circuit 1510 from the first pressure chamber 1330, the hydraulic pressure of the pressurizing medium generated in the first pressure chamber 1330 may be transferred to the first hydraulic circuit 1510.

On the other hand, in the case of the second hydraulic circuit 1520 in which the generator is installed, when the electronic control unit determines that it is possible to enter the regenerative braking mode by sensing a speed, deceleration, etc. of the vehicle, the electronic control unit may close the fourth valve 2414 to block transmission of the hydraulic pressure of the pressurized medium to the third wheel cylinder 23 and the fourth wheel cylinder 24, and may implement regenerative braking by the generator. Thereafter, when the electronic control unit determines that the vehicle is in an unsuitable state for regenerative braking, or the braking pressure in the first hydraulic circuit 1510 and the braking pressure in the second hydraulic circuit 1520 are different, the electronic control unit may control the hydraulic pressure of the pressurizing medium to be transferred to the second hydraulic circuit 1520 by switching the fourth valve 2414 to an open state, and the at the same time may synchronize the braking pressure in the first hydraulic circuit 1510 and the braking pressure in the second hydraulic circuit 1520. Accordingly, the braking pressure or braking force applied to the first to fourth wheel cylinders 20 may be uniformly controlled, so that in addition to braking stability of the vehicle, oversteering or understeering may be prevented to improve driving stability of the vehicle.

Hereinafter, an electronic brake system 3000 according to a third embodiment of the present disclosure will be described.

FIG. 10 is a hydraulic circuit diagram illustrating the electronic brake system 3000 according to the third embodiment of the present disclosure, and referring to FIG. 10, a hydraulic control unit 3400 according to the third embodiment of the present disclosure may be provided to further include a sixth hydraulic flow path 3406 connecting the first hydraulic flow path 1401 and the second hydraulic flow path 1402, and a fifth valve 3415 provided in the sixth hydraulic flow path 3406 to control the flow of the pressurized medium, and a second valve 3412 provided in the second hydraulic flow path 1402 may be provided as a check valve allowing only the flow of the pressurized medium discharged from the second pressure chamber 1340.

Because the following description of the electronic brake system 3000 according to the third embodiment of the present disclosure except for additional explanation with separate reference numerals is the same as the above description of the electronic brake system 1000 according to the first embodiment of the present disclosure, a description thereof will be omitted in order to prevent redundant description.

The second valve 3412 provided in the second hydraulic flow path 1402 may be provided as a check valve allowing only the flow of the pressurized medium directing to the third hydraulic flow path 1403 from the second pressure chamber 1340 and blocking the flow of the pressurized medium in the opposite direction.

The sixth hydraulic flow path 3406 is provided to connect the first hydraulic flow path 1401 and the second hydraulic flow path 1402. Specifically, one end of the sixth hydraulic flow path 3406 may be connected between the first pressure chamber 1330 and the first valve 1411 on the first hydraulic flow path 1401, and the other end thereof may be connected between the second pressure chamber 1340 and the second valve 3412 on the second hydraulic flow path 1402. The fifth valve 3415 is provided in the sixth hydraulic flow path 3406 to control the flow of the pressurized medium, and may be provided as a bidirectional control valve for controlling the flow of the pressurized medium transferred along the second hydraulic flow path 1402. The fifth valve 3415 may be provided as a normally closed type solenoid valve that operates to be opened when an electric signal is received from the electronic control unit in a normally closed state. The fifth valve 3415 may be controlled to be opened in a third braking mode of a normal operation mode of the electronic brake system 3000. A detailed description thereof will be given later with reference to FIG. 13.

Hereinafter, an operation method of the electronic brake system 3000 according to the third embodiment of the present disclosure will be described.

The normal operation mode of the electronic brake system 3000 according to the third embodiment of the present disclosure may be classified into a first braking mode, a second braking mode, and the third braking mode as the hydraulic pressure transferred from the hydraulic pressure supply device 1300 to the wheel cylinders 20 increases. Specifically, in the first braking mode, the hydraulic pressure may be firstly provided to the wheel cylinders 20 by the hydraulic pressure supply device 1300, in the second braking mode, the hydraulic pressure may be secondarily provided to the wheel cylinders 20 by the hydraulic pressure supply device 1300 to transfer a higher braking pressure than in the first braking mode, and in the third braking mode, the hydraulic pressure may be thirdly provided to the wheel cylinders 20 by the hydraulic pressure supply device 1300 to transfer a higher braking pressure than in the second braking mode.

The first to third braking modes may be changed by varying the operations of the hydraulic pressure supply device 1300 and the hydraulic control unit 3400. The hydraulic pressure supply device 1300 may provide a sufficiently high hydraulic pressure of the pressurized medium without a high specification motor by utilizing the first to third braking modes, and furthermore, may prevent unnecessary loads applied to the motor. Therefore, a stable braking force may be secured while reducing the cost and weight of the brake system, and durability and operational reliability of the devices may be improved.

FIG. 11 is a hydraulic circuit diagram illustrating that the electronic brake system 3000 according to the third embodiment of the present disclosure performs the first braking mode.

Referring to FIG. 11, when the driver depresses the brake pedal 10 at the beginning of braking, the motor (not shown) operates to rotate in one direction, the rotational force of the motor is transferred to the hydraulic pressure providing unit by the power conversion unit, and the hydraulic piston 1320 of the hydraulic pressure providing unit moves forward, thereby generating a hydraulic pressure in the first pressure chamber 1330. The hydraulic pressure discharged from the first pressure chamber 1330 is transferred to the respective wheel cylinders 20 through the hydraulic control unit 1400, the first hydraulic circuit 1510 and the second hydraulic circuit 1520, thereby generating a braking force.

Specifically, the hydraulic pressure generated in the first pressure chamber 1330 is primarily transferred to the first wheel cylinder 21 and the second wheel cylinder 22 provided in the first hydraulic circuit 1510 by sequentially passing through the first hydraulic flow path 1401, the third hydraulic flow path 1403, and the fourth hydraulic flow path 1404. At this time, the fifth valve 3415 is maintained in a closed state to prevent the hydraulic pressure generated in the first pressure chamber 1330 from leaking into the second pressure chamber 1340 along the sixth hydraulic flow path 3406. Also, as the first valve 1411 and the third valve 1413 are provided as check valves allowing only the flow of the pressurized medium directing to the first hydraulic circuit 1510 side from the first pressure chamber 1330, the hydraulic pressure of the pressurized medium may be smoothly transferred to the first and second wheel cylinders 21 and 22. The first inlet valve 1511a and the second inlet valve 1511b provided in the first hydraulic circuit 1510 are maintained in the open state, and the first outlet valve 1512a, the second outlet valve 1512b, and the discharge valve 1550 are maintained in the closed state, thereby preventing the hydraulic pressure of the pressurized medium from leaking into the reservoir 1100 side.

The hydraulic pressure of the pressurized medium generated in the first pressure chamber 1330 is primarily transferred to the third and fourth wheel cylinders 23 and 24 provided in the second hydraulic circuit 1520 by sequentially passing through the first hydraulic flow path 1401, and the third hydraulic flow path 1403, and the fifth hydraulic flow path 1405. As described above, the fifth valve 3415 is maintained in the closed state to prevent the hydraulic pressure generated in the first pressure chamber 1330 from leaking into the second pressure chamber 1340 side along the sixth hydraulic flow path 3406, and as the first valve 1411 and the fourth valve 1414 are provided as check valves allowing only the flow of the pressurized medium directing to the second hydraulic circuit 1520 side from the first pressure chamber 1330, the hydraulic pressure of the pressurized medium may be smoothly transferred to the third and fourth wheel cylinders 23 and 24. The third inlet valve 1521a and the fourth inlet valve 1521b provided in the second hydraulic circuit 1520 are maintained in the open state, and the second cut valve 1622 is maintained in the closed state, thereby preventing the hydraulic pressure of the pressurized medium from leaking into the second backup flow path 1620 side.

In the first braking mode, as the second dump check valve 1821 provided in the second dump flow path 1820 connected to the second pressure chamber 1340 allows the pressurized medium to be supplied from the reservoir 1100 to the second pressure chamber 1340, the second pressure chamber 1340 may be filled with the pressurized medium, thereby preparing the second braking mode, which will be described later.

Because an operation of the integrated master cylinder 1200 in the first braking mode is the same as the operation of the integrated master cylinder 1200 in the first to third braking modes of the electronic brake system according to the first embodiment described above, a description thereof will be omitted to prevent duplication of contents.

The electronic brake system 3000 according to the third embodiment of the present disclosure may switch from the first braking mode to the second braking mode illustrated in FIG. 12 when a braking pressure higher than that in the first braking mode is to be provided.

FIG. 12 is a hydraulic circuit diagram illustrating that the electronic brake system 3000 according to the third embodiment of the present disclosure performs the second braking mode, and referring to FIG. 12, when a displacement or an operating speed of the brake pedal 10 detected by the pedal displacement sensor 11 is higher than a preset level or a hydraulic pressure detected by the pressure sensor is higher than a preset level, the electronic control unit may switch from the first braking mode to the second braking mode by determining that a higher braking pressure is required.

When the first braking mode is switched to the second braking mode, the motor operates to rotate in the other direction, and the rotational force of the motor is transferred to the hydraulic pressure providing unit by the power conversion unit so that the hydraulic piston 1320 moves backward, thereby generating a hydraulic pressure in the second pressure chamber 1340. The hydraulic pressure discharged from the second pressure chamber 1340 is transferred to the respective wheel cylinders 20 through the hydraulic control unit 1400, the first hydraulic circuit 1510, and the second hydraulic circuit 1520, thereby generating a braking force.

Specifically, the hydraulic pressure generated in the second pressure chamber 1340 is secondarily transferred to the first wheel cylinder 21 and the second wheel cylinder 22 provided in the first hydraulic circuit 1510 by sequentially passing through the second hydraulic flow path 1402, the third hydraulic flow path 1403, and the fourth hydraulic flow path 1404. At this time, the fifth valve 3415 is maintained in the closed state to prevent the hydraulic pressure generated in the second pressure chamber 1340 from leaking into the first pressure chamber 1330 side along the sixth hydraulic flow path 3406. Also, as the second valve 3412 and the third valve 1413 are provided as check valves allowing only the flow of the pressurized medium directing to the first hydraulic circuit 1510 side from the first pressure chamber 1330, the hydraulic pressure of the pressurized medium may be smoothly transferred to the first and second wheel cylinders 21 and 22. The first inlet valve 1511a and the second inlet valve 1511b provided in the first hydraulic circuit 1510 are maintained in the open state, and the first outlet valve 1512a, the second outlet valve 1512b, and the discharge valve 1550 are maintained in the closed state, thereby preventing the hydraulic pressure of the pressurized medium from leaking into the reservoir 1100 side.

Also, the hydraulic pressure generated in the second pressure chamber 1340 is secondarily transferred to the third wheel cylinder 23 and the fourth wheel cylinder 24 provided in the second hydraulic circuit 1520 by sequentially passing through the second hydraulic flow path 1402, the third hydraulic flow path 1403, and the fifth hydraulic flow path 1405. At this time, as described above, the fifth valve 3415 is maintained in the closed state to prevent the hydraulic pressure generated in the second pressure chamber 1340 from leaking into the first pressure chamber 1330 side along the sixth hydraulic flow path 3406, and as the fourth valve 1414 provided in the fifth hydraulic flow path 1405 is provided as check valves allowing only the flow of the pressurized medium directing to the second hydraulic circuit 1520 side from the second pressure chamber 1340, the hydraulic pressure of the pressurized medium may be smoothly transferred to the third wheel cylinder 23 and the fourth wheel cylinder 24. The third inlet valve 1521a and the fourth inlet valve 1521b provided in the second hydraulic circuit 1520 are maintained in the open state, and the second cut valve 1622 is maintained in the closed state, thereby preventing the hydraulic pressure of the pressurized medium from leaking into the second backup flow path 1620 side.

In the second braking mode, as the first dump check valve 1811 provided in the first dump flow path 1810 connected to the first pressure chamber 1330 allows the pressurized medium to be supplied from the reservoir 1100 to the first pressure chamber 1330, the first pressure chamber 1330 may be filled with the pressurized medium, thereby preparing the third braking mode, which will be described later.

Because an operation of the integrated master cylinder 1200 in the second braking mode is the same as the operation of the integrated master cylinder 1200 in the first to third braking modes of electronic brake system described above, a description thereof will be omitted to prevent duplication of contents.

The electronic brake system 3000 according to the third embodiment of the present disclosure may switch from the second braking mode to the third braking mode illustrated in FIG. 13 when a braking pressure higher than that in the second braking mode is to be provided.

FIG. 13 is a hydraulic circuit diagram illustrating that the electronic brake system 3000 according to the third embodiment of the present disclosure performs the third braking mode.

Referring to FIG. 13, when a displacement or an operating speed of the brake pedal 10 detected by the pedal displacement sensor 11 is higher than a preset level or a hydraulic pressure detected by the pressure sensor is higher than a preset level, the electronic control unit may switch from the second braking mode to the third braking mode by determining that a higher braking pressure is required.

When the second braking mode is switched to the third braking mode, the motor (not shown) operates to rotate in one direction, and the rotational force of the motor is transferred to the hydraulic pressure providing unit by the power conversion unit so that the hydraulic piston 1320 of the hydraulic pressure providing unit moves forward again, thereby generating a hydraulic pressure in the first pressure chamber 1330. The hydraulic pressure discharged from the first pressure chamber 1330 is transferred to the respective wheel cylinders 20 through the hydraulic control unit 3400, the first hydraulic circuit 1510, and the second hydraulic circuit 1520, thereby generating a braking force.

Specifically, the hydraulic pressure generated in the first pressure chamber 1330 is thirdly transferred to the first wheel cylinder 21 and the second wheel cylinder 22 provided in the first hydraulic circuit 1510 by sequentially passing through the first hydraulic flow path 1401, the third hydraulic flow path 1403, and the fourth hydraulic flow path 1404. At this time, as the first valve 1411 and the third valve 1413 are provided as check valves allowing only the flow of the pressurized medium directing to the first hydraulic circuit 1510 side from the first pressure chamber 1330, the hydraulic pressure of the pressurized medium may be smoothly transferred to the first and second wheel cylinders 21 and 22. The first inlet valve 1511a and the second inlet valve 1511b provided in the first hydraulic circuit 1510 are maintained in the open state, and the first outlet valve 1512a, the second outlet valve 1512b, and the discharge valve 1550 are maintained in the closed state, thereby preventing the hydraulic pressure of the pressurized medium from leaking into the reservoir 1100 side.

Also, the hydraulic pressure of the pressurized medium generated in the first pressure chamber 1330 is thirdly transferred to the third wheel cylinder 23 and the fourth wheel cylinder 24 provided in the second hydraulic circuit 1520 by sequentially passing through the first hydraulic flow path 1401, the third hydraulic flow path 1403, and the fifth hydraulic flow path 1405. As described above, as the first valve 1411 and the fourth valve 1414 are provided as check valves allowing only the flow of the pressurized medium directing to the second hydraulic circuit 1520 side from the first pressure chamber 1330, the hydraulic pressure of the pressurized medium may be smoothly transferred to the third wheel cylinder 23 and the fourth wheel cylinder 24. Also, the third inlet valve 1521a and the fourth inlet valve 1521b provided in the second hydraulic circuit 1520 are maintained in the open state, and the second cut valve 1622 is maintained in the closed state, thereby preventing the hydraulic pressure of the pressurized medium from leaking into the second backup flow path 1620 side.

Because the hydraulic pressure of a high pressure is provided in the third braking mode, as the hydraulic piston 1320 moves forward, a force of the hydraulic pressure in the first pressure chamber 1330 to move the hydraulic piston 1320 backward also increases, so that a load applied to the motor increases rapidly. Accordingly, in the third braking mode, the fifth valve 3415 is operated to open, thereby allowing the flow of the pressurized medium through the sixth hydraulic flow path 3406. In other words, a part of the hydraulic pressure generated in the first pressure chamber 1330 may be supplied to the second pressure chamber 1340 by sequentially passing through the first hydraulic flow path 1401, the sixth hydraulic flow path 3406, and the second flow path 1402, and through this, the first pressure chamber 1330 and the second pressure chamber 1340 are in communication with each other to synchronize the hydraulic pressure, so that the load applied to the motor may be reduced and the durability and reliability of the devices may be improved.

Because an operation of the integrated master cylinder 1200 in the third braking mode is the same as the operation of the integrated master cylinder 1200 in the first to third braking modes of electronic brake system described above, a description thereof will be omitted to prevent duplication of contents.

Also, because an operation method of releasing the braking in the normal operation mode of the electronic brake system 3000 according to the third embodiment of the present disclosure is the same as the operation method of releasing the braking in the normal operation mode of the electronic brake system 1000 according to the first embodiment of the present disclosure described above, a separate description thereof will be omitted.

Hereinafter, an electronic brake system 4000 according to a fourth embodiment of the present disclosure will be described.

FIG. 14 is a hydraulic circuit diagram illustrating the electronic brake system 4000 according to the fourth embodiment of the present disclosure, and referring to FIG. 14, an integrated master cylinder 4200 according to the fourth embodiment may further include a first simulator spring 4271 provided to elastically support the first simulation piston 1230, and a second simulator spring 4272 provided to elastically support the second simulation piston 4272.

Because the following description of the electronic brake system 4000 according to the fourth embodiment of the present disclosure except for additional explanation with separate reference numerals is the same as the above description of the electronic brake system 3000 according to the third embodiment of the present disclosure, a description thereof will be omitted in order to prevent redundant description.

The first simulator spring 4271 is provided to elastically support the first simulation piston 1230. To this end, one end of the first simulation spring 4271 may be supported on the rear surface (left surface of FIG. 14) of the first simulation piston 1230, and the other end thereof may be supported on the front surface (right surface of FIG. 14) of the second simulation piston 1240. When the first simulation piston 1230 moves forward according to a braking operation to generate a displacement, the first simulator spring 4271 is compressed, and at this time, a pedal feeling may be provided to the driver together with the elastic member 1250 by the elastic restoring force. Thereafter, when the braking is released, as the first simulator spring 4271 expands by an elastic force thereof, the first simulation piston 1230 may return to the original position.

The second simulator spring 4272 is provided to elastically support the second simulation piston 1240. As one end of the second simulator spring 4272 is supported on the cylinder block 1210 and the other end thereof is supported on the second simulation piston 1240, the second simulator spring 4272 may elastically support the second simulation piston 1240. When the second simulation piston 1240 moves forward according to the braking operation to generate a displacement, the second simulator spring 4272 is compressed, and thereafter, when the braking is released, as the second simulator spring 4272 expands by an elastic force thereof, the second simulation piston 1240 may return to the original position.

The invention claimed is:

1. An electronic brake system comprising:
a reservoir in which a pressurized medium is stored;
an integrated master cylinder comprising a master chamber, a master piston provided in the master chamber to be displaceable by a brake pedal, a first simulation chamber, a first simulation piston provided in the first simulation chamber to be displaceable by a displacement of the master piston or a hydraulic pressure of the pressurized medium accommodated in the master chamber, a second simulation chamber, a second simulation piston provided in the second simulation chamber to be displaceable by a displacement of the first simulation piston or a hydraulic pressure in the first simulation chamber, and an elastic member provided between the first simulation piston and the second simulation piston;
a hydraulic pressure supply device provided to generate a hydraulic pressure by operating a hydraulic piston according to an electrical signal output in response to a displacement of the brake pedal;
a hydraulic control unit comprising a first hydraulic circuit provided to control the hydraulic pressure transferred to two wheel cylinders and a second hydraulic circuit provided to control the hydraulic pressure transferred to the other two wheel cylinders;
an electronic control unit provided to control valves based on hydraulic pressure information and displacement information of the brake pedal;
a first backup flow path connecting the master chamber and the first hydraulic circuit;
a second backup flow path connecting the first simulation chamber and the second hydraulic circuit;
a first cut valve provided in the first backup flow path to control the flow of the pressurized medium;
at least one second cut valve provided in the second backup flow path to control the flow of the pressurized medium;
an auxiliary backup flow path connecting the second simulation chamber and the second backup flow path; and
an inspection valve provided in the auxiliary backup flow path to control the flow of the pressurized medium.

2. The electronic brake system according to claim 1, wherein
the first hydraulic circuit comprises a first inlet valve and a second inlet valve provided to control a flow of the pressurized medium to be supplied to a first wheel cylinder and a second wheel cylinder, respectively, a first outlet valve and a second outlet valve provided to control the flow of the pressurized medium to be discharged from the first wheel cylinder and the second wheel cylinder, respectively, and a discharge valve provided to control the flow of the pressurized medium to be supplied to the reservoir by passing through each of the first outlet valve and the second outlet valve, and
wherein the discharge valve is provided as a solenoid valve that is linearly controlled to adjust a flow rate of the pressurized medium.

3. The electronic brake system according to claim 1, wherein
the integrated master cylinder further comprises a simulation flow path connecting the first simulation chamber and the reservoir, and a simulator valve provided in the simulation flow path to control a flow of the pressurized medium.

4. The electronic brake system according to claim 3, wherein
the hydraulic pressure supply device comprises a first pressure chamber provided on one side of the hydraulic piston movably accommodated in the cylinder block to be connected to one or more of the wheel cylinders, and a second pressure chamber provided on the other side of the hydraulic piston to be connected to one or more of the wheel cylinders, and
the hydraulic control unit comprises a first hydraulic flow path in communication with the first pressure chamber, a second hydraulic flow path in communication with the second pressure chamber, a third hydraulic flow path in which the first hydraulic flow path and the second hydraulic flow path join, a fourth hydraulic flow path branched from the third hydraulic flow path to be connected to the first hydraulic circuit, and a fifth hydraulic flow path branched from the third hydraulic flow path to be connected to the second hydraulic circuit.

5. The electronic brake system according to claim 4, wherein
the hydraulic control unit comprises a first valve provided in the first hydraulic flow path to control the flow of the pressurized medium, a second valve provided in the second hydraulic flow path to control the flow of the pressurized medium, a third valve provided in the fourth hydraulic flow path to control the flow of the pressurized medium, and a fourth valve provided in the fifth hydraulic flow path to control the flow of the pressurized medium.

6. The electronic brake system according to claim 5, wherein
the first valve is provided as a check valve allowing only the flow of the pressurized medium discharged from the first pressure chamber,
the second valve is provided as a solenoid valve controlling the flow of the pressurized medium in bidirectional directions,
the third valve is provided as a check valve allowing only the flow of the pressurized medium directing to the first hydraulic circuit from the third hydraulic flow path, and
the fourth valve is provided as a check valve allowing only the flow of the pressurized medium directing to the second hydraulic circuit from the third hydraulic flow path.

7. A control method of the electronic brake system according to claim 6, wherein
the control method comprises, in a normal operation mode,
the first cut valve is closed to seal the master chamber, the inspection valve is closed to seal the second simulation chamber, and the second cut valve is closed but the simulator valve is opened to communicate the first simulation chamber and the reservoir, so that the first simulation piston compresses the elastic member by an operation of the brake pedal, and an elastic restoring force of the elastic member is provided to a driver as a pedal feeling.

8. The control method according to claim 7, wherein
the normal operation mode, as the hydraulic pressure transferred from the hydraulic pressure supply device to the wheel cylinders increases, comprises a first braking mode in which the hydraulic pressure is firstly provided by a forward movement of the hydraulic piston, a second braking mode in which the hydraulic pressure is secondarily provided by a backward movement of the hydraulic piston after the first braking mode, and a third braking mode in which the hydraulic pressure is thirdly provided by the forward movement of the hydraulic piston after the second braking mode.

9. The control method according to claim 8, wherein
in the first braking mode, the second valve is closed, so that the hydraulic pressure generated in the first pressure chamber by the forward movement of the hydraulic piston is provided to the first hydraulic circuit by sequentially passing through the first hydraulic flow path, the third hydraulic flow path, and the fourth hydraulic flow path, and provided to the second hydraulic circuit by sequentially passing through the first hydraulic flow path, the third hydraulic flow path, and the fifth hydraulic flow path.

10. The control method according to claim 9, wherein in the second braking mode, the second valve is opened, so that the hydraulic pressure generated in the second pressure chamber by the backward movement of the hydraulic piston after the first braking mode is provided to the first hydraulic circuit by sequentially passing through the second hydraulic flow path, the third hydraulic flow path, and the fourth hydraulic flow path, and provided to the second hydraulic circuit by sequentially passing through the second hydraulic flow path, the third hydraulic flow path, and the fifth hydraulic flow path.

11. The control method according to claim 10, wherein in the third braking mode, the second valve is opened, so that a part of the hydraulic pressure generated in the first pressure chamber by the forward movement of the hydraulic piston after the second braking mode is provided to the first hydraulic circuit by sequentially passing through the first hydraulic flow path, the third hydraulic flow path, and the fourth hydraulic flow path, and provided to the second hydraulic circuit by sequentially passing through the first hydraulic flow path, the third hydraulic flow path, and the fifth hydraulic flow path, and the remaining part of the hydraulic pressure generated in the first pressure chamber is provided to the second pressure chamber by sequentially passing through the first hydraulic flow path and the second hydraulic flow path.

12. The control method according to claim 8, wherein the second cut valve or the simulator valve is provided as a solenoid valve that is linearly controlled to adjust the flow rate of the pressurized medium, and wherein when the first to third braking modes are released, a degree of opening of the discharge valve is controlled, so that the pressurized medium provided to the first hydraulic circuit is recovered to the reservoir through the discharge valve, and a degree of opening of the second cut valve or the simulator valve is controlled, so that the pressurized medium provided to the second hydraulic circuit is recovered to the reservoir by sequentially passing through the first simulation chamber and the simulation flow path.

13. The electronic brake system according to claim 5, wherein
the first valve is provided as a check valve allowing only the flow of the pressurized medium discharged from the first pressure chamber,
the second valve and the fourth valve are provided as solenoid valves controlling the flow of the pressurized medium in bidirectional directions, and
the third valve is provided as a check valve allowing only the flow of the pressurized medium directing to the first hydraulic circuit from the third hydraulic flow path.

14. The electronic brake system according to claim 13, further comprising
generators provided in third wheel cylinder and fourth wheel cylinder in the second hydraulic circuit, respectively.

15. A control method of the electronic brake system according to claim 14, wherein
in the regenerative braking mode by the generator,
the fourth valve is closed, so that the supply of hydraulic pressure from the hydraulic pressure supply device to the third wheel cylinder and the fourth wheel cylinder is blocked.

16. The electronic brake system according to claim 5, wherein
the hydraulic control unit further comprises a sixth hydraulic flow path connecting the first hydraulic flow path and the second hydraulic flow path, and a fifth valve provided in the sixth hydraulic flow path to control the flow of the pressurized medium.

17. The electronic brake system according to claim 16, wherein
the first valve is provided as a check valve allowing only the flow of the pressurized medium discharged from the first pressure chamber,
the second valve is provided as a check valve allowing only the flow of the pressurized medium discharged from the second pressure chamber,
the third valve is provided as a check valve allowing only the flow of the pressurized medium directing to the first hydraulic circuit from the third hydraulic flow path,
the fourth valve is provided as a check valve allowing only the flow of the pressurized medium directing to the second hydraulic circuit from the third hydraulic flow path, and
the fifth valve is provided as a solenoid valve controlling the flow of the pressurized medium in bidirectional directions.

18. The electronic brake system according to claim 3, wherein
the second hydraulic circuit comprises a third inlet valve and a fourth inlet valve provided to control the flow of the pressurized medium to be supplied to third wheel cylinder and fourth wheel cylinder, respectively, and
the second backup flow path is provided to connect at least one of downstream sides of the third and fourth inlet valves to the first simulation chamber.

* * * * *